(12) United States Patent
Ertl et al.

(10) Patent No.: US 12,544,433 B2
(45) Date of Patent: Feb. 10, 2026

(54) MELANOMA CANINE VACCINE COMPOSITIONS AND METHODS OF USE THEREOF

(71) Applicant: The Wistar Institute, Philadelphia, PA (US)

(72) Inventors: Hildegund C. J. Ertl, Philadelphia, PA (US); Xiang Yang Zhou, Philadelphia, PA (US)

(73) Assignee: The Wistar Institute, Philadelphia, PA (US)

(*) Notice: Subject to any disclaimer, the term of this patent is extended or adjusted under 35 U.S.C. 154(b) by 1270 days.

(21) Appl. No.: 17/281,726

(22) PCT Filed: Sep. 30, 2019

(86) PCT No.: PCT/US2019/053843
§ 371 (c)(1),
(2) Date: Mar. 31, 2021

(87) PCT Pub. No.: WO2020/072371
PCT Pub. Date: Apr. 9, 2020

(65) Prior Publication Data
US 2021/0393757 A1    Dec. 23, 2021

Related U.S. Application Data

(60) Provisional application No. 62/739,443, filed on Oct. 1, 2018.

(51) Int. Cl.
*A61K 39/00* (2006.01)
*C12N 15/86* (2006.01)

(52) U.S. Cl.
CPC ............ *A61K 39/00119* (2018.08); *A61K 39/001156* (2018.08); *C12N 15/86* (2013.01); *A61K 2039/552* (2013.01); *A61K 2039/57* (2013.01); *A61K 2039/876* (2018.08); *C12N 2710/10343* (2013.01); *C12N 2710/16633* (2013.01)

(58) Field of Classification Search
CPC ........ A61K 39/00119; A61K 2039/552; A61K 2039/876
See application file for complete search history.

(56) References Cited

U.S. PATENT DOCUMENTS

| 9,402,888 B2 | 8/2016 | Ertl et al. |
| 9,744,224 B2 | 8/2017 | Ertl et al. |
| 2002/0098546 A1* | 7/2002 | Weber ............... C07K 14/4748 435/7.1 |
| 2016/0296612 A1 | 10/2016 | Ertl et al. |
| 2017/0340730 A1 | 11/2017 | Ertl et al. |

FOREIGN PATENT DOCUMENTS

| WO | 01019408 A1 | 3/2001 |
| WO | 2017191274 A2 | 11/2017 |
| WO | 2018026547 A1 | 2/2018 |
| WO | WO-2018208856 A1 * | 11/2018 ..... A61K 39/001188 |

OTHER PUBLICATIONS

Zhang and Ertl (Journal of Immunology, 2014, vol. 193, pp. 1836-1846) (Year: 2014).*
International Search Report and Written Opinion, PCT/US2019/053843, dated Jan. 6, 2020.
Kurupati, et al., "Safety and immunogenicity of a potential checkpoint blockade vaccine for canine melanoma", Cancer Immunology, Immunotherapy, Jul. 26, 2018, vol. 67, pp. 1533-1544.
Zhou, et al., "An efficient method of directly cloning chimpanzee adenovirus as a vaccine vector", Nature Protocols, Oct. 14, 2020, vol. 5, pp. 1775-1785.

* cited by examiner

*Primary Examiner* — Karen A. Canella
(74) *Attorney, Agent, or Firm* — Saul Ewing LLP; Kathryn Doyle; Lukas Pfannenstiel

(57) ABSTRACT

The present invention relates to compositions and methods for generating a nucleic acid delivery system comprising a nucleic acid sequence encoding a heterologous protein comprising a canine tumor-specific antigen (canine melanoma polyepitope (K9Melapoly)) and an inhibitor of an immuno-inhibitory pathway (HSV-1 gD). Additionally, the current invention includes compositions and methods of treating and/or preventing or immunizing a canine against melanoma, and methods of inducing an effector and memory T cell immune response in a canine administered the nucleic acid delivery system of the invention. Furthermore, the invention encompasses a pharmaceutical composition for vaccinating a canine as well as a protein expression system.

21 Claims, 18 Drawing Sheets
Specification includes a Sequence Listing.

G- granzyme B, I - IFN-γ, 2 - IL-2, T - TNF-α

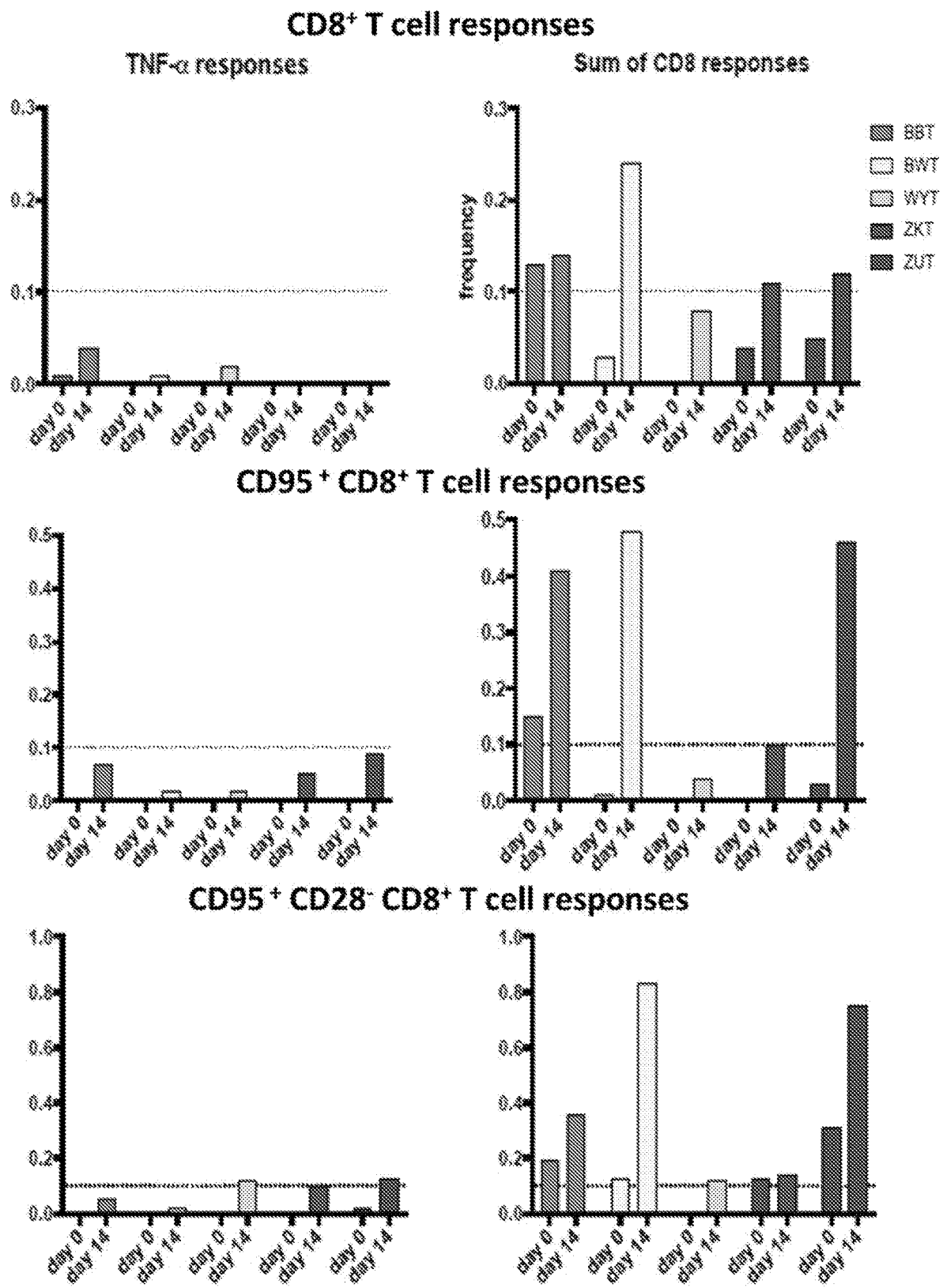
FIG. 11, Continued

```
                        SEQUENCE LISTING

<160> NUMBER OF SEQ ID NOS: 3

<210> SEQ ID NO 1
<211> LENGTH: 32767
<212> TYPE: DNA
<213> ORGANISM: Artificial Sequence
<220> FEATURE:
<223> OTHER INFORMATION: Vector
<220> FEATURE:
<223> OTHER INFORMATION: C68 010 gD-K9melapoly

<400> SEQUENCE: 1
gctggagttc ctggccaagg tgcatcatct tcaataatat acctcaaact ttttgtgcgc      60
gttaatatgc aaatgaggcg tttgaatttg gggaggaagg gcggtgattg gtcgagggat     120
gagcgaccgt tagggcggg gcgagtgacg ttttgatgac gtggttgcga ggaggagcca     180
gtttgcaagt tctcgtggga aaagtgacgt caaacgaggt gtggtttgaa cacggaaata     240
ctcaattttc ccgcgctctc tgacaggaaa tgaggtgttt ctgggcggat gcaagtgaaa     300
acgggccatt ttcgcgcgaa aactgaatga ggaagtgaaa atctgagtaa tttcgcgttt     360
atggcaggga ggagtatttg ccgagggccg agtagacttt gaccgattac gtgggggttt     420
cgattaccgt gtttttcacc taaatttccg cgtacggtgt caaagtccgg tgtttttacg     480
tacgatatca tttccccgaa agtgccacct gaccgtaact ataacggtcc taaggtagcg     540
aaagctcaga tctcccgatc ccctatggtg cactctcagt acaatctgct ctgatgccgc     600
atagttaagc cagtatctgc tccctgcttg tgtgttggag gtcgctgagt agtgcgcgag     660
caaaatttaa gctacaacaa ggcaaggctt gaccgacaat tgcatgaaga atctgcttag     720
ggttaggcgt tttgcgctgc ttcgcgatgt acgggccaga tatacgcgtt gacattgatt     780
attgactagt tattaatagt aatcaattac ggggtcatta gttcatagcc catatatgga     840
gttccgcgtt acataactta cggtaaatgg cccgcctggc tgaccgccca acgacccccg     900
cccattgacg tcaataatga cgtatgttcc catagtaacg ccaatagggA ctttccattg     960
```

```
acgtcaatgg gtggagtatt tacggtaaac tgcccacttg gcagtacatc aagtgtatca   1020
tatgccaagt acgcccccta ttgacgtcaa tgacggtaaa tggcccgcct ggcattatgc   1080
ccagtacatg accttatggg actttcctac ttggcagtac atctacgtat tagtcatcgc   1140
tattaccatg gtgatgcggt tttggcagta catcaatggg cgtggatagc ggtttgactc   1200
acggggattt ccaagtctcc accccattga cgtcaatggg agtttgtttt ggcaccaaaa   1260
tcaacgggac tttccaaaat gtcgtaacaa ctccgcccca ttgacgcaaa tgggcggtag   1320
gcgtgtacgg tgggaggtct atataagcag agctcgttta gtgaaccgtc agatcactag   1380
aagctttatt gcggtagttt atcacagtta aattgctaac gcagtcagtg cttctgacac   1440
aacagtctcg aacttaagct gcagaagttg gtcgtgaggc actgggcagg taagtatcaa   1500
ggttacaaga caggtttaag gagaccaata gaaactgggc ttgtcgagac agagaagact   1560
cttgcgtttc tgataggcac ctattggtct tactgacatc cactttgcct ttctctccac   1620
aggtgtccac tcccagttca attacagctc ttaaggctag agtacttaat acgactcact   1680
ataggctagc ctcgagaatt cacgcgtggt acctctagaa tgggggggc tgccgccagg   1740 ttggggccg tgattttgtt tgtcgtcata gtgggcctcc atggggtccg cggcaaatat   1800
gccttggcgg atgcctctct caagatggcc gaccccaatc gctttcgcgg caaagacctt   1860
ccggtcctgg accagctgac cgaccctccg ggggtccggc gcgtgtacca catccaggcg   1920
ggcctaccgg acccgttcca gccccccagc ctcccgatca cggtttacta cgccgtgttg   1980
gagcgcgcct gccgcagcgt gctcctaaac gcaccgtcgg aggccccca gattgtccgc   2040 ggggcctccg aagacgtccg gaaacaaccc tacaacctga ccatcgcttg gtttcggatg   2100
ggaggcaact gtgctatccc catcacggtc atggagtaca ccgaatgctc ctacaacaag   2160
tctctggggg cctgtcccat ccgaacgcag ccccgctgga actactatga cagcttcagc   2220
gccgtcagcg aggataacct ggggttcctg atgcacgccc ccgcgtttga gaccgccggc   2280
acgtacctgc ggctcgtgaa gataaacgac tggacggaga ttacacagtt tatcctggag   2340
caccgagcca agggctcctg taagtacgcc ctcccgctgc gcatccccc gtcagcctgc   2400 ctctccccc aggcctacca gcaggggtg acggtggaca gcatcgggat gctgccccgc   2460
ttcatccccg agaaccagcg caccgtcgcc gtatacagct tgaagatcgc cgggtggcac   2520
gggccctccc tgccctggca ccggctgttc ggccagatga agaacggcag cacccccatg   2580
ttcctgagcc ccgccagctt cttcagcagc tggaccccca tgttcaacga cattaatatc   2640
tacgtggagt tctgcctgag cctgacccag tacctggccc tgcggcggca ccggcccctg   2700
cagagcagca tgcacaacgc cctgcacatc tacatgctgc tgatggtgcc cttcatcccc   2760
ctgtaccggt tcctgctgcg gtgggagcag gagatcagca gcaaggacct gggctacgac   2820
tacgccgcgg cagccaaggc ctggaaccgg cagctgtacc ccgagtggcg agccctggtg   2880
gtgacccaca cctacaaggt gctgcccgac ggccaggtga tctggctgat ggccgtggtg   2940
ctggccagcc tgatctacca ggtgtggggc ggccagcccg tgtaccactg gaccatggag   3000
gtgaccgtgt accaccggca gctgttcacc atcaccgacc aggtgccctt cagcctggcc   3060
cgtgccctgg tggtgaccca cacctacgtg ctgatggccg tggtgctggc ggctgcagcc   3120
aactacttcg tgtggaccca ctactacagc accacctaca gcttcagcct gcctactgg   3180 aacttcgtga ccgcctacta catcagcccc aacagcgtgt cagccagtg acccccccag   3240 ttcgagaacc ggaacgtggc ccggcccatg gtgcagcggg acagcaacag caccaacagc   3300
ttccggctgc acaacctggc ccacctgttc ctgctgttcc agcaggcccg ggctcagttc   3360
```

```
cggagccggc agtacaacat ggtgccctte tgggcactga tcttcggcac cgccagctac    3420
atcttcttcc ccctgctgct gttcgtgacc gcccccgaca acctgggcta cgcggctgcg    3480
gcggccagct tcgccctgcc ctactggaac ttccagccct acatgagcct gcacaacctg    3540
gtgcacagct tcgtggccct ggtgctgcac agcttcaccg acgccatctt cctgcagctg    3600
accagcgacc agctgggcta cagctacccc tacctgcagt accggcggct gcggaagggc    3660
tacagcgccg cagctgctgc cctgtaccgg gccagcgagc acctggagct gatcttcctg    3720
tacgacggca tcgaggacgg catcgagcac ttctggaagg tgttcaacac catgggcctg    3780
tacggcctgt acgacctgct gatgaccgtg ctgggcatca tcttcatgcc ccggggccag    3840
aagagcaagc tgctgtacga cggcatcgag cacttcatgt tcaagttcct ggtgaaggag    3900
aactacctgg agtacgtgcc caacagcgac cccccccgt acttcgtgtg gaaggtgttc    3960
aacaccatgg gcctgtacaa ggtgctggag ttcctggcca aggtggggcc caaggcccca    4020
tacacgagca ccctgctgcc cccggagctg tccgagaccc ccaacgccac gcagccagaa    4080
ctcgccccgg aagaccccga ggattcggcc ctcttggagg accccgtggg gacggtggcg    4140
ccgcaaatcc caccaaactg gcacatcccg tcgatccagg acgccgcgac gccttaccat    4200
cccccggcca ccccgaacaa catgggcctg atcgccggcg cggtgggcgg cagtctcctg    4260
gcagccctgg tcatttgcgg aattgtgtac tggatgcacc gccgcactcg gaaagcccca    4320
aagcgcatac gcctccccca catccgggaa gacgaccagc cgtcctcgca ccagcccttg    4380
ttttactagt ctagagtcga cccggcggc caaaccgctg atcagcctcg actgtgcctt    4440
ctagttgcca gccatctgtt gtttgcccct cccccgtgcc ttccttgacc ctggaaggtg    4500
ccactcccac tgtcctttcc taataaaatg aggaaattgc atcgcattgt ctgagtaggt    4560
gtcattctat tctgggggt ggggtggggc aggacagcaa gggggaggat tgggaagaca    4620
atagcaggca tgctggggat gcggtgggct ctatggcttc tgaggcggaa agaaccagca    4680
gatctgcaga tctgaattca tctatgtcgg gtgcggagaa agaggtaatg aaatggcatt    4740
atgggtatta tgggtctgca ttaatgaatc ggccagatat cgacatatgc tggccaccgt    4800
acatgtggct tccatgctc gcaagccctg gcccgagttc gagcacaatg tcatgaccag    4860
gtgcaatatg catctggggt cccgccgagg catgttcatg ccctaccagt gcaacctgaa    4920
ttatgtgaag gtgctgctgg agcccgatgc catgtccaga gtgagcctga cggggggtgtt    4980 tgacatgaat gtggaggtgt ggaagattct gagatatgat gaatccaaga ccaggtgccg    5040
agcctgcgag tgcggaggga agcatgccag gttccagccc gtgtgtgtgg atgtgacgga    5100
ggacctgcga cccgatcatt tggtgttgcc ctgcaccggg acggagttcg gttccagcgg    5160
ggaagaatct gactagagtg agtagtgttc tgggcgggg gaggacctgc atgagggcca    5220
gaataactga aatctgtgct tttctgtgtg ttgcagcagc atgagcggaa gcggctcctt    5280
tgagggaggg gtattcagcc cttatctgac ggggcgtctc ccctcctggg cgggagtgcg    5340
tcagaatgtg atgggatcca cggtggacgg ccggcccgtg cagcccgcga actcttcaac    5400
cctgacctat gcaaccctga gctcttcgtc gttggacgca gctgccgccg cagctgctgc    5460
atctgccgcc agcgccgtgc gcggaatggc catgggcgcc ggctactacg gcactctggt    5520
ggccaactcg agttccacca ataatcccgc cagcctgaac gaggagaagc tgttgctgct    5580 gatgcccag ctcgaggcct tgacccacgc cctgggcgag ctgacccagc aggtggctca    5640
gctgcaggag cagacgcggg ccgcggttgc cacggtgaaa tccaaataaa aaatgaatca    5700
```

```
ataaataaac ggagacggtt gttgatttta acacagagtc tgaatcttta tttgattttt    5760
cgcgcgcggt aggccctgga ccaccggtct cgatcattga gcacccggtg gatcttttcc    5820
aggacccggt agaggtgggc ttggatgttg aggtacatgg gcatgagccc gtcccggggg    5880
tggaggtagc tccattgcag ggcctcgtgc tcggggtgg tgttgtaaat cacccagtca    5940 tagcagggc gcagggcatg gtgttgcaca atatctttga ggaggagact gatggccacg    6000
ggcagccctt tggtgtaggt gtttacaaat ctgttgagct gggagggatg catgcggggg    6060
gagatgaggt gcatcttggc ctggatcttg agattggcga tgttaccgcc cagatcccgc    6120
ctggggttca tgttgtgcag gaccaccagc acggtgtatc cggtgcactt ggggaattta    6180
tcatgcaact tggaagggaa ggcgtgaaag aatttggcga cgcctttgtg cccgcccagg    6240
ttttccatgc actcatccat gatgatggcg atgggcccgt gggcggcggc ctgggcaaag    6300
acgtttcggg ggtcggacac atcatagttg tggtcctggg tgaggtcatc ataggccatt    6360
ttaatgaatt tggggcggag ggtgccggac tgggggacaa aggtaccctc gatcccgggg    6420
gcgtagttcc cctcacagat ctgcatctcc caggctttga gctcggaggg ggggatcatg    6480
tccacctgcg gggcgataaa gaacacggtt tccggggcgg gggagatgag ctgggccgaa    6540
agcaagttcc ggagcagctg ggacttgccg cagccggtgg ggccgtagat gaccccgatg    6600
accggctgca ggtggtagtt gagggagaga cagctgccgt cctcccggag gaggggggcc    6660
acctcgttca tcatctcgcg cacgtgcatg ttctcgcgca ccagttccgc caggaggcgc    6720 tctccccca gggataggag ctcctggagc gaggcgaagt ttttcagcgg cttgagtccg    6780
tcggccatgg gcattttgga gagggtttgt tgcaagagtt ccaggcggtc ccagagctcg    6840
gtgatgtgct ctacggcatc tcgatccagc agacctcctc gtttcgcggg ttgggacggc    6900
tgcgggagta gggcaccaga cgatgggcgt ccagcgcagc cagggtccgg tccttccagg    6960
gtcgcagcgt ccgcgtcagg gtggtctccg tcacggtgaa ggggtgcgcg ccgggctggg    7020
cgcttgcgag ggtgcgcttc aggctcatcc ggctggtcga aaaccgctcc cgatcggcgc    7080
cctgcgcgtc ggccaggtag caattgacca tgagttcgta gttgagcgcc tcggccgcgt    7140
ggcctttggc gcggagctta cctttggaag tctgcccgca ggcgggacag aggagggact    7200
tgagggcgta gagcttgggg gcgaggaaga cggactcggg ggcgtaggcg tccgcgccgc    7260
agtgggcgca gacggtctcg cactccacga gccaggtgag gtcgggctgg tcgggtcaa    7320 aaaccagttt cccgccgttc tttttgatgc gtttcttacc tttggtctcc atgagctcgt    7380
gtccccgctg ggtgacaaag aggctgtccg tgtccccgta gaccgacttt atgggccggt    7440
cctcgagcgg tgtgccgcgg tcctcctcgt agaggaaccc cgcccactcc gagacgaaag    7500
cccgggtcca ggccagcacg aaggaggcca cgtgggacgg gtagcggtcg ttgtccacca    7560
gcgggtccac cttttccagg gtatgcaaac acatgtcccc ctcgtccaca tccaggaagg    7620
tgattggctt gtaagtgtag gccacgtgac cgggggtccc ggccgggggg gtataaaagg    7680
gtgcgggtcc ctgctcgtcc tcactgtctt ccggatcgct gtccaggagc gccagctgtt    7740
ggggtaggta ttccctctcg aaggcgggca tgacctcggc actcaggttg tcagtttcta    7800
gaaacgagga ggatttgata ttgacggtgc cggcggagat gcctttcaag agcccctcgt    7860
ccatctggtc agaaaagacg atcttttgt tgtcgagctt ggtggcgaag gagccgtaga    7920
gggcgttgga gaggagcttg gcgatggagc gcatggtctg gttttttttcc ttgtcggcgc    7980 gctccttggc ggcgatgttg agctgcacgt actcgcgcgc cacgcacttc cattcgggga    8040
agacggtggt cagctcgtcg ggcacgattc tgacctgcca gccccgatta tgcagggtga    8100
```

```
tgaggtccac actggtggcc acctcgccgc gcagggcctc attagtccag cagaggcgtc   8160
cgcccttgcg cgagcagaag gggggcaggg ggtccagcat gacctcgtcg gggggtcgg    8220 catcgatggt gaagatgccg ggcaggaggt cggggtcaaa gtagctgatg gaagtggcca   8280
gatcgtccag ggcagcttgc cattcgcgca cggccagcgc gcgctcgtag ggactgaggg   8340
gcgtgcccca gggcatggga tgggtaagcg cggaggcgta catgccgcag atgtcgtaga   8400
cgtagagggg ctcctcgagg atgccgatgt aggtgggta gcagcgcccc ccgcggatgc    8460
tggcgcgcac gtagtcatac agctcgtgcg aggggcgag gagccccggg cccaggttgg    8520
tgcgactggg cttttcggcg cggtagacga tctggcggaa aatggcatgc gagttggagg   8580
agatggtggg cctttggaag atgttgaagt gggcgtgggg cagtccgacc gagtcgcgga   8640
tgaagtgggc gtaggagtct tgcagcttgg cgacgagctc ggcggtgact aggacgtcca   8700
gagcgcagta gtcgagggtc tcctggatga tgtcatactt gagctgtccc ttttgtttcc   8760
acagctcgcg gttgagaagg aactcttcgc ggtccttcca gtactcttcg aggggggaacc  8820 cgtcctgatc tgcacggtaa gagcctagca gtagaactg gttgacggcc ttgtaggcgc    8880
agcagccctt ctccacgggg agggcgtagg cctgggcggc cttgcgcagg gaggtgtgcg   8940
tgagggcgaa agtgtccctg accatgacct tgaggaactg gtgcttgaag tcgatatcgt   9000
cgcagccccc ctgctcccag agctggaagt ccgtgcgctt cttgtaggcg gggttgggca   9060
aagcgaaagt aacatcgttg aagaggatct tgcccgcgcg gggcataaag ttgcgagtga   9120
tgcggaaagg ttggggcacc tcggcccggt tgttgatgac ctgggcggcg agcacgatct   9180
cgtcgaagcc gttgatgttg tggcccacga tgtagagttc cacgaatcgc ggacggccct   9240
tgacgtgggg cagtttcttg agctcctcgt aggtgagctc gtcggggtcg ctgagcccgt   9300
gctgctcgag cgcccagtcg gcgagatggg ggttggcgcg gaggaaggaa gtccagagat   9360
ccacggccag ggcggtttgc agacggtccc ggtactgacg gaactgctgc ccgacggcca   9420 tttttttcggg ggtgacgcag tagaaggtgc gggggtcccc gtgccagcga tcccatttga  9480
gctggagggc gagatcgagg gcgagctcga cgagccggtc gtccccggag agtttcatga   9540
ccagcatgaa ggggacgagc tgcttgccga aggaccccat ccaggtgtag gtttccacat   9600
cgtaggtgag gaagagcctt tcggtgcgag gatgcgagcc gatggggaag aactggatct   9660
cctgccacca attggaggaa tggctgttga tgtgatggaa gtagaaatgc cgacggcgcg   9720
ccgaacactc gtgcttgtgt ttatacaagc ggccacagtg ctcgcaacgc tgcacgggat   9780
gcacgtgctg cacgagctgt acctgagttc ctttgacgag gaatttcagt gggaagtgga   9840
gtcgtggcgc ctgcatctcg tgctgtacta cgtcgtggtg gtcggcctgg ccctcttctg   9900
cctcgatggt ggtcatgctg acgagcccgc gcgggaggca ggtccagacc tcggcgcgag   9960
cgggtcggag agcgaggacg agggcgcgca ggccggagct gtccagggtc ctgagacgct  10020
gcggagtcag gtcagtgggc agcggcgcg cgcggttgac ttgcaggagt ttttccaggg   10080
cgcgcgggag gtccagatgg tacttgatct ccaccgcgcc attggtggcg acgtcgatgg  10140
cttgcagggt cccgtgcccc tggggtgtga ccaccgtccc ccgtttcttc ttgggcggct  10200
ggggcgacgg gggcggtgcc tcttccatgg ttagaagcgg cggcgaggac gcgcgccggg  10260 cggcagggggc ggctcggggc ccggaggcag gggcggcagg ggcacgtcgg cgccgcgcgc  10320
gggtaggttc tggtactgcg cccggagaag actggcgtga cgacgacgc gacggttgac   10380 gtcctggatc tgacgcctct gggtgaaggc cacgggaccc gtgagtttga acctgaaaga  10440
```

-continued

```
gagttcgaca gaatcaatct cggtatcgtt gacggcggcc tgccgcagga tctcttgcac    10500
gtcgcccgag ttgtcctggt aggcgatctc ggtcatgaac tgctcgatct cctcctcttg    10560
aaggtctccg cggccggcgc gctccacggt ggccgcgagg tcgttggaga tgcggcccat    10620
gagctgcgaa aaggcgttca tgcccgcctc gttccagacg cggctgtaga ccacgacgcc    10680
ctcgggatcg ccggcgcgca tgaccacctg ggcgaggttg agctccacgt ggcgcgtgaa    10740
gaccgcgtag ttgcagaggc gctggtagag gtagttgagc gtggtggcga tgtgctcggt    10800
gacgaagaaa tacatgatcc agcggcggag cggcatctcg ctgacgtcgc ccagcgcctc    10860
caaacgttcc atggcctcgt aaaagtccac ggcgaagttg aaaaactggg agttgcgcgc    10920
cgagacggtc aactcctcct ccagaagacg gatgagctcg gcgatggtgg cgcgcacctc    10980
gcgctcgaag gccccgggga gttcctccac ttcctcttct tcctcctcca ctaacatctc    11040
ttctacttcc tcctcaggcg gcagtggtgg cggggagggg ggcctgcgtc gccggcggcg    11100
cacgggcaga cggtcgatga agcgctcgat ggtctcgccg cgccggcgtc gcatggtctc    11160
ggtgacggcg cgcccgtcct cgcggggccg cagcgtgaag acgccgccgc gcatctccag    11220
gtggccgggg gggtccccgt tgggcaggga gagggcgctg acgatgcatc ttatcaattg    11280
ccccgtaggg actccgcgca aggacctgag cgtctcgaga tccacgggat ctgaaaaccg    11340
ctgaacgaag gcttcgagcc agtcgcagtc gcaaggtagg ctgagcacgg tttcttctgg    11400
cgggtcatgt tggttgggag cggggcggc gatgctgctg gtgatgaagt tgaaataggc    11460
ggttctgaga cggcggatgg tggcgaggag caccaggtct ttgggccgg cttgctggat    11520 gcgcagacgg tcgccatgc cccaggcgtg gtcctgacac ctggccaggt ccttgtagta    11580
gtcctgcatg agccgctcca cgggcacctc ctcctcgccc gcgcggccgt gcatgcgcgt    11640
gagcccgaag ccgcgctggg gctggacgag cgccaggtcg gcgacgacgc gctcggcgag    11700
gatggcttgc tggatctggg tgagggtggt ctggaagtca tcaaagtcga cgaagcggtg    11760
gtaggctccg gtgttgatgg tgtaggagca gttggccatg acggaccagt tgacggtctg    11820
gtggcccgga cgcacgagct cgtggtactt gaggcgcgag taggcgcgcg tgtcgaagat    11880
gtagtcgttg caggtgcgca ccaggtactg gtagccgatg aggaagtgcg gcggcggctg    11940
gcggtagagc ggccatcgct cggtggcggg ggcgccgggc gcgaggtcct cgagcatggt    12000
gcggtggtag ccgtagatgt acctggacat ccaggtgatg ccggcggcgg tggtggaggc    12060
gcgcgggaac tcgcggacgc ggttccagat gttgcgcagc ggcaggaagt agttcatggt    12120
gggcacggtc tggcccgtga ggcgcgcgca gtcgtggatg ctctatacgg caaaaacga    12180 aagcggtcag cggctcgact ccgtggcctg gaggctaagc gaacgggttg ggctgcgcgt    12240
gtacccgggt tcgaatctcg aatcaggctg gagccgcagc taacgtggta ttggcactcc    12300
cgtctcgacc caagcctgca ccaaccctcc aggatacgga ggcgggtcgt tttgcaactt    12360 tttttggag gccggatgag actagtaagc gcggaaagcg gccgaccgcg atggctcgct    12420
gccgtagtct ggagaagaat cgccagggtt gcgttgcggt gtgccccggt tcgaggccgg    12480
ccggattccg cggctaacga gggcgtggct gccccgtcgt ttccaagacc ccatagccag    12540
ccgacttctc cagttacgga gcgagcccct cttttgtttt gtttgttttt gccagatgca    12600
tcccgtactg cggcagatgc gccccacca ccctccaccg caacaacagc ccctccaca    12660 gccggcgctt ctgccccgc cccagcagca acttccagcc acgaccgccg cggccgccgt    12720
gagcggggct ggacagagtt atgatcacca gctggccttg gaagagggcg aggggctggc    12780
gcgcctgggg gcgtcgtcgc cggagcggca cccgcgcgtg cagatgaaaa gggacgctcg    12840
```

```
cgaggcctac gtgcccaagc agaacctgtt cagagacagg agcggcgagg agcccgagga   12900
gatgcgcgcg gcccggttcc acgcggggcg ggagctgcgg cgcggcctgg accgaaagag   12960
ggtgctgagg gacgaggatt tcgaggcgga cgagctgacg gggatcagcc ccgcgcgcgc   13020
gcacgtggcc gcggccaacc tggtcacggc gtacgagcag accgtgaagg aggagagcaa   13080
cttccaaaaa tccttcaaca accacgtgcg caccctgatc gcgcgcgagg aggtgaccct   13140
gggcctgatg cacctgtggg aacctgctgga ggccatcgtg cagaacccca ccagcaagcc   13200
gctgacggcg cagctgttcc tggtggtgca gcatagtcgg gacaacgaag cgttcaggga   13260
ggcgctgctg aatatcaccg agcccgaggg ccgctggctc ctggacctgg tgaacattct   13320
gcagagcatc gtggtgcagg agcgcgggct gccgctgtcc gagaagctgg cggccatcaa   13380
cttctcggtg ctgagtttgg gcaagtacta cgctaggaag atctacaaga ccccgtacgt   13440
gcccatagac aaggaggtga agatcgacgg gttttacatg cgcatgaccc tgaaagtgct   13500
gaccctgagc gacgatctgg gggtgtaccg caacgacagg atgcaccgtg cggtgagcgc   13560
cagcaggcgg cgcgagctga gcgaccagga gctgatgcat agtctgcagc gggccctgac   13620
cggggccggg accgagggg agagctactt tgacatgggc gcggacctgc actggcagcc   13680
cagccgccgg gccttggagg cggcggcagg accctacgta aagaggtgg acgatgaggt   13740 ggacgaggag ggcgagtacc tggaagactg atggcgcgac cgtatttttg ctagatgcaa   13800
caacaacagc cacctcctga tcccgcgatg cgggcggcgc tgcagagcca gccgtccggc   13860
attaactcct cggacgattg gacccaggcc atgcaacgca tcatggcgct gacgacccgc   13920
aaccccgaag cctttagaca gcagccccag gccaaccggc tctcggccat cctggaggcc   13980
gtggtgccct cgcgctccaa ccccacgcac gagaaggtcc tggccatcgt gaacgcgctg   14040
gtggagaaca aggccatccg cggcgacgag gccggcctgg tgtacaacgc gctgctggag   14100
cgcgtggccc gctacaacag caccaacgtg cagaccaacc tggaccgcat ggtgaccgac   14160
gtgcgcgagg ccgtggccca gcgcgagcgg ttccaccgcg agtccaacct gggatccatg   14220
gtggcgctga acgccttcct cagcacccag cccgccaacg tgcccgggg ccaggaggac   14280 tacaccaact tcatcagcgc cctgcgcctg atggtgaccg aggtgcccca gagcgaggtg   14340
taccagtccg ggccggacta cttcttccag accagtcgcc agggcttgca gaccgtgaac   14400
ctgagccagg ctttcaagaa cttgcagggc ctgtggggcg tgcaggcccc ggtcggggac   14460
cgcgcgacgg tgtcgagcct gctgacgccg aactcgcgcc tgctgctgct gctggtggcc   14520
cccttcacgg acagcggcag catcaaccgc aactcgtacc tgggctacct gattaacctg   14580
taccgcgagg ccatcggcca ggcgcacgtg gacgagcaga cctaccagga gatcacccac   14640
gtgagccgcg ccctgggcca ggacgacccg ggcaacctgg aagccaccct gaactttttg   14700
ctgaccaacc ggtcgcagaa gatcccgccc cagtacgcgc tcagcaccga ggaggagcgc   14760
atcctgcgtt acgtgcagca gagcgtgggc ctgttcctga tgcaggaggg ggccaccccc   14820
agcgccgcgc tcgacatgac cgcgcgcaac atggagccca gcatgtacgc cagcaaccgc   14880
ccgttcatca ataaactgat ggactacttg catcgggcgg ccgccatgaa ctctgactat   14940
ttcaccaacg ccatcctgaa tccccactgg ctcccgccgc cggggttcta cacgggcgag   15000
tacgacatgc ccgaccccaa tgacgggttc ctgtgggacg atgtggacag cagcgtgttc   15060
tccccccgac cgggtgctaa cgagcgcccc ttgtggaaga aggaaggcag cgaccgacgc   15120
ccgtcctcgg cgctgtccgg ccgcgagggt gctgccgcgg cggtgcccga ggccgccagt   15180
```

```
cctttcccga gcttgccctt ctcgctgaac agtatccgca gcagcgagct gggcaggatc    15240
acgcgcccgc gcttgctggg cgaagaggag tacttgaatg actcgctgtt gagacccgag    15300
cgggagaaga acttccccaa taacgggata gaaagcctgg tggacaagat gagccgctgg    15360
aagacgtatg cgcaggagca cagggacgat ccccgggcgt cgcagggggc cacgagccgg    15420
ggcagcgccg cccgtaaacg ccggtggcac gacaggcagc ggggacagat gtgggacgat    15480
gaggactccg ccgacgacag cagcgtgttg gacttgggtg ggagtggtaa cccgttcgct    15540
cacctgcgcc cccgtatcgg gcgcatgatg taagagaaac cgaaaataaa tgatactcac    15600
caaggccatg gcgaccagcg tgcgttcgtt tcttctctgt tgttgttgta tctagtatga    15660
tgaggcgtgc gtacccggag ggtcctcctc cctcgtacga gagcgtgatg cagcaggcga    15720
tggcggcggc ggcgatgcag cccccgctgg aggctcctta cgtgccccg cggtacctgg     15780 cgcctacgga ggggcggaac agcattcgtt actcggagct ggcacccttg tacgatacca    15840
cccggttgta cctggtggac aacaagtcgg cggacatcgc ctcgctgaac taccagaacg    15900
accacagcaa cttcctgacc accgtggtgc agaacaatga cttcaccccc acggaggcca    15960
gcacccagac catcaacttt gacgagcgct cgcggtgggg cggccagctg aaaaccatca    16020
tgcacaccaa catgcccaac gtgaacgagt tcatgtacag caacaagttc aaggcgcggg    16080
tgatggtctc ccgcaagacc cccaatgggg tgacagtgac agaggattat gatggtagtc    16140
aggatgagct gaagtatgaa tgggtggaat ttgagctgcc cgaaggcaac ttctcggtga    16200
ccatgaccat cgacctgatg aacaacgcca tcatcgacaa ttacttggcg gtggggcggc    16260
agaacggggt gctggagagc gacatcgcg tgaagttcga cactaggaac ttcaggctgg     16320
gctgggaccc cgtgaccgag ctggtcatgc ccggggtgta caccaacgag gctttccatc    16380
ccgatattgt cttgctgccc ggctgcgggg tggacttcac cgagagccgc ctcagcaacc    16440
tgctgggcat tcgcaagagg cagcccttcc aggaaggctt ccagatcatg tacgaggatc    16500
tggagggggg caacatcccc gcgctcctgg atgtcgacgc ctatgagaaa gcaaggagg    16560 atgcagcagc tgaagcaact gcagccgtag ctaccgcctc taccgaggtc aggggcgata    16620 atttgcaag cgccgcagca gtggcagcgg ccgaggcggc tgaaaccgaa agtaagatag    16680
tcattcagcc ggtggagaag gatagcaaga acaggagcta caacgtacta ccggacaaga    16740
taaacaccgc ctaccgcagc tggtacctag cctacaacta tggcgacccc gagaagggcg    16800
tgcgctcctg gacgctgctc accacctcgg acgtcacctg cggcgtggag caagtctact    16860
ggtcgctgcc cgacatgatg caagaccggg tcaccttccg ctccacgcgt caagttagca    16920 actaccggt ggtgggcgcc gagctcctgc ccgtctactc caagagcttc ttcaacgagc     16980
aggccgtcta ctcgcagcag ctgcgcgcct tcacctcgct tacgcacgtc ttcaaccgct    17040
tccccgagaa ccagatcctc gtccgcccgc ccgcgcccac cattaccacc gtcagtgaaa    17100
acgttcctgc tctcacagat cacgggaccc tgccgctgcg cagcagtatc cggggagtcc    17160
agcgcgtgac cgttactgac gccagacgcc gcacctgccc ctacgtctac aaggccctgg    17220
gcatagtcgc gccgcgcgtc ctctcgagcc gcaccttcta aatgtccatt ctcatctcgc    17280
ccagtaataa caccggttgg ggcctgcgcg cgccagcaa gatgtacgga ggcgctcgcc     17340
aacgctccac gcaacaccc gtgcgcgtgc gcgggcactt ccgcgctccc tggggcgccc     17400
tcaagggccg cgtgcggtcg cgcaccaccg tcgacgacgt gatcgaccag gtggtggccg    17460
acgcgcgcaa ctacaccccc gccgcgcgc ccgtctccac cgtggacgcc gtcatcgaca     17520
gcgtggtggc ggacgcgcgc cggtacgccc gcgccaagag ccggcggcgg cgcatcgccc    17580
```

```
ggcggcaccg gagcacccccc gccatgcgcg cggcgcgagc cttgctgcgc agggccaggc    17640
gcacgggacg cagggccatg ctcagggcgg ccagacgcgc ggcttcaggc gccagcgccg    17700
gcaggacccg gagacgcgcg gccacggcgg cggcagcggc catcgccagc atgtcccgcc    17760
cgcggcgagg gaacgtgtac tgggtgcgcg acgccgccac cggtgtgcgc gtgcccgtgc    17820
gcacccgccc ccctcgcact tgaagatgtt cacttcgcga tgttgatgtg tcccagcggc    17880
gaggaggatg tccaagcgca aattcaagga agagatgctc caggtcatcg cgcctgagat    17940
ctacggccct gcggtggtga aggaggaaag aaagccccgc aaaatcaagc gggtcaaaaa    18000
ggacaaaaag gaagaagaaa gtgatgtgga cggattggtg gagtttgtgc gcgagttcgc    18060
cccccggcgg cgcgtgcagt ggcgcgggcg gaaggtgcaa ccggtgctga gacccggcac    18120
caccgtggtc ttcacgcccg cgagcgctc cggcaccgct tccaagcgct cctacgacga    18180
ggtgtacggg gatgatgata ttctggagca ggcggccgag cgcctgggcg agtttgctta    18240
cggcaagcgc agccgttccg caccgaagga agaggcggtg tccatcccgc tggaccacgg    18300
caaccccacg ccgagcctca gcccgtgac cttgcagcag gtgctgccga ccgcggcgcc    18360
gcgccggggg ttcaagcgcg agggcgagga tctgtacccc accatgcagc tgatggtgcc    18420
caagcgccag aagctggaag acgtgctgga gaccatgaag gtggaccccgg acgtgcagcc    18480 cgaggtcaag gtgcggccca tcaagcaggt ggccccgggc ctgggcgtgc agaccgtgga    18540
catcaagatt cccacggagc ccatggaaac gcagaccgag cccatgatca gcccagcac    18600 cagcaccatg gaggtgcaga cggatccctg gatgccatcg gctcctagtc gaagaccccg    18660
gcgcaagtac ggcgcggcca gcctgctgat gcccaactac gcgctgcatc cttccatcat    18720
ccccacgccg ggctaccgcg gcacgcgctt ctaccgcggt cataccagca gccgccgccg    18780
caagaccacc actcgccgcc gccgtcgccg caccgccgct gcaaccaccc ctgccgccct    18840
ggtgcggaga gtgtaccgcc gcggccgcgc acctctgacc ctgccgcgcg cgcgctacca    18900
cccgagcatc gccatttaaa cttttcgccag cttttgcagat caatggcccct cacatgccgc    18960 cttcgcgttc ccattacggg ctaccgagga agaaaaccgc gccgtagaag gctggcgggg    19020
aacgggatgc gtcgccacca ccaccggcgg cggcgcgcca tcagcaagcg gttgggggga    19080
ggcttcctgc ccgcgctgat ccccatcatc gccgcggcga tcgggcgat ccccggcatt    19140 gcttccgtgg cggtgcaggc ctctcagcgc cactgagaca cacttggaaa catcttgtaa    19200
taaacccatg gactctgacg ctcctggtcc tgtgatgtgt tttcgtagac agatggaaga    19260
catcaatttt tcgtccctgg ctccgcgaca cggcacgcgg ccgttcatgg gcacctggag    19320
cgacatcggc accagccaac tgaacggggg cgccttcaat tggagcagtc tctggagcgg    19380
gcttaagaat ttcgggtcca cgcttaaaac ctatggcagc aaggcgtgga acagcaccac    19440
agggcaggcg ctgagggata agctgaaaga gcagaacttc cagcagaagg tggtcgatgg    19500
gctcgcctcg ggcatcaacg gggtggtgga cctggccaac caggccgtgc agcggcagat    19560
caacagccgc ctggacccgg tgccgcccgc cggctccgtg gagatgccgc aggtggagga    19620
ggagctgcct cccctggaca agcggggcga gaagcgaccc cgccccgatg cggaggagac    19680
gctgctgacg cacacggacg agccgccccc gtacgaggag gcggtgaaac tgggtctgcc    19740
caccacgcgg cccatcgcgc ccctggccac cggggtgctg aaacccgaaa agcccgcgac    19800
cctggacttg cctcctcccc agccttcccg ccctctaca gtggctaagc ccctgccgcc    19860
ggtggccgtg gcccgcgcgc gacccggggg caccgcccgc cctcatgcga actggcagag    19920
```

-continued

```
cactctgaac agcatcgtgg gtctgggagt gcagagtgtg aagcgccgcc gctgctatta    19980
aacctaccgt agcgcttaac ttgcttgtct gtgtgtgtat gtattatgtc gccgccgccg    20040
ctgtccacca gaaggaggag tgaagaggcg cgtcgccgag ttgcaagatg gccacccat     20100
cgatgctgcc ccagtgggcg tacatgcaca tcgccggaca ggacgcttcg gagtacctga    20160
gtccgggtct ggtgcagttt gcccgcgcca cagacaccta cttcagtctg gggaacaagt    20220
ttaggaaccc cacggtggcg cccacgcacg atgtgaccac cgaccgcagc cagcggctga    20280
cgctgcgctt cgtgcccgtg gaccgcgagg acaacaccta ctcgtacaaa gtgcgctaca    20340
cgctggccgt gggcgacaac cgcgtgctgg acatggccag cacctacttt gacatccgcg    20400
gcgtgctgga tcggggccct agcttcaaac cctactccgg caccgcctac aacagtctgg    20460
cccccaaggg agcacccaac acttgtcagt ggacatataa agccgatggt acagaaaaaa    20520
cctatacata tggaaatgca cccgtgcagg gcattaacat cacaaaagat ggtattcaac    20580
ttggaactga caccgatgat cagccaatct acgcagataa aacctatcag cctgaacctc    20640
aagtgggtga tgctgaatgg catgacatca ctggtactga tgaaaagtat ggaggcagag    20700
ctcttaagcc tgataccaaa atgaagcctt gttatggttc ttttgccaag cctactaata    20760
aagaaggagg tcaggcaaat gtgaaaacag gaacaggcac tactaaagaa tatgacatag    20820
acatggcttt cttttgacaac agaagtgcgg ctgctgctgg cctagctcca gaaattgttt    20880
tgtatactga aaatgtggat ttggaaactc cagatacccca tattgtatac aaagcaggca    20940
cagatgacag cagctcttct attaatttgg gtcagcaagc catgcccaac agacctaact    21000
acattggttt cagagacaac tttatcgggc tcatgtacta caacagcact ggcaatatgg    21060
gggtgctggc cggtcaggct tctcagctga atgctgtggt tgacttgcaa gacagaaaca    21120
ccgagctgtc ctaccagctc ttgcttgact ctctgggtga cagaacccgg tatttcagta    21180
tgtggaatca ggcggtggac agctatgatc ctgatgtgcg cattattgaa aatcatggtg    21240
tggaggatga acttcccaac tattgtttcc ctctggatgc tgttggcaga acagatactt    21300
atcagggaat taaggctaat ggaactgatc aaaccacatg gaccaaagat gacagtgtca    21360
atgatgctaa tgagataggc aagggtaatc cattcgccat ggaaatcaac atccaagcca    21420
acctgtggag gaacttcctc tacgccaacg tggccctgta cctgcccgac tcttacaagt    21480
acacgccggc caatgttacc ctgcccacca acaccaacac ctacgattac atgaacggcc    21540
gggtggtggc gccctcgctg gtggactcct acatcaacat cggggcgcgc tggtcgctgg    21600
atcccatgga caacgtgaac cccttcaacc accaccgcaa tgcggggctg cgctaccgct    21660
ccatgctcct gggcaacggg cgctacgtgc ccttccacat ccaggtgccc cagaaatttt    21720
tcgccatcaa gagcctcctg ctcctgcccg ggtcctacac ctacgagtgg aacttccgca    21780
aggacgtcaa catgatcctg cagagctccc tcggcaacga cctgcgcacg gacggggcct    21840
ccatctcctt caccagcatc aacctctacg ccaccttctt ccccatggcg cacaacacgg    21900
cctccacgct cgaggccatg ctgcgcaacg acaccaacga ccagtccttc aacgactacc    21960
tctcggcggc caacatgctc taccccatcc cggccaacgc caccaacgtg cccatctcca    22020
tccctcgcg caactgggcc gccttccgcg gctggtcctt cacgcgtctc aagaccaagg    22080
agacgccctc gctgggctcc gggttcgacc cctacttcgt ctactcgggc tccatcccct    22140
acctcgacgg caccttctac ctcaaccaca ccttcaagaa ggtctccatc accttcgact    22200
cctccgtcag ctgccccggc aacgaccggc tcctgacgcc aacgagttc gaaatcaagc    22260
gcaccgtcga cggcgagggc tacaacgtgg cccagtgcaa catgaccaag gactggttcc    22320
```

```
tggtccagat gctggcccac tacaacatcg gctaccaggg cttctacgtg cccgagggct   22380
acaaggaccg catgtactcc ttcttccgca acttccagcc catgagccgc caggtggtgg   22440
acgaggtcaa ctacaaggac taccaggccg tcaccctggc ctaccagcac aacaactcgg   22500
gcttcgtcgg ctacctcgcg cccaccatgc gccagggcca gccctacccc gccaactacc   22560
cctacccgct catcggcaag agcgccgtca ccagcgtcac ccagaaaaag ttcctctgcg   22620
acagggtcat gtggcgcatc cccttctcca gcaacttcat gtccatgggc gcgctcaccg   22680
acctcggcca gaacatgctc tatgccaact ccgcccacgc gctagacatg aatttcgaag   22740
tcgaccccat ggatgagtcc acccttctct atgttgtctt cgaagtcttc gacgtcgtcc   22800
gagtgcacca gccccaccgc ggcgtcatcg aggccgtcta cctgcgcacc cccttctcgg   22860
ccggtaacgc caccacctaa gctcttgctt cttgcaagcc atggccgcgg gctccggcga   22920
gcaggagctc agggccatca tccgcgacct gggctgcggg ccctacttcc tgggcacctt   22980
cgataagcgc ttcccgggat tcatggcccc gcacaagctg gcctgcgcca tcgtcaacac   23040
ggccggccgc gagaccgggg gcgagcactg gctggccttc gcctggaacc cgcgctcgaa   23100
cacctgctac ctcttcgacc ccttcgggtt ctcggacgag cgcctcaagc agatctacca   23160
gttcgagtac gagggcctgc tgcgccgcag cgccctggcc accgaggacc gctgcgtcac   23220
cctggaaaag tccacccaga ccgtgcaggg tccgcgctcg gccgcctgcg ggctcttctg   23280
ctgcatgttc ctgcacgcct tcgtgcactg gcccgaccgc cccatggaca agaacccac   23340 catgaacttg ctgacggggg tgcccaacgg catgctccag tcgccccagg tggaacccac   23400
cctgcgccgc aaccaggagg cgctctaccg cttcctcaac tcccactccg cctactttcg   23460
ctcccaccgc gcgcgcatcg agaaggccac cgccttcgac cgcatgaatc aagacatgta   23520
aaccgtgtgt gtatgttaaa tgtctttaat aaacagcact ttcatgttac acatgcatct   23580
gagatgattt atttagaaat cgaaagggtt ctgccgggtc tcggcatggc ccgcgggcag   23640
ggacacgttg cggaactggt acttggccag ccacttgaac tcggggatca gcagtttggg   23700
cagcggggtg tcggggaagg agtcggtcca cagcttccgc gtcagttgca gggcgcccag   23760
caggtcgggc gcggagatct tgaaatcgca gttgggaccc gcgttctgcg cgcgggagtt   23820
gcggtacacg gggttgcagc actggaacac catcagggcc gggtgcttca cgctcgccag   23880
caccgtcgcg tcggtgatgc tctccacgtc gaggtcctcg gcgttggcca tcccgaaggg   23940
ggtcatcttg caggtctgcc ttcccatggt gggcacgcac ccgggcttgt ggttgcaatc   24000
gcagtgcagg gggatcagca tcatctgggc ctggtcggcg ttcatccccg ggtacatggc   24060
cttcatgaaa gcctccaatt gcctgaacgc ctgctgggcc ttggctccct cggtgaagaa   24120
gaccccgcag gacttgctag agaactggtt ggtggcgcac ccggcgtcgt gcacgcagca   24180
gcgcgcgtcg ttgttggcca gctgcaccac gctgcgcccc cagcggttct gggtgatctt   24240
ggcccggtcg gggttctcct tcagcgcgcg ctgcccgttc tcgctcgcca tccatctc   24300 gatcatgtgc tccttctgga tcatggtggt cccgtgcagg caccgcagct gccctcggc   24360 ctcggtgcac ccgtgcagcc acagcgcgca cccggtgcac tcccagttct tgtgggcgat   24420
ctgggaatgc gcgtgcacga agccctgcag gaagcggccc atcatggtgg tcaggtctt   24480 gttgctagtg aaggtcagcg gaatgccgcg gtgctcctcg ttgatgtaca ggtggcagat   24540
gcggcggtac acctcgccct gctcgggcat cagctggaag ttggctttca ggtcggtctc   24600
cacgcggtag cggtccatca gcatagtcat gatttccata cccttctccc aggccgagac   24660
```

```
gatgggcagg ctcatagggt tcttcaccat catcttagcg ctagcagccg cggccagggg    24720
gtcgctctcg tccagggtct caaagctccg cttgccgtcc ttctcggtga tccgcaccgg    24780
ggggtagctg aagcccacgg ccgccagctc ctcctcggcc tgtctttcgt cctcgctgtc    24840
ctggctgacg tcctgcagga ccacatgctt ggtcttgcgg ggtttcttct tgggcggcag    24900
cggcggcgga gatgttggag atggcgaggg ggagcgcgag ttctcgctca ccactactat    24960
ctcttcctct tcttggtccg aggccacgcg gcggtaggta tgtctcttcg ggggcagagg    25020
cggaggcgac gggctctcgc cgccgcgact tggcggatgg ctggcagagc cccttccgcg    25080 ttcggggtg cgctcccggc ggcgctctga ctgacttcct ccgcggccgg ccattgtgtt    25140
ctcctaggga ggaacaacaa gcatggagac tcagccatcg ccaacctcgc catctgcccc    25200
caccgccgac gagaagcagc agcagcgaaa tgaaagctta accgcccgc cgcccagccc     25260 cgccacctcc gacgcggccg tcccagacat gcaagagatg gaggaatcca tcgagattga    25320
cctgggctat gtgacgcccg cggagcacga ggaggagctg gcagtgcgct tttcacaaga    25380
agagatacac caagaacagc cagagcagga agcagagaat gagcagagtc aggctgggct    25440
cgagcatgac ggcgactacc tccacctgag cggggggag gacgcgctca tcaagcatct    25500
ggcccggcag gccaccatcg tcaaggatgc gctgctcgac cgcaccgagg tgcccctcag    25560
cgtggaggag ctcagccgcg cctacgagtt gaacctcttc tcgccgcgcg tgccccccaa    25620
gcgccagccc aatggcacct gcgagcccaa cccgcgcctc aacttctacc cggtcttcgc    25680
ggtgcccgag gccctggcca cctaccacat cttttttcaag aaccaaaaga tccccgtctc    25740
ctgccgcgcc aaccgcaccc gcgccgacgc ccttttcaac ctgggtcccg cgcccgcct    25800 acctgatatc gcctccttgg aagaggttcc caagatcttc gagggtctgg gcagcgacga    25860
gactcgggcc gcgaacgctc tgcaaggaga aggaggagag catgagcacc acagcgccct    25920
ggtcgagttg gaaggcgaca cgcgcggct ggcggtgctc aaacgcacgg tcgagctgac    25980
ccatttcgcc tacccggctc tgaacctgcc ccccaaagtc atgagcgcgg tcatggacca    26040
ggtgctcatc aagcgcgcgt cgcccatctc cgaggacgag ggcatgcaag actccgagga    26100
gggcaagccc gtggtcagcg acgagcagct ggcccgtgg ctgggtccta atgctagtcc    26160
ccagagtttg aagagcggc gcaaactcat gatggccgtg gtcctggtga ccgtggagct    26220
ggagtgcctg cgccgcttct tcgccgacgc ggagaccctg cgcaaggtcg aggagaacct    26280
gcactacctc ttcaggcacg ggttcgtgcg ccaggcctgc aagatctcca acgtggagct    26340
gaccaacctg gtctcctaca tgggcatctt gcacgagaac cgcctggggc agaacgtgct    26400
gcacaccacc ctgcgcgggg aggcccggcg cgactacatc gcgactgcg tctacctcta    26460 cctctgccac acctgcagaa cgggcatggg cgtgtggcag cagtgtctgg aggagcagaa    26520
cctgaaagag ctctgcaagc tcctgcagaa gaacctcaag ggtctgtgga ccgggttcga    26580
cgagcgcacc accgctcgg acctggccga cctcattttc cccgagcgcc tcaggctgac    26640
gctgcgcaac ggcctgcccg actttatgag ccaaagcatg ttgcaaaact ttcgctcttt    26700
catcctcgaa cgctccggaa tcctgcccgc cacctgctcc gcgctgccct cggacttcgt    26760
gccgctgacc ttccgcgagt gccccccgcc gctgtggagc cactgctacc tgctgcgcct    26820
ggccaactac ctggcctacc actcggacgt gatcgaggac gtcagcggcg agggcctgct    26880
cgagtgccac tgccgctgca acctctgcac gccgcaccgc tccctggcct gcaaccccca    26940
gctgctgagc gagacccaga tcatcggcac cttcgagttg caaggcccca gcgaaggcga    27000
gggttcagcc gccaagggg gtctgaaact caccccgggg ctgtggacct cggcctactt    27060
```

```
gcgcaagttc gtgcccgagg actaccatcc cttcgagatc aggttctacg aggaccaatc   27120
ccatccgccc aaggccgagc tgtcggcctg cgtcatcacc caggggggcga tcctggccca   27180 attgcaagcc atccagaaat cccgccaaga attcttgctg aaaaagggcc gcggggtcta   27240
cctcgacccc cagaccggtg aggagctcaa ccccggcttc ccccaggatg ccccgaggaa   27300
acaagaagct gaaagtggag ctgccgcccg tggaggattt ggaggaagac tgggagaaca   27360
gcagtcaggc agaggaggag gagatggagg aagactggga cagcactcag gcagaggagg   27420
acagcctgca agacagtctg gaggaagacg aggaggaggc agaggaggag gtggaagaag   27480
cagccgccgc cagaccgtcg tcctcggcgg gggagaaagc aagcagcacg gataccatct   27540
ccgctccggg tcgggtccc gctcgaccac acagtagatg ggacgagacc ggacgattcc   27600
cgaaccccac cacccagacc ggtaagaagg agcggcaggg atacaagtcc tggcgggggc   27660
acaaaaacgc catcgtctcc tgcttgcagg cctgcggggg caacatctcc ttcacccggc   27720
gctacctgct cttccaccgc ggggtgaact ttccccgcaa catcttgcat tactaccgtc   27780
acctccacag cccctactac ttccaagaag aggcagcagc agcagaaaaa gaccagcaga   27840
aaaccagcag ctagaaaatc cacagcgcg cagcaggtg gactgaggat cgcggcgaac   27900
gagccggcgc aaacccggga gctgaggaac cggatctttc ccaccctcta tgccatcttc   27960
cagcagagtc gggggcagga gcaggaactg aaagtcaaga accgttctct gcgctcgctc   28020
acccgcagtt gtctgtatca aagagcgaa gaccaacttc agcgcactct cgaggacgcc   28080
gaggctctct tcaacaagta ctgcgcgctc actcttaaag agtagcccgc gcccgcccag   28140
tcgcagaaaa aggcgggaat tacgtcacct gtgcccttcg ccctagccgc ctccacccat   28200
catcatgagc aaagagattc ccacgcctta catgtggagc taccagcccc agatgggcct   28260
ggccgccggt gccgcccagg actactccac ccgcatgaat tggctcagcg ccgggccgc   28320 gatgatctca cgggtgaatg acatccgcgc ccaccgaaac cagatactcc tagaacagtc   28380
agcgctcacc gccacgcccc gcaatcacct caatccgcgt aattggcccg ccgccctggt   28440
gtaccaggaa attccccagc ccacgaccgt actacttccg cgagacgccc aggccgaagt   28500
ccagctgact aactcaggtg tccagctggc gggcggcgcc accctgtgtc gtcaccgccc   28560
cgctcagggt ataaagcggc tggtgatccg gggcagaggc acacagctca acgacgaggt   28620
ggtgagctct tcgctgggtc tgcgacctga cggagtcttc caactcgccg gatcggggag   28680
atcttccttc acgcctcgtc aggccgtcct gactttggag agttcgtcct cgcagccccg   28740 ctcggggtggc atcggcactc tccagttcgt ggaggagttc actccctcgg tctacttcaa   28800
ccccttctcc ggctcccccg gccactaccc ggacgagttc atcccgaact tcgacgccat   28860
cagcgagtcg gtgacggct acgattgaat gtcccatggt ggcgcagctg acctagctcg   28920
gcttcgacac ctggaccact gccgccgctt ccgctgcttc gctcgggatc tcgccgagtt   28980
tgcctacttt gagctgcccg aggagcaccc tcagggcccg gccacgagg tgcggatcgt   29040 cgtcgaaggg ggcctcgact cccacctgct tcggatcttc agccagcgtc cgatcctggt   29100
cgagcgcgag caaggacaga cccttctgac tctgtactgc atctgcaacc accccggcct   29160
gcatgaaagt ctttgttgtc tgctgtgtac tgagtataat aaaagctgag atcagcgact   29220
actccggact tccgtgtgtt cctgaatcca tcaaccagtc tttgttcttc accgggaacg   29280
agaccgagct ccagctccag tgtaagcccc acaagaagta cctcacctgg ctgttccagg   29340
gctccccgat cgccgttgtc aaccactgcg acaacgacgg agtcctgctg agcggccctg   29400
```

```
ccaaccttac ttttcccacc cgcagaagca agctccagct cttccaaccc ttcctccccg   29460
ggacctatca gtgcgtctcg ggaccctgcc atcacacctt ccacctgatc ccgaatacca   29520
cagcgtcgct ccccgctact aacaaccaaa ctaacctcca ccaacgccac cgtcgcgacc   29580
gcggacatgt acagagctcg agaagtacta ggccacaata catgcccata ttagactatg   29640
aggccgagcc acagcgaccc atgctccccg ctattagtta cttcaatcta accggcggag   29700
atgactgacc cactgccaa caacaacgtc aacgaccttc tcctggacat ggacggccgc   29760
gcctcggagc agcgactcgc ccaacttcgc attcgccagc agcaggagag agccgtcaag   29820
gagctgcagg atgcgtggc catccaccag tgcaagagag gcatcttctg cctggtgaaa   29880
caggccaaga tctcctacga ggtcactcca aacgaccatc gcctctccta cgagctcctg   29940
cagcagcgcc agaagttcac ctgcctggtc ggagtcaacc ccatcgtcat cacccagcag   30000
tctggcgata ccaaggggtg catccactgc tcctgcgact cccccgactg cgtccacact   30060
ctgatcaaga ccctctgcgg cctccgcgac ctcctcccca tgaactaatc acccccttat   30120
ccagtgaaat aaagatcata ttgatgatga ttttacagaa ataaaaaata atcatttgat   30180
ttgaaataaa gatacaatca tattgatgat ttgagtttaa caaaaaaata aagaatcact   30240
tacttgaaat ctgataccag gtctctgtcc atgttttctg ccaacaccac ttcactcccc   30300
tcttcccagc tctggtactg caggccccgg cgggctgcaa acttcctcca cacgctgaag   30360
gggatgtcaa attcctcctg tccctcaatc ttcattttat cttctatcag atgtccaaaa   30420
agcgcgtccg ggtggatgat gacttcgacc ccgtctaccc ctacgatgca gacaacgcac   30480
cgaccgtgcc cttcatcaac ccccccttcg tctcttcaga tggattccaa gagaagcccc   30540
tgggggtgtt gtccctgcga ctggccgacc ccgtcaccac caagaacggg gaaatcaccc   30600
tcaagctggg agaggggtg gacctcgatt cctcgggaaa actcatctcc aacacggcca   30660
ccaaggccgc cgcccctctc agttttttcca acaacaccat ttcccttaac atggatcacc   30720
ccttttacac taaagatgga aaattatcct tacaagtttc tccaccatta aatatactga   30780
gaacaagcat tctaaacaca ctagctttag gttttggatc aggtttagga ctccgtggct   30840
ctgccttggc agtacagtta gtctctccac ttacatttga tactgatgga aacataaagc   30900
ttaccttaga cagaggtttg catgttacaa caggagatgc aattgaaagc aacataagct   30960
gggctaaagg tttaaaattt gaagatggag ccatagcaac caacattgga aatgggttag   31020
agtttggaag cagtagtaca gaaacaggtg ttgatgatgc ttacccaatc caagttaaac   31080
ttggatctgg ccttagcttt gacagtacag gagccataat ggctggtaac aaagaagacg   31140
ataaactcac tttgtggaca acacctgatc catcaccaaa ctgtcaaata ctcgcagaaa   31200
atgatgcaaa actaacactt tgcttgacta aatgtggtag tcaaatactg gccactgtgt   31260
cagtcttagt tgtaggaagt ggaaacctaa accccattac tggcaccgta agcagtgctc   31320
aggtgttttct acgttttgat gcaaacggtg ttcttttaac agaacattct acactaaaaa   31380
aatactgggg gtataggcag ggagatagca tagatggcac tccatatacc aatgctgtag   31440
gattcatgcc caatttaaaa gcttatccaa agtcacaaag ttctactact aaaaataata   31500
tagtagggca agtatacatg aatggagatg tttcaaaacc tatgcttctc actataaccc   31560
tcaatggtac tgatgacagc aacagtacat attcaatgtc attttcatac acctggacta   31620
atggaagcta tgttggagca acatttgggg ctaactctta taccttctca tacatcgccc   31680
aagaatgaac actgtatccc accctgcatg ccaaccttc ccaccccact ctgtggaaca   31740
aactctgaaa cacaaaataa aataaagttc aagtgtttta ttgattcaac agttttacag   31800
```

```
gattcgagca gttattttc ctccacccctc caggacatg gaatacacca ccctctcccc      31860
ccgcacagcc ttgaacatct gaatgccatt ggtgatggac atgcttttgg tctccacgtt      31920
ccacacagtt tcagagcgag ccagtctcgg gtcggtcagg gagatgaaac cctccgggca      31980
ctcccgcatc tgcacctcac agctcaacag ctgaggattg tcctcggtgg tcgggatcac      32040
ggttatctgg aagaagcaga agagcggcgg tgggaatcat agtccgcgaa cgggatcggc      32100
cggtggtgtc gcatcaggcc ccgcagcagt cgctgccgcc gccgctccgt caagctgctg      32160
ctcagggggt ccgggtccag ggactccctc agcatgatgc ccacggccct cagcatcagt      32220
cgtctggtgc ggcgggcgca gcagcgcatg cggatctcgc tcaggtcgct gcagtacgtg      32280
caacacagaa ccaccaggtt gttcaacagt ccatagttca acacgctcca gccgaaactc      32340
atcgcgggaa ggatgctacc cacgtggccg tcgtaccaga tcctcaggta aatcaagtgg      32400 tgcccctcc agaacacgct gcccacgtac atgatctcct tgggcatgtg gcggttcacc      32460 acctccggt accacatcac cctctggttg aacatgcagc cccggatgat cctgcggaac      32520
cacagggcca gcaccgcccc gcccgccatg cagcgaagag accccgggtc ccggcaatgg      32580
caatggagga cccaccgctc gtacccgtgg atcatctggg agctgaacaa gtctatgttg      32640
gcacagcaca ggcatatgct catgcatctc ttcagcactc tcaactcctc gggggtcaaa      32700
accatatccc agggcacggg gaactcttgc aggacagcga accccgcaga acagggcaat      32760
cctcgca                                                                32767

<210> SEQ ID NO 2
<211> LENGTH: 1479
<212> TYPE: DNA
<213> ORGANISM: Artificial Sequence
<220> FEATURE:
<223> OTHER INFORMATION: Vector
<220> FEATURE:
<223> OTHER INFORMATION: K9 Melapoly

<400> SEQUENCE: 2
ttcctgccct ggcaccggct gttcggccag atgaagaacg gcagcacccc catgttcctg        60
agccccgcca gcttcttcag cagctggacc cccatgttca cgacattaa tatctacgtg       120 gagttctgcc tgagcctgac ccagtacctg gccctgcggc ggcaccggcc cctgcagagc       180
agcatgcaca acgccctgca catctacatg ctgctgatgt tgcccttcat ccccctgtac       240
cggttcctgc tgcggtggga gcaggagatc agcagcaagg acctgggcta cgactacgcc       300
gcggcagcca aggcctggaa ccggcagctg taccccgagt ggcgagccct ggtggtgacc       360
cacacctaca aggtgctgcc cgacggccag gtgatctggc tgatggccgt ggtgctggcc       420
agcctgatct accaggtgtg gggcggccag cccgtgtacc actggaccat ggaggtgacc       480
gtgtaccacc ggcagctgtt caccatcacc gaccaggtgc ccttcagcct ggcccgtgcc       540
ctggtggtga cccacaccta cgtgctgatg gccgtggtgc tggcggctgc agccaactac       600
ttcgtgtgga cccactacta cagcaccacc tacagcttca gcctgcccta ctggaacttc       660
gtgaccgcct actacatcag ccccaacagc gtgttcagcc agtggacccc ccagttcgag       720
aaccggaacg tggcccggcc catggtgcag cggtacagca acagcaccaa cagcttccgg       780
ctgcacaacc tggcccacct gttcctgctg ttccagcagg cccgggctca gttccggagc       840
cggcagtaca acatggtgcc cttctgggca ctgatcttcg gcaccgccag ctacatcttc       900
ttccccctgc tgctgttcgt gaccgccccc gacaacctgg gctacgcggc tgcggcggcc       960
```

-continued

```
agcttcgccc tgccctactg gaacttccag ccctacatga gcctgcacaa cctggtgcac    1020
agcttcgtgg ccctggtgct gcacagcttc accgacgcca tcttcctgca gctgaccagc    1080
gaccagctgg gctacagcta cccctacctg cagtaccggc ggctgcggaa gggctacagc    1140
gccgcagctg ctgccctgta ccgggccagc gagcacctgg agctgatctt cctgtacgac    1200
ggcatcgagg acggcatcga gcacttctgg aaggtgttca acaccatggg cctgtacggc    1260
ctgtacgacc tgctgatgac cgtgctgggc atcatcttca tgccccgggg ccagaagagc    1320
aagctgctgt acgacggcat cgagcacttc atgttcaagt tcctggtgaa ggagaactac    1380
ctggagtacg tgcccaacag cgaccccccc cggtacttcg tgtggaaggt gttcaacacc    1440
atgggcctgt acaaggtgct ggagttcctg gccaaggtg                           1479
```

<210> SEQ ID NO 3
<211> LENGTH: 483
<212> TYPE: PRT
<213> ORGANISM: Artificial Sequence
<220> FEATURE:
<223> OTHER INFORMATION: Insert
<220> FEATURE:
<223> OTHER INFORMATION: Inserted Amino Acid Sequence

<400> SEQUENCE: 3

```
Phe Leu Pro Trp His Arg Leu Phe Gly Gln Met Lys Asn Gly Ser Thr
  1               5                  10                  15

Pro Met Phe Leu Ser Pro Ala Ser Phe Ser Ser Trp Thr Pro Met
             20                  25                  30

Phe Asn Asp Ile Asn Ile Tyr Val Glu Phe Cys Leu Ser Leu Thr Gln
         35                  40                  45

Tyr Leu Ala Leu Arg Arg His Arg Pro Leu Gln Ser Ser Met His Asn
     50                  55                  60

Ala Leu His Ile Tyr Met Leu Leu Met Val Pro Phe Ile Pro Leu Tyr
 65                  70                  75                  80

Arg Phe Leu Leu Arg Trp Glu Gln Glu Ile Ser Ser Lys Asp Leu Gly
                 85                  90                  95

Tyr Asp Tyr Ala Ala Lys Ala Trp Asn Arg Gln Leu Tyr Pro Glu Trp
            100                 105                 110

Arg Ala Leu Val Val Thr His Thr Tyr Lys Val Leu Pro Asp Gly Gln
        115                 120                 125

Val Ile Trp Leu Met Ala Val Val Leu Ala Ser Leu Ile Tyr Gln Val
    130                 135                 140

Trp Gly Gly Gln Pro Val Tyr His Trp Thr Met Glu Val Thr Val Tyr
145                 150                 155                 160

His Arg Gln Leu Phe Thr Ile Thr Asp Gln Val Pro Phe Ser Leu Ala
                165                 170                 175

Arg Ala Leu Val Val Thr His Thr Tyr Val Leu Met Ala Val Val Leu
            180                 185                 190

Ala Ala Asn Tyr Phe Val Trp Thr His Tyr Tyr Ser Thr Thr Tyr Ser
        195                 200                 205

Phe Ser Leu Pro Tyr Trp Asn Phe Val Thr Ala Tyr Tyr Ile Ser Pro
    210                 215                 220

Asn Ser Val Phe Ser Gln Trp Thr Pro Gln Phe Glu Asn Arg Asn Val
225                 230                 235                 240

Ala Arg Pro Met Val Gln Arg Tyr Ser Asn Ser Thr Asn Ser Phe Arg
                245                 250                 255

Leu His Asn Leu Ala His Leu Phe Leu Leu Phe Gln Gln Ala Arg Ala
```

-continued

```
                260                 265                 270
Gln Phe Arg Ser Arg Gln Tyr Asn Met Val Pro Phe Trp Ala Leu Ile
            275                 280                 285
Phe Gly Thr Ala Ser Tyr Ile Phe Phe Pro Leu Leu Leu Phe Val Thr
            290                 295                 300
Ala Pro Asp Asn Leu Gly Tyr Ala Ala Ser Phe Ala Leu Pro Tyr Trp
305                 310                 315                 320
Asn Phe Gln Pro Tyr Met Ser Leu His Asn Leu Val His Ser Phe Val
                    325                 330                 335
Ala Leu Val Leu His Ser Phe Thr Asp Ala Ile Phe Leu Gln Leu Thr
                340                 345                 350
Ser Asp Gln Leu Gly Tyr Ser Tyr Pro Tyr Leu Gln Tyr Arg Arg Leu
            355                 360                 365
Arg Lys Gly Tyr Ser Ala Ala Leu Tyr Arg Ala Ser Glu His Leu Glu
        370                 375                 380
Leu Ile Phe Leu Tyr Asp Gly Ile Glu Asp Gly Ile Glu His Phe Trp
385                 390                 395                 400
Lys Val Phe Asn Thr Met Gly Leu Tyr Gly Leu Tyr Asp Leu Leu Met
                405                 410                 415
Thr Val Leu Gly Ile Ile Phe Met Pro Arg Gly Gln Lys Ser Lys Leu
                420                 425                 430
Leu Tyr Asp Gly Ile Glu His Phe Met Phe Lys Phe Leu Val Lys Glu
            435                 440                 445
Asn Tyr Leu Glu Tyr Val Pro Asn Ser Asp Pro Pro Arg Tyr Phe Val
    450                 455                 460
Trp Lys Val Phe Asn Thr Met Gly Leu Tyr Lys Val Leu Glu Phe Leu
465                 470                 475                 480
Ala Lys Val
```

MELANOMA CANINE VACCINE COMPOSITIONS AND METHODS OF USE THEREOF

CROSS REFERENCE TO RELATED APPLICATIONS

The present application is a 35 U.S.C. § 371 national phase application from, and claiming priority to, International Application No. PCT/US2019/053843, filed Sep. 30, 2019, which claims priority under 35 U.S.C. § 119(e) to U.S. Provisional Patent Application No. 62/739,443 filed Oct. 1, 2018, all of which are hereby incorporated by reference in their entireties.

BACKGROUND OF THE INVENTION

The incidence of skin cancer and particularly melanoma continues to rise worldwide. The number of new cases, in the US for 2012 is estimated to be 76,250 (8.6% increase compared to 2011) (Siegel, R., et al., Cancer statistics, 62, 10-29 2012). Similarly, skin tumors are part of the most frequent tumors in dogs (4% in females and 19.9% in males). Melanoma causes about 75% of skin cancer-related deaths and is distinguished by a high mutational rate, and an ability to induce spontaneous anti-tumor immunity. In the early stages, melanoma can be cured by surgical resection but once it progresses to the metastatic stage, it is extremely hard to treat and largely refractory to current therapies.

Despite recent advances in melanoma therapy, effective treatments remain a challenge. New investigations in cancer vaccines as well as adoptive T cell therapies are beginning to show efficacy in early phase clinical trials (Rosenberg, S. A. Science Translational Medicine 4, 127ps128, 2012). However, effective treatments available against companion animal cancers such as dogs are substantially lower than those available for humans.

Clearly, there is a need in the art for improving cancer treatments for dogs and for an innovative cancer vaccine strategy, such as melanoma canine vaccine. The present invention fulfills this need.

SUMMARY OF THE INVENTION

As described herein, the present invention relates to compositions and methods of use of a canine melanoma vaccine.

In one aspect, the invention includes a composition comprising a polynucleotide sequence of a nucleic acid delivery system, wherein the polynucleotide sequence further comprises a promoter sequence operably linked to a nucleic acid sequence encoding a heterologous protein comprising a canine tumor-specific antigen and an inhibitor of an immuno-inhibitory pathway.

In some embodiments, the nucleic acid delivery system is an adenovirus vector. In other embodiments, the adenovirus vector is a chimpanzee-derived adenovirus vector. In other embodiments, the chimpanzee-derived adenovirus vector is of serotype AdC68.

In some embodiments, the promoter is a constitutive promoter.

In some embodiments, the promoter is a cytomegalovirus immediate early promoter (CMV).

In some embodiments, the canine tumor-specific antigen is a canine melanoma polyepitope (K9Melapoly). In other embodiments, the K9Melapoly is encoded by a nucleic acid sequence of SEQ ID NO: 2 or by a nucleic acid sequence having at least 90, 91, 92, 93, 94, 95, 96, 97, 98, or 99% identity thereto. In other embodiments, the K9Melapoly is encoded by a nucleic acid sequence having at least 95% sequence identity to a nucleic acid sequence of SEQ ID NO: 2.

In some embodiments, the inhibitor of an immuno-inhibitory pathway is a herpes virus (HSV-1) glycoprotein D (gD).

In some embodiments, the polynucleotide sequence comprises a nucleic acid sequence of SEQ ID NO: 1 or a nucleic acid sequence having at least 90%, 91%, 92%, 93%, 94%, 95%, 96%, 97%, 98%, or 99% identity thereto.

In some embodiments, the polynucleotide sequence comprises a nucleic acid sequence having at least 95% sequence identity to a nucleic acid sequence of SEQ ID NO: 1.

In another aspect, the invention includes a protein expression system comprising a nucleic acid delivery system, wherein the nucleic acid delivery system further comprises a promoter operably linked to a heterologous protein comprising a canine tumor-specific antigen and an inhibitor of an immuno-inhibitory pathway.

In some embodiments, the nucleic acid delivery system comprises an adenovirus vector. In other embodiments, the adenovirus vector is encoded by a polynucleotide sequence comprising a nucleic acid sequence of SEQ ID NO: 1 or a nucleic acid sequence having at least 90%, 91%, 92%, 93%, 94%, 95%, 96%, 97%, 98%, or 99% identity thereto.

In another aspect, the invention includes a method of eliciting an immune response in a mammal against a canine tumor-specific antigen, the method comprising administering to the mammal a composition comprising a polynucleotide sequence of a nucleic acid delivery system, wherein the polynucleotide sequence further comprises a promoter sequence operably linked to a nucleic acid sequence encoding a heterologous protein comprising a canine tumor-specific antigen and an inhibitor of an immuno-inhibitory pathway.

In some embodiments, the polynucleotide sequence comprises a nucleic acid sequence of SEQ ID NO: 1 or a nucleic acid sequence having at least 90%, 91%, 92%, 93%, 94%, 95%, 96%, 97%, 98%, or 99% identity thereto.

In another aspect, the invention includes a method of treating and/or preventing melanoma in a mammal, the method comprising administering a therapeutically effective amount of a composition encoded by a polynucleotide sequence comprising a nucleic acid sequence of SEQ ID NO: 1 or a nucleic acid sequence having at least 90%, 91%, 92%, 93%, 94%, 95%, 96%, 97%, 98%, or 99% identity thereto.

In another aspect, the invention includes a method of vaccinating a mammal against melanoma, the method comprising administering to the mammal a pharmaceutically acceptable amount of the composition of previous aspects, wherein administration of the composition elicits an immune response in the mammal.

In some embodiments, the composition is administered prophylactically to the mammal. In other embodiments, the composition is administered therapeutically to the mammal.

In another aspect, the invention includes a method of generating a effector and memory T cell immune response to a canine tumor-specific antigen in a mammal, the method comprising the steps of: (a) administering the composition of the previous aspects to a mammal in an amount effective to elicit an immune response in the mammal; (b) administering a second effective amount of the nucleic acid delivery system of the previous aspects at a second, subsequent time period, wherein T memory cells directed against the canine tumor-specific antigen are reactivated and expanded in the mammal.

In some embodiments, the composition administered first in (a) and second in (b) comprises the same or a different canine tumor-specific antigens.

In some embodiments, the canine tumor-specific antigen is a canine melanoma polyepitope (K9Melapoly).

In some embodiments, the K9Melapoly is encoded by a nucleic acid sequence of SEQ ID NO: 2 or a nucleic acid sequence having at least 90%, 91%, 92%, 93%, 94%, 95%, 96%, 97%, 98%, or 99% identity thereto.

In other embodiments, the composition administered first in (a) and in (b) has a same or a different serotype.

In various embodiments of the above aspects, the mammal is a canine.

In various embodiments of the above aspects, the immune response comprises a T cell response directed against MAGBA, Tyrosinase, Trp-1, Trp-2 and PMEL (gp100).

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 1 is a series of graphs depicting the percentages of CD8$^+$ T cells producing individual factors. * indicates a positive response.

FIG. 2 is a series of graphs depicting the percentages of CD4$^+$ T cells producing individual factors. * indicates a positive response.

FIG. 3 is a series of graphs depicting the sum of the percentages of CD8$^+$ T cells and CD4$^+$ T cells producing individual factors, based on Boolean gating. * indicates a positive response.

FIG. 4 is a series of graphs showing the results from the Boolean gates. The highest CD8$^+$ T cell response was an IL-2 response directed against MAGBA followed by responses to Trp-2 and PMEL. This pattern was mirrored by CD4$^+$ T cells.

FIG. 5 is a series of graphs showing the different CD8$^+$ T cell responses to the peptide pool. All vaccinated mice showed a highly significant granzyme B-producing CD8$^+$ T cell response.

FIG. 6 is a graph demonstrating the marginal increases in IFN-γ and TNF-α production where the sum of responses was significantly higher in vaccinated animals.

FIG. 7 is a series of graphs showing the results from the Boolean gates where the production of granzyme B is significantly higher in CD8$^+$ T cells from vaccinated animals.

FIG. 8 is a series of graphs showing that CD4$^+$ T cell responses in spleen were low for all cytokines with slight but non-significant trends for increased IFN-γ and TNF-α responses.

FIG. 9 is a graph depicting the sum of the percentages of CD4$^+$ T cells producing factors (Granzyme B, IL-2, IFN-γ and TNF-α).

FIG. 10 is a graph showing the results from the Boolean gates where a very significant IFN-γ response is seen in vaccinated animals.

FIG. 11 is a series of graphs showing frequencies of CD8$^+$ T cells from the indicated subsets with cytokines at baseline (day 0) or on day 14 after vaccination. The graphs to the right in "FIG. 11, Continued" show the sum of all cytokine responses. Frequencies are percentage of cytokine positive T cells within the indicated subset. Data show percentage of cells producing cytokines in responses to the melanoma antigen specific peptide pool from which the percentage of cells producing cytokines in response to the diluent had been subtracted. The dotted lines at 0.1% indicate responses that are considered positive.

FIG. 12 is a series of graphs showing the results obtained by Boolean gating. The graphs on the left show results obtained for the different CD8$^+$ T cell subsets on days 0 and 14. The graphs on the right show results for day 14 from which day 0 data have been subtracted. I-IFN-γ, 2-IL-2, T-TNF-α.

FIG. 13 is a histogram depicting the percentage of dogs that showed positive responses of ≥0.1% in the different CD8 gates.

FIG. 14 is a series of graphs showing the frequencies of CD4$^+$ T cells from the indicated subsets with cytokines at baseline (day 0) or on day 14 after vaccination. The graphs to the right show the sum of all cytokine responses. Frequencies correspond to the percentage of cytokine positive T cells within the indicated subset. Data show percentage of cells producing cytokines in responses to the melanoma antigen specific peptide pool from which the percentage of cell producing cytokines in response to the diluent had been subtracted. The dotted lines at 0.1% indicate responses that are considered positive.

FIG. 15 is a series of graphs showing the results obtained by Boolean gating. The graphs on the left shows results obtained on days 0 and 14. The graphs on the right show results for day 14 after subtraction of day 0 results. I-IFN-γ, 2-IL-2, T-TNF-α.

FIG. 16 is a histogram depicting the percentage of dogs that showed positive responses of ≥0.1% in the different CD4 gates.

FIG. 17 is an image depicting the map of the vector C68 010 gD K9 melapoly (E1789) also referred herein as AdC68-gDK9Melapoly vector.

DETAILED DESCRIPTION OF THE INVENTION

Figure 1:
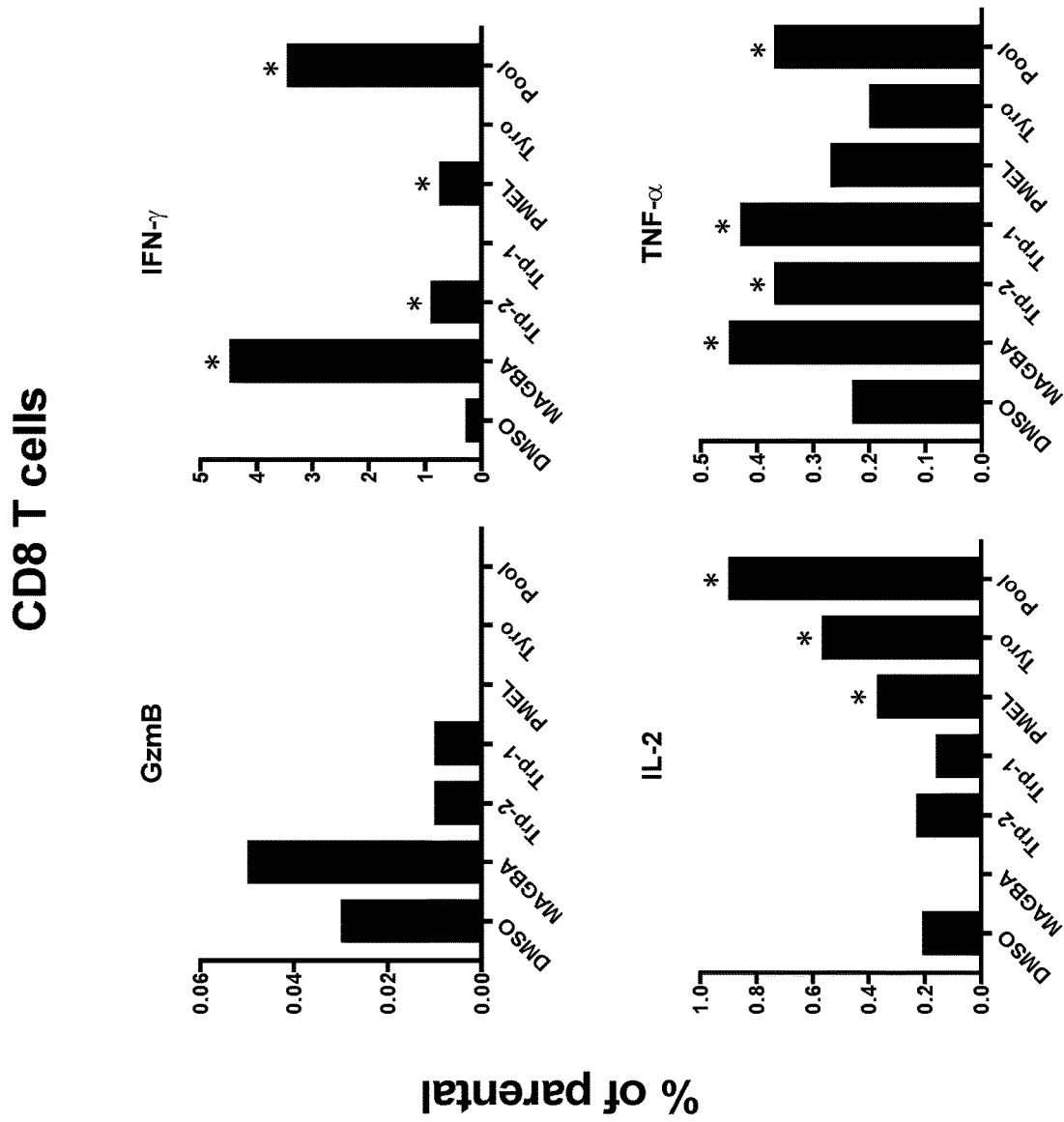
FIGS. 1-10 show results obtained in mice.

The present invention relates to compositions and methods for generating a nucleic acid delivery system comprising a nucleic acid sequence encoding a heterologous protein comprising fragments of several canine tumor-specific antigens (canine melanoma polyepitope (K9Melapoly)) and an inhibitor of an immuno-inhibitory pathway (HSV-1 gD). Additionally, the current invention includes compositions and methods of treating and/or preventing or immunizing a canine against melanoma, and methods of inducing an effector and memory T cell immune response in a canine administered the nucleic acid delivery system of the invention. Furthermore, the invention encompasses a pharmaceutical composition for vaccinating a canine as well as a protein expression system.

Definitions

Unless defined otherwise, all technical and scientific terms used herein have the same meaning as commonly understood by one of ordinary skill in the art to which the invention pertains. Although any methods and materials similar or equivalent to those described herein may be used in the practice for testing of the present invention, the preferred materials and methods are described herein. In describing and claiming the present invention, the following terminology will be used.

It is also to be understood that the terminology used herein is for the purpose of describing particular embodiments only and is not intended to be limiting.

As used herein, the articles "a" and "an" are used to refer to one or to more than one (i.e., to at least one) of the grammatical object of the article. By way of example, "an element" means one element or more than one element.

The term "ameliorating" or "treating" means that the clinical signs and/or the symptoms associated with a disease are lessened as a result of the actions performed. The signs or symptoms to be monitored will be well known to the skilled clinician.

As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

The term "biological" or "biological sample" refers to a sample obtained from an organism or from components (e.g., cells) of an organism. The sample may be of any biological tissue or fluid. Frequently the sample will be a "clinical sample" which is a sample derived from a patient. Such samples include, but are not limited to, bone marrow, cardiac tissue, sputum, blood, lymphatic fluid, blood cells (e.g., white cells), tissue or fine needle biopsy samples, urine, peritoneal fluid, and pleural fluid, or cells therefrom. Biological samples may also include sections of tissues such as frozen sections taken for histological purposes.

As used herein, "greater" refers to expression levels which are at least 10% or more, for example, 20%, 30%, 40%, or 50%, 60%, 70%, 80%, 90% higher or more, and/or 1.1 fold, 1.2 fold, 1.4 fold, 1.6 fold, 1.8 fold, 2.0 fold higher or more, and any and all whole or partial increments therebetween, than a control.

As used herein, the terms "control," or "reference" are used interchangeably and refer to a value that is used as a standard of comparison.

The term "immunogenicity" as used herein, refers to the innate ability of an antigen or organism to elicit an immune response in an animal when the antigen or organism is administered to the animal. Thus, "enhancing the immunogenicity" refers to increasing the ability of an antigen or organism to elicit an immune response in an animal when the antigen or organism is administered to an animal. The increased ability of an antigen or organism to elicit an immune response can be measured by, among other things, a greater number of antibodies that bind to an antigen or organism, a greater diversity of antibodies to an antigen or organism, a greater number of T-cells specific for an antigen or organism, a greater cytotoxic or helper T-cell response to an antigen or organism, a greater expression of cytokines in response to an antigen, and the like.

As used herein, the terms "eliciting an immune response" or "immunizing" refer to the process of generating a T cell (or B cell) response against a heterologous protein.

The term "activation", as used herein, refers to the state of a cell following sufficient cell surface moiety ligation to induce a noticeable biochemical or morphological change. Within the context of T cells, such activation refers to the state of a T cell that has been sufficiently stimulated to induce cellular proliferation. Activation of a T cell may also induce cytokine production and performance of regulatory or cytolytic effector functions. Within the context of other cells, this term infers either up or down regulation of a particular physio-chemical process.

The term "activated T cell" means a T cell that is currently undergoing cell division, cytokine production, performance of regulatory or cytolytic effector functions, and/or has recently undergone the process of "activation."

The term "antigen" or "Ag" as used herein is defined as a molecule that provokes an immune response. This immune response may involve either antibody production, or the activation of specific immunologically-competent cells, or both. The skilled artisan will understand that any macromolecule, including virtually all proteins or peptides, can serve as an antigen. Furthermore, antigens can be derived from recombinant or genomic DNA. A skilled artisan will understand that any DNA, which comprises a nucleotide sequences or a partial nucleotide sequence encoding a protein that elicits an immune response therefore encodes an "antigen" as that term is used herein. Furthermore, one skilled in the art will understand that an antigen need not be encoded solely by a full-length nucleotide sequence of a gene. It is readily apparent that the present invention includes, but is not limited to, the use of partial nucleotide sequences of more than one gene and that these nucleotide sequences are arranged in various combinations to elicit the desired immune response. Moreover, a skilled artisan will understand that an antigen need not be encoded by a "gene" at all. It is readily apparent that an antigen can be generated synthesized or can be derived from a biological sample. Such a biological sample can include, but is not limited to a tissue sample, a tumor sample, a cell or a biological fluid.

"Heterologous antigens" used herein to refer to an antigen that is not endogenous to the organism comprising or expressing an antigen. As an example, a virus vaccine vector comprising or expressing a viral or tumor antigen comprises a heterologous antigen. The term "Heterologous protein" as used herein refers to a protein that elicits a beneficial immune response in a subject (i.e. mammal), irrespective of its source.

The term "specifically binds", "selectively binds" or "binding specificity" refers to the ability of the humanized antibodies or binding compounds of the invention to bind to a target epitope with a greater affinity than that which results when bound to a non-target epitope. In certain embodiments, specific binding refers to binding to a target with an affinity that is at least 10, 50, 100, 250, 500, or 1000 times greater than the affinity for a non-target epitope.

As used herein, by "combination therapy" is meant that a first agent is administered in conjunction with another agent. "In combination with" or "In conjunction with" refers to administration of one treatment modality in addition to another treatment modality. As such, "in combination with" refers to administration of one treatment modality before, during, or after delivery of the other treatment modality to the individual. Such combinations are considered to be part of a single treatment regimen or regime.

"Humoral immunity" or "humoral immune response" both refer to B-cell mediated immunity and are mediated by highly specific antibodies, produced and secreted by B-lymphocytes (B-cells).

"Prevention" refers to the use of a pharmaceutical compositions for the vaccination against a disorder.

"Adjuvant" refers to a substance that is capable of potentiating the immunogenicity of an antigen. Adjuvants can be one substance or a mixture of substances and function by acting directly on the immune system or by providing a slow release of an antigen. Examples of adjuvants are aluminum salts, polyanions, bacterial glycopeptides and slow release agents as Freund's incomplete.

"Delivery vehicle" refers to a composition that helps to target the antigen to specific cells and to facilitate the effective recognition of an antigen by the immune system. The best-known delivery vehicles are liposomes, virosomes, microparticles including microspheres and nanospheres, polymeres, bacterial ghosts, bacterial polysaccharides, attenuated bacterias, virus like particles, attenuated viruses and ISCOMS.

"Incorporated into" or "encapsulated in" refers to an antigenic peptide that is within a delivery vehicle, such as microparticles, bacterial ghosts, attenuated bacteria, virus like particles, attenuated viruses, ISCOMs, liposomes and preferably virosomes.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that may comprise a protein or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

A "fusion protein" as used herein refers to a protein wherein the protein comprises two or more proteins linked together by peptide bonds or other chemical bonds. The proteins can be linked together directly by a peptide or other chemical bond, or with one or more amino acids between the two or more proteins, referred to herein as a spacer or by synthesizing a gene that directly encodes the fusion protein.

In the context of the present invention, the following abbreviations for the commonly occurring nucleic acid bases are used. "A" refers to adenosine, "C" refers to cytosine, "G" refers to guanosine, "T" refers to thymidine, and "U" refers to uridine.

The term "RNA" as used herein is defined as ribonucleic acid.

"Transform", "transforming", and "transformation" is used herein to refer to a process of introducing an isolated nucleic acid into the interior of an organism.

The term "treatment" as used within the context of the present invention is meant to include therapeutic treatment as well as prophylactic, or suppressive measures for the disease or disorder. As used herein, the term "treatment" and associated terms such as "treat" and "treating" means the reduction of the progression, severity and/or duration of a disease condition or at least one symptom thereof. The term 'treatment' therefore refers to any regimen that can benefit a subject. The treatment may be in respect of an existing condition or may be prophylactic (preventative treatment). Treatment may include curative, alleviative or prophylactic effects. References herein to "therapeutic" and "prophylactic" treatments are to be considered in their broadest context. The term "therapeutic" does not necessarily imply that a subject is treated until total recovery. Similarly, "prophylactic" does not necessarily mean that the subject will not eventually contract a disease condition. Thus, for example, the term treatment includes the administration of an agent prior to or following the onset of a disease or disorder thereby preventing or removing all signs of the disease or disorder. As another example, administration of the agent after clinical manifestation of the disease to combat the symptoms of the disease comprises "treatment" of the disease.

The term "equivalent," when used in reference to nucleotide sequences, is understood to refer to nucleotide sequences encoding functionally equivalent polypeptides. Equivalent nucleotide sequences will include sequences that differ by one or more nucleotide substitutions, additions- or deletions, such as allelic variants; and will, therefore, include sequences that differ from the nucleotide sequence of the nucleic acids described herein due to the degeneracy of the genetic code.

The term "isolated" as used herein with respect to nucleic acids, such as DNA or RNA, refers to molecules separated from other DNAs or RNAs, respectively that are present in the natural source of the macromolecule. The term isolated as used herein also refers to a nucleic acid or peptide that is substantially free of cellular material, viral material, or culture medium when produced by recombinant DNA techniques, or chemical precursors or other chemicals when chemically synthesized. Moreover, an "isolated nucleic acid" is meant to include nucleic acid fragments, which are not naturally occurring as fragments and would not be found in the natural state. The term "isolated" is also used herein to refer to polypeptides, which are isolated from other cellular proteins and is meant to encompass both purified and recombinant polypeptides. An "isolated cell" or "isolated population of cells" is a cell or population of cells that is not present in its natural environment.

A "mutation" as used therein is a change in a DNA sequence resulting in an alteration from its natural state. The mutation can comprise a deletion and/or insertion and/or duplication and/or substitution of at least one desoxyribonucleic acid base such as a purine (adenine and/or thymine) and/or a pyrimidine (guanine and/or cytosine).

Mutations may or may not produce discernible changes in the observable characteristics (phenotype) of an organism.

As used herein, the term "nucleic acid" refers to polynucleotides such as deoxyribonucleic acid (DNA) and, where appropriate, ribonucleic acid (RNA). The term should also be understood to include, as equivalents, analogs of either RNA or DNA made from nucleotide analogs, and, as applicable to the embodiment being described, single (sense or antisense) and double-stranded polynucleotides. ESTs, chromosomes, cDNAs, mRNAs, and rRNAs are representative examples of molecules that may be referred to as nucleic acids.

As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability; and when desired, sequences that enhance secretion of the encoded product. There are numerous expression control sequences, including promoters which are native, constitutive, inducible and/or tissue-specific, are known in the art that may be used in the compositions of the invention. "Operably linked" should be construed to include RNA expression and control sequences in addition to DNA expression and control sequences.

The term "promoter" as used herein is defined as a DNA sequence recognized by the synthetic machinery of the cell, or introduced synthetic machinery, required to initiate the specific transcription of a polynucleotide sequence.

As used herein, the term "promoter/regulatory sequence" means a nucleic acid sequence, which is required for expression of a gene product operably linked to the promoter/regulatory sequence. In some instances, this sequence may be the core promoter sequence and in other instances, this sequence may also include an enhancer sequence and other regulatory elements, which are required for expression of the gene product. The promoter/regulatory sequence may, for example, be one which expresses the gene product in a tissue specific manner.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only when an inducer which corresponds to the promoter is present in the cell.

As used herein, the term "pharmaceutical composition" refers to a mixture of at least one compound useful within the invention with other chemical components, such as carriers, stabilizers, diluents, adjuvants, dispersing agents, suspending agents, thickening agents, and/or excipients. The pharmaceutical composition facilitates administration of the compound to an organism. Multiple techniques of administering a compound exist in the art including, but not limited to: intravenous, oral, aerosol, parenteral, ophthalmic, pulmonary and topical administration.

The language "pharmaceutically acceptable carrier" includes a pharmaceutically acceptable salt, pharmaceutically acceptable material, composition or carrier, such as a liquid or solid filler, diluent, excipient, solvent or encapsulating material, involved in carrying or transporting a compound(s) of the present invention within or to the subject such that it may perform its intended function. Typically, such compounds are carried or transported from one organ, or portion of the body, to another organ, or portion of the body. Each salt or carrier must be "acceptable" in the sense of being compatible with the other ingredients of the formulation, and not injurious to the subject. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; diluent; granulating agent; lubricant; binder; disintegrating agent; wetting agent; emulsifier; coloring agent; release agent; coating agent; sweetening agent; flavoring agent; perfuming agent; preservative; antioxidant; plasticizer; gelling agent; thickener; hardener; setting agent; suspending agent; surfactant; humectant; carrier; stabilizer; and other non-toxic compatible substances employed in pharmaceutical formulations, or any combination thereof. As used herein, "pharmaceutically acceptable carrier" also includes any and all coatings, antibacterial and antifungal agents, and absorption delaying agents, and the like that are compatible with the activity of the compound, and are physiologically acceptable to the subject.

Supplementary active compounds may also be incorporated into the compositions.

As used herein, the term "effective amount" or "therapeutically effective amount" or "pharmaceutically effective amount" means the amount of the virus like particle or infectious units generated from vector of the invention which is required to prevent the particular disease condition, or which reduces the severity of and/or ameliorates the disease condition or at least one symptom thereof or condition associated therewith.

A "subject" or "patient," as used therein, may be a human or non-human mammal. Non-human mammals include, for example, livestock and pets, such as ovine, bovine, porcine, canine, feline and murine mammals. Preferably, the subject is a canine which comprises, but is not limited to, species of foxes, wolves, jackals, and other members of the dog family.

"Titers" are numerical measures of the concentration of a virus or viral vector compared to a reference sample, where the concentration is determined either by the activity of the virus, or by measuring the number of viruses in a unit volume of buffer. The titer of viral stocks are determined, e.g., by measuring the infectivity of a solution or solutions (typically serial dilutions) of the viruses on an appropriate cell line, such as HEK293 cells or by quantitating the viruses by UV spectrophotometry (see, Chardonnet & Dales (1970) Virology 40:462-477).

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. In the present disclosure, the term "vector" refers to a replication-defective virus.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The invention provides a nucleic acid delivery system comprising canine tumor-specific antigen useful in cancer vaccine development particularly for treating and/or preventing canine melanoma.

In some embodiments, the nucleic acid delivery system is any nucleic acid delivery system known in the art useful for vaccination. In one embodiment, the nucleic acid delivery system is a vaccine vector, a DNA plasmid, or an mRNA vaccine. In another embodiment the nucleic acid delivery system is a viral vector such as, but not limited to, an adenovirus vector, an adeno-associated virus, a poxvirus, a retrovirus, a lentivirus, a Sendai virus or a cytomegalovirus. In one embodiment, the nucleic acid delivery system of the invention is an adenovirus vector. In one embodiment, the adenovirus vector of the invention comprises a chimpanzee-derived adenovirus vector. In another embodiment the vector is of serotype AdC68. In some embodiments, the vector is a recombinant vector comprising a deletion of the viral early genomic region E1 (Zhou et al., Nat. protocol 2010, 5:1775-1785). In other embodiments, the herpes virus (HSV-1) glycoprotein D (gD) is used as an inhibitor of an immuno-inhibitory pathway and is inserted into the E1 domain of the vector.

In some embodiments, the chimpanzee-derived adenovirus vector comprises a nucleic acid sequence comprising a constitutive promoter. In some embodiments, the promoter is a cytomegalovirus immediate early promoter (CMV).

In some embodiments, the canine tumor-specific antigen is a string of immunogenic sequences, i.e. epitopes from different antigens that are overexpressed in K9Melapoly. In other embodiments, the K9Melapoly is encoded by a nucleic acid sequence of SEQ ID NO: 2 or by a nucleic acid sequence having at least 90%, 91%, 92%, 93%, 94%, 95%, 96%, 97%, 98%, or 99%, and any partial integers therebetween, identity thereto. In yet other embodiments, the K9Melapoly is encoded by a nucleic acid sequence having at least 80%, at least 85%, at least 90%, at least 95%, at least 99%, or 100% sequence identity, and all partial or whole integer values and numerical ranges there between, to a nucleic acid sequence of SEQ ID NO: 2.

In some embodiments, the polynucleotide sequence of the adenovirus vector comprises a nucleic acid sequence of SEQ ID NO: 1 or a nucleic acid sequence having at least 90%, 91%, 92%, 93%, 94%, 95%, 96%, 97%, 98%, or 99%, and any partial integers therebetween, identity thereto. In other embodiments, the polynucleotide sequence of the adenovirus vector comprises a nucleic acid sequence having at least 80%, at least 85%, at least 90%, at least 95%, at least 99%, or 100% sequence identity, and all partial or whole integer values and numerical ranges there between, to a nucleic acid sequence of SEQ ID NO: 1.

In one aspect, the present invention relates to a protein expression system comprising an adenovirus vector, wherein the adenovirus vector further comprises a promoter operably linked to a heterologous protein comprising sequences containing canine tumor-specific antigens and an inhibitor of an immuno-inhibitory pathway. In yet other embodiments, the protein expression system of this invention comprises a chimpanzee-derived adenovirus vector, wherein the vector is encoded by a polynucleotide sequence comprising a nucleic acid sequence of SEQ ID NO: 1 or a nucleic acid sequence having at least 90%, 91%, 92%, 93%, 94%, 95%, 96%, 97%, 98%, or 99%, and any partial integers therebetween, identity thereto.

Vaccine compositions comprising adenovirus particles made using the adenovirus vectors disclosed herein can be used to induce anti-cancer immunity in a mammal against one or more encoded heterologous proteins or antigenic portions thereof (e.g. K9 Melapoly). Immunity can be induced using the disclosed vaccine compositions or dosage units. Immune responses can be assessed using suitable methods known in the art, as disclosed, for example, in WO2012/02483.

In certain embodiments, the mammal is a human or a non-human mammal such as an ovine, a bovine, a porcine, a canine, a feline and a murine. In some embodiments, the mammal is a canine comprising, but is not limited to, species of foxes, wolves, jackals, and other members of the dog family.

Heterologous Gene Expression

In one aspect, although the cytomegalovirus immediate early promoter is exemplified herein as the promoter driving expression of a canine tumor-specific antigen (e.g. canine melanoma polyepitope (K9Melapoly)), the invention should not be construed to be limited to this promoter sequence. Promoter sequences that are useful in the invention include any promoter that induces high levels of gene expression. Such promoters may include, but are not limited to those disclosed elsewhere herein.

In one embodiment, a suitable promoter is the immediate early cytomegalovirus (CMV) promoter sequence. This promoter sequence is a strong constitutive promoter sequence capable of driving high levels of expression of any polynucleotide sequence operatively linked thereto. Another example of a suitable promoter is Elongation Growth Factor-1α (EF-1α). However, other constitutive promoter sequences may also be used, including, but not limited to the simian virus 40 (SV40) early promoter, mouse mammary tumor virus (MMTV), human immunodeficiency virus (HIV) long terminal repeat (LTR) promoter, MoMuLV promoter, an avian leukemia virus promoter, an Epstein-Barr virus immediate early promoter, a Rous sarcoma virus promoter, as well as human gene promoters such as, but not limited to, the actin promoter, the myosin promoter, the hemoglobin promoter, and the creatine kinase promoter. Further, the invention should not be limited to the use of constitutive promoters. Inducible promoters are also contemplated as part of the invention. The use of an inducible promoter provides a molecular switch capable of turning on expression of the polynucleotide sequence, which it is operably linked when such expression is desired, or turning off the expression when expression is not desired. Examples of inducible promoters include, but are not limited to a metallothionine promoter, a glucocorticoid promoter, a progesterone promoter, and a tetracycline promoter.

In some embodiments, the invention further includes the use of a tissue-specific promoter that drives expression of a given heterologous gene in one or more specific types of cells (e.g., myoglobin promoter, muscle creatine kinase promoter, desmin promoter, mammalian troponin 1 promoter, and skeletal alpha-action promoter). Furthermore, any artificial synthetic promoters known in the art can be used in this invention as these promoters can provide optimal efficiency and stability for the heterologous gene. Additionally, enhancer sequences regulate expression of the gene contained within a vector. Typically, enhancers are bound with protein factors to enhance the transcription of a gene. Enhancers may be located upstream or downstream of the gene it regulates. Enhancers may also be tissue-specific to enhance transcription in a specific cell or tissue type.

In order to assess the expression of tumor-specific antigens of interest (e.g. K9Melapoly), the expression vector to be introduced into a cell can also contain either a selectable marker gene or a reporter gene or both to facilitate identification and selection of expressing cells from the population of cells sought to be infected through the hybrid-virus vectors. In other aspects, the selectable marker may be carried on a separate piece of DNA and used in a coinfection/transfection procedure. Both selectable markers and reporter genes may be flanked with appropriate regulatory sequences to enable expression in the host cells. Useful selectable markers include, for example, antibiotic-resistance genes, such as the neomycin resistant gene and the like.

Reporter genes are used for identifying potentially infected cells and for evaluating the functionality of regulatory sequences. In general, a reporter gene is a gene that is not present in or expressed by the recipient organism or tissue and that encodes a polypeptide whose expression is manifested by some easily detectable property, e.g., enzymatic activity. Suitable reporter genes may include genes encoding luciferase, beta-galactosidase, chloramphenicol acetyl transferase, secreted alkaline phosphatase, or the green fluorescent protein gene (e.g., Ui-Tei et al., 2000 FEBS Letters 479: 79-82).

It will be apparent to one skilled in the art that the invention is not limited to the nature of the heterologous gene that is expressed by the adenovirus vector of the invention (e.g. gDK9Melapoly). Any suitable heterologous gene encoding a tumor-specific antigen and an inhibitor of an immuno-inhibitory pathway, can be used where expression of the gene provides an anti-cancer benefit to the mammal.

Heterologous Proteins

In the present invention, the adenovirus vector of the invention may encode any heterologous protein useful in the invention, and may encode more than one heterologous protein inserted in tandem in the virus vector of the invention. Typically, the heterologous protein is a peptide fragment, polypeptide, protein or fusion protein. Optionally, the heterologous protein is suitable such that a cell-mediated immune response is induced against it in a mammal following administration of the vector to the mammal.

In some embodiments, the heterologous protein may be derived from a cancer. In such embodiments the, heterologous protein is, or is a fragment of, a tumor specific antigen. In certain embodiments the cancer may be derived from the group including Acute and Chronic Myelogenous Leukemia (AML, CML), Follicular Non-Hodgkin's lymphoma, malignant melanoma, Hairy Cell leukemia, multiple myeloma, carcinoid tumors with carcinoid syndrome and liver and lymph node metastases, AIDS related Kaposi's sarcoma, renal cell carcinoma, adenocarcinoma of the large bowel, squamous cell carcinoma of the head and neck. The cancer may also be derived from organs and solid tissues, e.g., colon cancer, lung cancer, breast cancer, stomach cancer, prostate cancer, and endometrial cancer. When such heterologous proteins are used in the compositions and methods of the present invention, the resulting immune response generated may combat cancers and thus the vectors and viruses produced by these vectors are designed to be oncolytic.

In one embodiment, the heterologous protein is derived from K9Melapoly tumor-specific antigens of interest. In another embodiment, the heterologous protein is derived from other melanoma specific antigens. Non-limiting examples of melanoma antigens are tyrosine-related protein 1 (Trp-1), tyrosine-related protein 2 (Trp-2), MAGBA, PMEL, and tyrosinase. In some embodiments, the immune response comprises a T cell response directed against MAGBA, Trp-1, Trp-2, tyrosinase and PMEL.

Methods of the Invention

The nucleic acid delivery systems of the invention are useful in a variety of applications such as immunizing a mammal against a disease, and/or treating, preventing or diminishing risk of a disease in a mammal (e.g., cancer).

In another aspect, the invention includes a method of eliciting an immune response in a mammal against a canine tumor-specific antigen. The method of the invention comprises administering to the mammal a composition comprising a polynucleotide sequence of a nucleic acid delivery system (e.g. an adenovirus vector), wherein the polynucleotide sequence further comprises a promoter sequence operably linked to a nucleic acid sequence encoding a heterologous protein comprising a canine tumor-specific antigen and an inhibitor of an immuno-inhibitory pathway.

In another aspect, the invention includes a method of vaccinating a mammal against melanoma. The method of the invention comprises administering to the mammal a pharmaceutically acceptable amount of a composition comprising a polynucleotide sequence of a nucleic acid delivery system, wherein the polynucleotide sequence further comprises a promoter sequence operably linked to a nucleic acid sequence encoding a heterologous protein comprising a canine tumor-specific antigen and an inhibitor of an immuno-inhibitory pathway, wherein administration of the composition elicits an immune response in the mammal. In some embodiments, the composition is administered prophylactically or therapeutically to the mammal.

In yet another aspect, the invention includes a treating and/or preventing melanoma in a mammal, the method comprising administering a therapeutically effective amount of a composition encoded by a polynucleotide sequence comprising a nucleic acid sequence of SEQ ID NO: 1 or a nucleic acid sequence having at least 90%, 91%, 92%, 93%, 94%, 95%, 96%, 97%, 98%, or 99%, and any partial integers therebetween, identity thereto.

The invention further includes a method of generating effector and memory T cell immune responses to a heterologous protein in a mammal. The method comprises first administering to the mammal the nucleic acid delivery system of this invention in an amount effective to elicit an immune response in the mammal; and second, administering a second effective amount of the nucleic acid delivery system at a subsequent time period, wherein T memory cells directed against the heterologous protein are reactivated in the mammal.

In some embodiments, the nucleic acid delivery system of the invention is a chimpanzee-derived adenovirus vector. In some aspects of the invention, the chimpanzee-derived adenovirus vector administered to a mammal, in a first and second step, comprises the same or a different canine tumor-specific antigen encoded by an adenovirus serotype of AdC68 or a different serotype. In some embodiments, the immune response comprises an T cell response directed against MAGBA, Trp-1, Trp-2, tyrosinase and/or PMEL.

Adenovirus Vector Production

Methods of making the adenovirus vector of the invention are described in detail in the Examples Section herein, in U.S. application Ser. No. 14/212,099 incorporated herein by reference and by Zhou et al (Nat. protocol 2010, 5:1775-1785). In general, production, purification and quality control procedures for vaccine vectors such as adenovirus vectors are well established in the art. Once a vector backbone is created, molecular cloning can be used to create an adenoviral plasmid comprising a coding sequence for an antigenic heterologous protein. The plasmid can be transfected into packaging cells that provide E1 of a suitable adenovirus serotype in trans. Packaging cells are well known in the art, and cells lines such as HEK293 or PERC6 can be used for this purpose. Viral particles are then harvested once plaques become visible. Fresh cells can then be infected to ensure continued replication of the adenovirus. Quality can be assessed using Southern blotting or other methods, such as restriction enzyme mapping, sequencing, and PCR, to confirm the presence of the transgene and the lack of gene rearrangements or undesired deletions.

Vaccine compositions comprising adenovirus particles made using the adenovirus vectors disclosed herein can be used to induce immunity against the encoded antigenic protein. Vaccines can be formulated using standard techniques and can comprise, in addition to a replication-incompetent adenovirus vector encoding a desired protein, a pharmaceutically acceptable vehicle, such as phosphate-buffered saline (PBS) or other buffers, as well as other components such as antibacterial and antifungal agents, isotonic and absorption delaying agents, adjuvants, and the like. In some embodiments vaccine compositions are administered in combination with one or more other vaccines. Dosage units of vaccine compositions can be provided. Such dosage units typically comprise $10^8$ to $10^{11}$ adenoviral particles (e.g., $10^8$, $5\times10^8$, $10^9$, $5\times10^9$, $10^{10}$, $5\times10^{10}$, $10^{11}$). In some embodiments, the dosage of $5\times10^{10}$ virus particles is of choice. Particularly, this dosage ($5\times10^{10}$) suits best humans in clinical trials.

Pharmaceutical Compositions and Formulations

The nucleic acid delivery system of the invention may be formulated as a pharmaceutical composition.

Such a pharmaceutical composition may be in a form suitable for administration to a subject (i.e. mammal), or the pharmaceutical composition may further comprise one or more pharmaceutically acceptable carriers, one or more additional ingredients, or some combination of these. The various components of the pharmaceutical composition may be present in the form of a physiologically acceptable salt, such as in combination with a physiologically acceptable cation or anion, as is well known in the art.

In one embodiment, the pharmaceutical compositions useful for practicing the method of the invention may be administered to deliver a dose of between $10^6$ and $10^{12}$ PFU.

In one embodiment, the pharmaceutical compositions useful for practicing the method of the invention may comprise an adjuvant. Non-limiting examples of suitable are Freund's complete adjuvant, Freund's incomplete adjuvant, Quil A, Detox, ISCOMs or squalene.

Pharmaceutical compositions that are useful in the methods of the invention may be suitably developed for inhalation, oral, rectal, vaginal, parenteral, topical, transdermal, pulmonary, intranasal, buccal, ophthalmic, intrathecal, intravenous or another route of administration. Other contemplated formulations include projected nanoparticles, liposomal preparations, resealed erythrocytes containing the active ingredient, and immunologically-based formulations. The route(s) of administration is readily apparent to the skilled artisan and depends upon any number of factors including the type and severity of the disease being treated, the type and age of the veterinary or human patient being treated, and the like.

Although the descriptions of pharmaceutical compositions provided herein are principally directed to pharmaceutical compositions suitable for ethical administration to humans, it is understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and perform such modification with merely ordinary, if any, experimentation. Subjects to which administration of the pharmaceutical compositions of the invention is contemplated include, but are not limited to, humans and other primates, mammals including commercially relevant mammals such as cattle, pigs, horses, sheep, cats, and dogs.

The composition of the invention may comprise a preservative from about 0.005% to 2.0% by total weight of the composition. The preservative is used to prevent spoilage in the case of exposure to contaminants in the environment.

Administration/Dosing

The regimen of administration may affect what constitutes an effective amount. For example, the nucleic acid delivery system (e.g. adenovirus vector) of the invention may be administered to the subject (i.e. mammal) in a single dose, in several divided dosages, as well as staggered dosages may be administered daily or sequentially, or the dose may be continuously infused, or may be a bolus injection. Further, the dosages may be proportionally increased or decreased as indicated by the exigencies of the therapeutic or prophylactic situation.

Administration of the compositions of the present invention to a subject, preferably a mammal, more preferably a human, may be carried out using known procedures, at dosages and for periods of time effective to treat the disease in the subject. An effective amount of the composition necessary to achieve the intended result will vary and will depend on factors such as the disease to be treated or prevented, the age, sex, weight, condition, general health and prior medical history of the subject being treated, and like factors well-known in the medical arts. In particular embodiments, it is especially advantageous to formulate the composition in dosage unit form for ease of administration and uniformity of dosage. Dosage unit form as used herein refers to physically discrete units suited as unitary dosages for the subjects to be treated; each unit containing a predetermined quantity of therapeutic compound calculated to produce the desired therapeutic effect in association with the required pharmaceutical vehicle. The dosage unit forms of the invention are dictated by and directly dependent on (a) the unique characteristics of the composition and the heterologous protein to be expressed, and the particular therapeutic effect to be achieved.

Routes of Administration

One skilled in the art will recognize that although more than one route can be used for administration, a particular route can provide a more immediate and more effective reaction than another route. Routes of administration of any of the compositions\ of the invention include inhalation, oral, nasal, rectal, parenteral, sublingual, transdermal, transmucosal (e.g., sublingual, lingual, (trans)buccal, (trans)urethral, vaginal (e.g., trans- and perivaginally), (intra)nasal, and (trans)rectal), intravesical, intrapulmonary, intraduodenal, intragastrical, intrathecal, subcutaneous, intramuscular, intradermal, intra-arterial, intravenous, intrabronchial, inhalation, and topical administration.

Kits

In some embodiments a kit is provided for treating, preventing, or ameliorating a cancer such as melanoma, as described herein wherein the kit comprises: a) a compound or compositions as described herein; and optionally b) an additional agent or therapy as described herein. The kit can further include instructions or a label for using the kit to treat, prevent, or ameliorate the cancer. In yet other embodiments, the invention extends to kits assays for a given cancer (e.g. melanoma), as described herein. Such kits may, for example, contain the reagents from PCR or other nucleic acid hybridization technology (microarrays) or reagents for immunologically based detection techniques (e.g., ELISpot, ELISA).

```
C68 010 gD-K9melapoly(E1789) Nucleic Acid Sequence
Underline section = K9 Melapoly
                                              (SEQ ID NO. 1)
GCTGGAGTTCCTGGCCAAGGTGCATCATCTTCAATAATATACCTCAAACT

TTTTGTGCGCGTTAATATGCAAATGAGGCGTTTGAATTTGGGGAGGAAGG

GCGGTGATTGGTCGAGGGATGAGCGACCGTTAGGGGCGGGGCGAGTGACG

TTTTGATGACGTGGTTGCGAGGAGGAGCCAGTTTGCAAGTTCTCGTGGGA

AAAGTGACGTCAAACGAGGTGTGGTTTGAACACGGAAATACTCAATTTTC

CCGCGCTCTCTGACAGGAAATGAGGTGTTTCTGGGCGGATGCAAGTGAAA

ACGGGCCATTTTCGCGCGAAAACTGAATGAGGAAGTGAAAATCTGAGTAA

TTTCGCGTTTATGGCAGGGAGGAGTATTTGCCGAGGGCCGAGTAGACTTT

GACCGATTACGTGGGGGTTTCGATTACCGTGTTTTTCACCTAAATTTCCG

CGTACGGTGTCAAAGTCCGGTGTTTTTACGTACGATATCATTTCCCCGAA

AGTGCCACCTGACCGTAACTATAACGGTCCTAAGGTAGCGAAAGCTCAGA

TCTCCCGATCCCCTATGGTGCACTCTCAGTACAATCTGCTCTGATGCCGC

ATAGTTAAGCCAGTATCTGCTCCCTGCTTGTGTGTTGGAGGTCGCTGAGT

AGTGCGCGAGCAAAATTTAAGCTACAACAAGGCAAGGCTTGACCGACAAT

TGCATGAAGAATCTGCTTAGGGTTAGGCGTTTTGCGCTGCTTCGCGATGT

ACGGGCCAGATATACGCGTTGACATTGATTATTGACTAGTTATTAATAGT

AATCAATTACGGGGTCATTAGTTCATAGCCCATATATGGAGTTCCGCGTT

ACATAACTTACGGTAAATGGCCCGCCTGGCTGACCGCCCAACGACCCCCG

CCCATTGACGTCAATAATGACGTATGTTCCCATAGTAACGCCAATAGGGA

CTTTCCATTGACGTCAATGGGTGGAGTATTTACGGTAAACTGCCCACTTG

GCAGTACATCAAGTGTATCATATGCCAAGTACGCCCCCTATTGACGTCAA

TGACGGTAAATGGCCCGCCTGGCATTATGCCCAGTACATGACCTTATGGG

ACTTTCCTACTTGGCAGTACATCTACGTATTAGTCATCGCTATTACCATG

GTGATGCGGTTTTGGCAGTACATCAATGGGCGTGGATAGCGGTTTGACTC

ACGGGGATTTCCAAGTCTCCACCCCATTGACGTCAATGGGAGTTTGTTTT

GGCACCAAAATCAACGGGACTTTCCAAAATGTCGTAACAACTCCGCCCCA

TTGACGCAAATGGGCGGTAGGCGTGTACGGTGGGAGGTCTATATAAGCAG

AGCTCGTTTAGTGAACCGTCAGATCACTAGAAGCTTTATTGCGGTAGTTT

ATCACAGTTAAATTGCTAACGCAGTCAGTGCTTCTGACACAACAGTCTCG

AACTTAAGCTGCAGAAGTTGGTCGTGAGGCACTGGGCAGGTAAGTATCAA

GGTTACAAGACAGGTTTAAGGAGACCAATAGAAACTGGGCTTGTCGAGAC

AGAGAAGACTCTTGCGTTTCTGATAGGCACCTATTGGTCTTACTGACATC
```

```
CACTTTGCCTTTCTCTCCACAGGTGTCCACTCCCAGTTCAATTACAGCTC

TTAAGGCTAGAGTACTTAATACGACTCACTATAGGCTAGCCTCGAGAATT

CACGCGTGGTACCTCTAGAATGGGGGGGCTGCCGCCAGGTTGGGGGCCG

TGATTTTGTTTGTCGTCATAGTGGGCCTCCATGGGGTCCGCGGCAAATAT

GCCTTGGCGGATGCCTCTCTCAAGATGGCCGACCCCAATCGCTTTCGCGG

CAAAGACCTTCCGGTCCTGGACCAGCTGACCGACCCTCCGGGGGTCCGGC

GCGTGTACCACATCCAGGCGGGCCTACCGGACCCGTTCCAGCCCCCCAGC

CTCCCGATCACGGTTTACTACGCCGTGTTGGAGCGCGCCTGCCGCAGCGT

GCTCCTAAACGCACCGTCGGAGGCCCCCCAGATTGTCCGCGGGGCCTCCG

AAGACGTCCGGAAACAACCCTACAACCTGACCATCGCTTGGTTTCGGATG

GGAGGCAACTGTGCTATCCCCATCACGGTCATGGAGTACACCGAATGCTC

CTACAACAAGTCTCTGGGGGCCTGTCCCATCCGAACGCAGCCCCGCTGGA

ACTACTATGACAGCTTCAGCGCCGTCAGCGAGGATAACCTGGGGTTCCTG

ATGCACGCCCCGCGTTTGAGACCGCCGGCACGTACCTGCGGCTCGTGAA

GATAAACGACTGGACGGAGATTACACAGTTTATCCTGGAGCACCGAGCCA

AGGGCTCCTGTAAGTACGCCCTCCCGCTGCGCATCCCCCCGTCAGCCTGC

CTCTCCCCCCAGGCCTACCAGCAGGGGGTGACGGTGGACAGCATCGGGAT

GCTGCCCCGCTTCATCCCCGAGAACCAGCGCACCGTCGCCGTATACAGCT

TGAAGATCGCCGGGTGGCACGGGCCCTTCCTGCCCTGGCACCGGCTGTTC

GGCCAGATGAAGAACGGCAGCACCCCCATGTTCCTGAGCCCCGCCAGCTT

CTTCAGCAGCTGGACCCCCATGTTCAACGACATTAATATCTACGTGGAGT

TCTGCCTGAGCCTGACCCAGTACCTGGCCCTGCGGCGGCACCGGCCCCTG

CAGAGCAGCATGCACAACGCCCTGCACATCTACATGCTGCTGATGGTGCC

CTTCATCCCCCTGTACCGGTTCCTGCTGCGGTGGGAGCAGGAGATCAGCA

GCAAGGACCTGGGCTACGACTACGCCGCGGCAGCCAAGGCCTGGAACCGG

CAGCTGTACCCCGAGTGGCGAGCCCTGGTGGTGACCCACACCTACAAGGT

GCTGCCCGACGGCCAGGTGATCTGGCTGATGGCCGTGGTGCTGGCCAGCC

TGATCTACCAGGTGTGGGCGGCCAGCCCGTGTACCACTGGACCATGGAG

GTGACCGTGTACCACCGGCAGCTGTTCACCATCACCGACCAGGTGCCCTT

CAGCCTGGCCCGTGCCCTGGTGTGACCCACACCTACGTGCTGATGGCCG

TGGTGCTGGCGGCTGCAGCCAACTACTTCGTGTGGACCCACTACTACAGC

ACCACCTACAGCTTCAGCCTGCCCTACTGGAACTTCGTGACCGCCTACTA

CATCAGCCCCAACAGCGTGTTCAGCCAGTGGACCCCCAGTTCGAGAACC

GGAACGTGGCCCGGCCCATGGTGCAGCGGTACAGCAACAGCACCAACAGC

TTCCGGCTGCACAACCTGGCCCACCTGTTCCTGCTGTTCCAGCAGGCCCG

GGCTCAGTTCCGGAGCCGGCAGTACAACATGGTGCCCTTCTGGGCACTGA

TCTTCGGCACCGCCAGCTACATCTTCTTCCCCCTGCTGCTGTTCGTGACC

GCCCCCGACAACCTGGGCTACGCGGCTGCGGCGGCCAGCTTCGCCCTGCC

CTACTGGAACTTCCAGCCCTACATGAGCCTGCACAACCTGGTGCACAGCT

TCGTGGCCCTGGTGCTGCACAGCTTCACCGACGCCATCTTCCTGCAGCTG
```

-continued

<u>ACCAGCGACCAGCTGGGCTACAGCTACCCCTACCTGCAGTACCGGCGGCT</u>

<u>GCGGAAGGGCTACAGCGCCGCAGCTGCTGCCCTGTACCGGGCCAGCGAGC</u>

<u>ACCTGGAGCTGATCTTCCTGTACGACGGCATCGAGGACGGCATCGAGCAC</u>

<u>TTCTGGAAGGTGTTCAACACCATGGGCCTGTACGGCCTGTACGACCTGCT</u>

<u>GATGACCGTGCTGGGCATCATCTTCATGCCCCGGGGCCAGAAGAGCAAGC</u>

<u>TGCTGTACGACGGCATCGAGCACTTCATGTTCAAGTTCCTGGTGAAGGAG</u>

<u>AACTACCTGGAGTACGTGCCCAACAGCGACCCCCCCCGGTACTTCGTGTG</u>

<u>GAAGGTGTTCAACACCATGGGCCTGTACAAGGTGCTGGAGTTCCTGGCCA</u>

<u>AGGT</u>GGGCCCAAGGCCCCATACACGAGCACCCTGCTGCCCCCGGAGCTG

TCCGAGACCCCCAACGCCACGCAGCCAGAACTCGCCCCGGAAGACCCCGA

GGATTCGGCCCTCTTGGAGGACCCCGTGGGGACGGTGGCGCCGCAAATCC

CACCAAACTGGCACATCCCGTCGATCCAGGACGCCGCGACGCCTTACCAT

CCCCCGGCCACCCCGAACAACATGGGCCTGATCGCCGGCGCGGTGGGCGG

CAGTCTCCTGGCAGCCCTGGTCATTTGCGGAATTGTGTACTGGATGCACC

GCCGCACTCGGAAAGCCCCAAAGCGCATACGCCTCCCCCACATCCGGGAA

GACGACCAGCCGTCCTCGCACCAGCCCTTGTTTTACTAGTCTAGAGTCGA

CCCGGGCGGCCAAACCGCTGATCAGCCTCGACTGTGCCTTCTAGTTGCCA

GCCATCTGTTGTTTGCCCCTCCCCCGTGCCTTCCTTGACCCTGGAAGGTG

CCACTCCCACTGTCCTTTCCTAATAAAATGAGGAAATTGCATCGCATTGT

CTGAGTAGGTGTCATTCTATTCTGGGGGGTGGGGTGGGGCAGGACAGCAA

GGGGGAGGATTGGGAAGACAATAGCAGGCATGCTGGGGATGCGGTGGGCT

CTATGGCTTCTGAGGCGGAAAGAACCAGCAGATCTGCAGATCTGAATTCA

TCTATGTCGGGTGCGGAGAAAGAGGTAATGAAATGGCATTATGGGTATTA

TGGGTCTGCATTAATGAATCGGCCAGATATCGACATATGCTGGCCACCGT

ACATGTGGCTTCCCATGCTCGCAAGCCCTGGCCCGAGTTCGAGCACAATG

TCATGACCAGGTGCAATATGCATCTGGGTCCCGCCGAGGCATGTTCATG

CCCTACCAGTGCAACCTGAATTATGTGAAGGTGCTGCTGGAGCCCGATGC

CATGTCCAGAGTGAGCCTGACGGGGGTGTTTGACATGAATGTGGAGGTGT

GGAAGATTCTGAGATATGATGAATCCAAGACCAGGTGCCGAGCCTGCGAG

TGCGGAGGGAAGCATGCCAGGTTCCAGCCCGTGTGTGGATGTGACGGA

GGACCTGCGACCCGATCATTTGGTGTTGCCCTGCACCGGGACGGAGTTCG

GTTCCAGCGGGAAGAATCTGACTAGAGTGAGTAGTGTTCTGGGGCGGGG

GAGGACCTGCATGAGGGCCAGAATAACTGAAATCTGTGCTTTTCTGTGTG

TTGCAGCAGCATGAGCGGAAGCGGCTCCTTTGAGGGAGGGGTATTCAGCC

CTTATCTGACGGGGCGTCTCCCCTCCTGGGCGGGAGTGCGTCAGAATGTG

ATGGGATCCACGGTGGACGGCCGGCCCGTGCAGCCCGCGAACTCTTCAAC

CCTGACCTATGCAACCCTGAGCTCTTCGTCGTTGGACGCAGCTGCCGCCG

CAGCTGCTGCATCTGCCGCCAGCGCCGTGCGCGGAATGGCCATGGGCGCC

GGCTACTACGGCACTCTGGTGGCCAACTCGAGTTCCACCAATAATCCCGC

CAGCCTGAACGAGGAGAAGCTGTTGCTGCTGATGGCCCAGCTCGAGGCCT

TGACCCAGCGCCTGGGCGAGCTGACCCAGCAGGTGGCTCAGCTGCAGGAG

CAGACGCGGGCCGCGGTTGCCACGGTGAAATCCAAATAAAAAATGAATCA

ATAAATAAACGGAGACGGTTGTTGATTTTAACACAGAGTCTGAATCTTTA

TTTGATTTTTCGCGCGCGGTAGGCCCTGGACCACCGGTCTCGATCATTGA

GCACCCGGTGGATCTTTTCCAGGACCCGGTAGAGGTGGGCTTGGATGTTG

AGGTACATGGGCATGAGCCCGTCCCGGGGGTGGAGGTAGCTCCATTGCAG

GGCCTCGTGCTCGGGGTGGTGTTGTAAATCACCCAGTCATAGCAGGGGC

GCAGGGCATGGTGTTGCACAATATCTTTGAGGAGGAGACTGATGGCCACG

GGCAGCCCTTTGGTGTAGGTGTTTACAAATCTGTTGAGCTGGGAGGGATG

CATGCGGGGGAGATGAGGTGCATCTTGGCCTGGATCTTGAGATTGGCGA

TGTTACCGCCAGATCCCGCCTGGGGTTCATGTTGTGCAGGACCACCAGC

ACGGTGTATCCGGTGCACTTGGGGAATTTATCATGCAACTTGGAAGGGAA

GGCGTGAAAGAATTTGGCGACGCCTTTGTGCCCGCCCAGGTTTTCCATGC

ACTCATCCATGATGATGGCGATGGGCCCGTGGGCGGCGGCCTGGGCAAAG

ACGTTTCGGGGGTCGGACACATCATAGTTGTGGTCCTGGGTGAGGTCATC

ATAGGCCATTTTAATGAATTTGGGCGGAGGGTGCCGGACTGGGGGACAA

AGGTACCCTCGATCCCGGGGCGTAGTTCCCCTCACAGATCTGCATCTCC

CAGGCTTTGAGCTCGGAGGGGGGATCATGTCCACCTGCGGGGCGATAAA

GAACACGGTTTCCGGGGCGGGGAGATGAGCTGGGCCGAAAGCAAGTTCC

GGAGCAGCTGGGACTTGCCGCAGCCGGTGGGGCCGTAGATGACCCCGATG

ACCGGCTGCAGGTGGTAGTTGAGGGAGAGACAGCTGCCGTCCTCCCGGAG

GAGGGGGGCCACCTCGTTCATCATCTCGCGCACGTGCATGTTCTCGCGCA

CCAGTTCCGCCAGGAGGCGCTCTCCCCCAGGGATAGGAGCTCCTGGAGC

GAGGCGAAGTTTTTCAGCGGCTTGAGTCCGTCGGCCATGGGCATTTTGGA

GAGGGTTTGTTGCAAGAGTTCCAGGCGGTCCCAGAGCTCGGTGATGTGCT

CTACGGCATCTCGATCCAGCAGACCTCCTCGTTTCGCGGGTTGGGACGGC

TGCGGGAGTAGGGCACCAGACGATGGGCGTCCAGCGCAGCCAGGGTCCGG

TCCTTCCAGGGTCGCAGCGTCCGCGTCAGGGTGGTCTCCGTCACGGTGAA

GGGGTGCGCGCCGGGCTGGGCGCTTGCGAGGGTGCGCTTCAGGCTCATCC

GGCTGGTCGAAAACCGCTCCCGATCGGCGCCCTGCGCGTCGGCCAGGTAG

CAATTGACCATGAGTTCGTAGTTGAGCGCCTCGGCCGCGTGGCCTTTGGC

GCGGAGCTTACCTTTGGAAGTCTGCCCGCAGGCGGGACAGAGGAGGGACT

TGAGGGCGTAGAGCTTGGGGGCGAGGAAGACGGACTCGGGGGCGTAGGCG

TCCGCGCCGCAGTGGGCGCAGACGGTCTCGCACTCCACGAGCCAGGTGAG

GTCGGGCTGGTCGGGGTCAAAAACCAGTTTCCCGCCGTTCTTTTTGATGC

GTTTCTTACCTTTGGTCTCCATGAGCTCGTGTCCCCGCTGGGTGACAAAG

AGGCTGTCCGTGTCCCCGTAGACCGACTTTATGGGCCGGTCCTCGAGCGG

TGTGCCGCGGTCCTCCTCGTAGAGGAACCCCGCCCACTCCGAGACGAAAG

CCCGGGTCCAGGCCAGCACGAAGGAGGCCACGTGGGACGGGTAGCGGTCG

TTGTCCACCAGCGGGTCCACCTTTTCCAGGGTATGCAAACACATGTCCCC

CTCGTCCACATCCAGGAAGGTGATTGGCTTGTAAGTGTAGGCCACGTGAC

```
CGGGGGTCCCGGCCGGGGGGTATAAAAGGGTGCGGGTCCCTGCTCGTCC
TCACTGTCTTCCGGATCGCTGTCCAGGAGCGCCAGCTGTTGGGGTAGGTA
TTCCCTCTCGAAGGCGGGCATGACCTCGGCACTCAGGTTGTCAGTTTCTA
GAAACGAGGAGGATTTGATATTGACGGTGCCGGCGGAGATGCCTTTCAAG
AGCCCCTCGTCCATCTGGTCAGAAAAGACGATCTTTTTGTTGTCGAGCTT
GGTGGCGAAGGAGCCGTAGAGGGCGTTGGAGAGGAGCTTGGCGATGGAGC
GCATGGTCTGGTTTTTTTCCTTGTCGGCGCGCTCCTTGGCGGCGATGTTG
AGCTGCACGTACTCGCGCGCCACGCACTTCCATTCGGGGAAGACGGTGGT
CAGCTCGTCGGGCACGATTCTGACCTGCCAGCCCCGATTATGCAGGGTGA
TGAGGTCCACACTGGTGGCCACCTCGCCGCGCAGGGGCTCATTAGTCCAG
CAGAGGCGTCCGCCCTTGCGCGAGCAGAAGGGGGGCAGGGGGTCCAGCAT
GACCTCGTCGGGGGGTCGGCATCGATGGTGAAGATGCCGGGCAGGAGGT
CGGGGTCAAAGTAGCTGATGGAAGTGGCCAGATCGTCCAGGGCAGCTTGC
CATTCGCGCACGGCCAGCGCGCGCTCGTAGGGACTGAGGGGCGTGCCCCA
GGGCATGGGATGGGTAAGCGCGGAGGCGTACATGCCGCAGATGTCGTAGA
CGTAGAGGGGCTCCTCGAGGATGCCGATGTAGGTGGGGTAGCAGCGCCCC
CCGCGGATGCTGGCGCGCACGTAGTCATACAGCTCGTGCGAGGGGGCGAG
GAGCCCCGGGCCCAGGTTGGTGCGACTGGGCTTTTCGGCGCGGTAGACGA
TCTGGCGGAAAATGGCATGCGAGTTGGAGGAGATGGTGGGCCTTTGGAAG
ATGTTGAAGTGGGCGTGGGGCAGTCCGACCGAGTCGCGGATGAAGTGGGC
GTAGGAGTCTTGCAGCTTGGCGACGAGCTCGGCGGTGACTAGGACGTCCA
GAGCGCAGTAGTCGAGGGTCTCCTGGATGATGTCATACTTGAGCTGTCCC
TTTTGTTTCCACAGCTCGCGGTTGAGAAGGAACTCTTCGCGGTCCTTCCA
GTACTCTTCGAGGGGGAACCCGTCCTGATCTGCACGGTAAGAGCCTAGCA
TGTAGAACTGGTTGACGGCCTTGTAGGCGCAGCAGCCCTTCTCCACGGGG
AGGGCGTAGGCCTGGGCGGCCTTGCGCAGGGAGGTGTGCGTGAGGGCGAA
AGTGTCCCTGACCATGACCTTGAGGAACTGGTGCTTGAAGTCGATATCGT
CGCAGCCCCCTGCTCCCAGAGCTGGAAGTCCGTGCGCTTCTTGTAGGCG
GGGTTGGGCAAAGCGAAAGTAACATCGTTGAAGAGGATCTTGCCCGCGCG
GGGCATAAAGTTGCGAGTGATGCGGAAAGGTTGGGGCACCTCGGCCCGGT
TGTTGATGACCTGGGCGGCGAGCACGATCTCGTCGAAGCCGTTGATGTTG
TGGCCCACGATGTAGAGTTCCACGAATCGCGGACGGCCCTTGACGTGGGG
CAGTTTCTTGAGCTCCTCGTAGGTGAGCTCGTCGGGGTCGCTGAGCCCGT
GCTGCTCGAGCGCCCAGTCGGCGAGATGGGGTTGGCGCGGAGGAAGGAA
GTCCAGAGATCCACGGCCAGGGCGGTTTGCAGACGGTCCCGGTACTGACG
GAACTGCTGCCCGACGGCCATTTTTTCGGGGGTGACGCAGTAGAAGGTGC
GGGGGTCCCCGTGCCAGCGATCCCATTTGAGCTGGAGGGCGAGATCGAGG
GCGAGCTCGACGAGCCGGTCGTCCCCGGAGAGTTTCATGACCAGCATGAA
GGGGACGAGCTGCTTGCCGAAGGACCCCATCCAGGTGTAGGTTTCCACAT
CGTAGGTGAGGAAGAGCCTTTCGGTGCGAGGATGCGAGCCGATGGGGAAG
AACTGGATCTCCTGCCACCAATTGGAGGAATGGCTGTTGATGTGATGGAA
```

```
GTAGAAATGCCGACGGCGCGCCGAACACTCGTGCTTGTGTTTATACAAGC
GGCCACAGTGCTCGCAACGCTGCACGGGATGCACGTGCTGCACGAGCTGT
ACCTGAGTTCCTTTGACGAGGAATTTCAGTGGGAAGTGGAGTCGTGGCGC
CTGCATCTCGTGCTGTACTACGTCGTGGTGGTCGGCCTGGCCCTCTTCTG
CCTCGATGGTGGTCATGCTGACGAGCCCGCGCGGGAGGCAGGTCCAGACC
TCGGCGCGAGCGGGTCGGAGAGCGAGGACGAGGGCGCGCAGGCCGGAGCT
GTCCAGGGTCCTGAGACGCTGCGGAGTCAGGTCAGTGGGCAGCGGCGGCG
CGCGGTTGACTTGCAGGAGTTTTTCCAGGGCGCGCGGGAGGTCCAGATGG
TACTTGATCTCCACCGCGCCATTGGTGGCGACGTCGATGGCTTGCAGGGT
CCCGTGCCCCTGGGGTGTGACCACCGTCCCCCGTTTCTTCTTGGGCGGCT
GGGGCGACGGGGCGGTGCCTCTTCCATGGTTAGAAGCGGCGGCGAGGAC
GCGCGCCGGGCGGCAGGGGCGGCTCGGGGCCCGGAGGCAGGGGCGGCAGG
GGCACGTCGGCGCCGCGCGCGGGTAGGTTCTGGTACTGCGCCCGGAGAAG
ACTGGCGTGAGCGACGACGCGACGGTTGACGTCCTGGATCTGACGCCTCT
GGGTGAAGGCCACGGGACCCGTGAGTTTGAACCTGAAAGAGAGTTCGACA
GAATCAATCTCGGTATCGTTGACGGCGGCCTGCCGCAGGATCTCTTGCAC
GTCGCCCGAGTTGTCCTGGTAGGCGATCTCGGTCATGAACTGCTCGATCT
CCTCCTCTTGAAGGTCTCCGCGGCCGGCGCGCTCCACGGTGGCCGCGAGG
TCGTTGGAGATGCGGCCCATGAGCTGCGAGAAGGCGTTCATGCCCGCCTC
GTTCCAGACGCGGCTGTAGACCACGACGCCCTCGGGATCGCCGGCGCGCA
TGACCACCTGGGCGAGGTTGAGCTCCACGTGGCGCGTGAAGACCGCGTAG
TTGCAGAGGCGCTGGTAGAGGTAGTTGAGCGTGGTGGCGATGTGCTCGGT
GACGAAGAAATACATGATCCAGCGGCGGAGCGGCATCTCGCTGACGTCGC
CCAGCGCCTCCAAACGTTCCATGGCCTCGTAAAAGTCCACGGCGAAGTTG
AAAAACTGGGAGTTGCGCGCCGAGACGGTCAACTCCTCCTCCAGAAGACG
GATGAGCTCGGCGATGGTGGCGCGCACCTCGCGCTCGAAGGCCCCCGGGA
GTTCCTCCACTTCCTCTTCTTCCTCCTCCACTAACATCTCTTCTACTTCC
TCCTCAGGCGGCAGTGGTGGCGGGGGAGGGGGCCTGCGTCGCCGGCGGCG
CACGGGCAGACGGTCGATGAAGCGCTCGATGGTCTCGCCGCGCCGGCGTC
GCATGGTCTCGGTGACGGCGCGCCCGTCCTCGCGGGGCCGCAGCGTGAAG
ACGCCGCCGCGCATCTCCAGGTGGCCGGGGGGTCCCCGTTGGGCAGGGA
GAGGGCGCTGACGATGCATCTTATCAATTGCCCCGTAGGGACTCCGCGCA
AGGACCTGAGCGTCTCGAGATCCACGGGATCTGAAAACCGCTGAACGAAG
GCTTCGAGCCAGTCGCAGTCGCAAGGTAGGCTGAGCACGGTTTCTTCTGG
CGGGTCATGTTGGTTGGGAGCGGGCGGGCGATGCTGCTGGTGATGAAGT
TGAAATAGGCGGTTCTGAGACGGCGGATGGTGGCGAGGAGCACCAGGTCT
TTGGGCCCGGCTTGCTGGATGCGCAGACGGTCGGCCATGCCCCAGGCGTG
GTCCTGACACCTGGCCAGGTCCTTGTAGTAGTCCTGCATGAGCCGCTCCA
CGGGCACCTCCTCCTCGCCCGCGCGGCCGTGCATGCGCGTGAGCCCGAAG
CCGCGCTGGGGCTGGACGAGCGCCAGGTCGGCGACGACGCGCTCGGCGAG
```

```
GATGGCTTGCTGGATCTGGGTGAGGGTGGTCTGGAAGTCATCAAAGTCGA
CGAAGCGGTGGTAGGCTCCGGTGTTGATGGTGTAGGAGCAGTTGGCCATG
ACGGACCAGTTGACGGTCTGGTGGCCCGGACGCACGAGCTCGTGGTACTT
GAGGCGCGAGTAGGCGCGCGTGTCGAAGATGTAGTCGTTGCAGGTGCGCA
CCAGGTACTGGTAGCCGATGAGGAAGTGCGGCGGCGGCTGGCGGTAGAGC
GGCCATCGCTCGGTGGCGGGGCGCCGGGCGCGAGGTCCTCGAGCATGGT
GCGGTGGTAGCCGTAGATGTACCTGGACATCCAGGTGATGCCGGCGGCGG
TGGTGGAGGCGCGCGGGAACTCGCGGACGCGGTTCCAGATGTTGCGCAGC
GGCAGGAAGTAGTTCATGGTGGGCACGGTCTGGCCCGTGAGGCGCGCGCA
GTCGTGGATGCTCTATACGGGCAAAAACGAAAGCGGTCAGCGGCTCGACT
CCGTGGCCTGGAGGCTAAGCGAACGGGTTGGGCTGCGCGTGTACCCCGGT
TCGAATCTCGAATCAGGCTGGAGCCGCAGCTAACGTGGTATTGGCACTCC
CGTCTCGACCCAAGCCTGCACCAACCCTCCAGGATACGGAGGCGGGTCGT
TTTGCAACTTTTTTTTGGAGGCCGGATGAGACTAGTAAGCGCGGAAAGCG
GCCGACCGCGATGGCTCGCTGCCGTAGTCTGGAGAAGAATCGCCAGGGTT
GCGTTGCGGTGTGCCCCGGTTCGAGGCCGGCCGGATTCCGCGGCTAACGA
GGGCGTGGCTGCCCCGTCGTTTCCAAGACCCCATAGCCAGCCGACTTCTC
CAGTTACGGAGCGAGCCCCTCTTTTGTTTTGTTTGTTTTTGCCAGATGCA
TCCCGTACTGCGGCAGATGCGCCCCCACCACCCTCCACCGCAACAACAGC
CCCCTCCACAGCCGGCGCTTCTGCCCCCGCCCCAGCAGCAACTTCCAGCC
ACGACCGCCGCGGCCGCCGTGAGCGGGGCTGGACAGAGTTATGATCACCA
GCTGGCCTTGGAAGAGGGCGAGGGGCTGGCGCGCCTGGGGCGTCGTCGC
CGGAGCGGCACCCGCGCGTGCAGATGAAAAGGGACGCTCGCGAGGCCTAC
GTGCCCAAGCAGAACCTGTTCAGAGACAGGAGCGGCGAGGAGCCCGAGGA
GATGCGCGCGGCCCGGTTCCACGCGGGGCGGGAGCTGCGGCGCGGCCTGG
ACCGAAAGAGGGTGCTGAGGGACGAGGATTTCGAGGCGGACGAGCTGACG
GGGATCAGCCCCGCGCGCGCACGTGGCCGCGGCCAACCTGGTCACGGC
GTACGAGCAGACCGTGAAGGAGGAGAGCAACTTCCAAAAATCCTTCAACA
ACCACGTGCGCACCCTGATCGCGCGCGAGGAGGTGACCCTGGGCCTGATG
CACCTGTGGGACCTGCTGGAGGCCATCGTGCAGAACCCCACCAGCAAGCC
GCTGACGGCGCAGCTGTTCCTGGTGGTGCAGCATAGTCGGGACAACGAAG
CGTTCAGGGAGGCGCTGCTGAATATCACCGAGCCCGAGGGCCGCTGGCTC
CTGGACCTGGTGAACATTCTGCAGAGCATCGTGGTGCAGGAGCGCGGGCT
GCCGCTGTCCGAGAAGCTGGCGGCCATCAACTTCTCGGTGCTGAGTTTGG
GCAAGTACTACGCTAGGAAGATCTACAAGACCCCGTACGTGCCCATAGAC
AAGGAGGTGAAGATCGACGGGTTTTACATGCGCATGACCCTGAAAGTGCT
GACCCTGAGCGACGATCTGGGGGTGTACCGCAACGACAGGATGCACCGTG
CGGTGAGCGCCAGCAGGCGGCGCGAGCTGAGCGACCAGGAGCTGATGCAT
AGTCTGCAGCGGGCCCTGACCGGGGCCGGGACCGAGGGGGAGAGCTACTT
TGACATGGGCGCGGACCTGCACTGGCAGCCCAGCCGCCGGGCCTTGGAGG
CGGCGGCAGGACCCTACGTAGAAGAGGTGGACGATGAGGTGGACGAGGAG
GGCGAGTACCTGGAAGACTGATGGCGCGACCGTATTTTTGCTAGATGCAA
CAACAACAGCCACCTCCTGATCCCGCGATGCGGGCGGCGCTGCAGAGCCA
GCCGTCCGGCATTAACTCCTCGGACGATTGGACCCAGGCCATGCAACGCA
TCATGGCGCTGACGACCCGCAACCCCGAAGCCTTTAGACAGCAGCCCCAG
GCCAACCGGCTCTCGGCCATCCTGGAGGCCGTGGTGCCCTCGCGCTCCAA
CCCCACGCACGAGAAGGTCCTGGCCATCGTGAACGCGCTGGTGGAGAACA
AGGCCATCCGCGGCGACGAGGCCGGCCTGGTGTACAACGCGCTGCTGGAG
CGCGTGGCCCGCTACAACAGCACCAACGTGCAGACCAACCTGGACCGCAT
GGTGACCGACGTGCGCGAGGCCGTGGCCCAGCGCGAGCGGTTCCACCGCG
AGTCCAACCTGGGATCCATGGTGGCGCTGAACGCCTTCCTCAGCACCCAG
CCCGCCAACGTGCCCCGGGGCCAGGAGGACTACACCAACTTCATCAGCGC
CCTGCGCCTGATGGTGACCGAGGTGCCCCAGAGCGAGGTGTACCAGTCCG
GGCCGGACTACTTCTTCCAGACCAGTCGCCAGGGCTTGCAGACCGTGAAC
CTGAGCCAGGCTTTCAAGAACTTGCAGGGCCTGTGGGGCGTGCAGGCCCC
GGTCGGGGACCGCGCGACGGTGTCGAGCCTGCTGACGCCGAACTCGCGCC
TGCTGCTGCTGCTGGTGGCCCCCTTCACGGACAGCGGCAGCATCAACCGC
AACTCGTACCTGGGCTACCTGATTAACCTGTACCGCGAGGCCATCGGCCA
GGCGCACGTGGACGAGCAGACCTACCAGGAGATCACCCACGTGAGCCGCG
CCCTGGGCCAGGACGACCCGGGCAACCTGGAAGCCACCCTGAACTTTTTG
CTGACCAACCGGTCGCAGAAGATCCCGCCCCAGTACGCGCTCAGCACCGA
GGAGGAGCGCATCCTGCGTTACGTGCAGCAGAGCGTGGGCCTGTTCCTGA
TGCAGGAGGGGCCACCCCCAGCGCCGCGCTCGACATGACCGCGCGCAAC
ATGGAGCCCAGCATGTACGCCAGCAACCGCCCGTTCATCAATAAACTGAT
GGACTACTTGCATCGGGCGGCCGCCATGAACTCTGACTATTTCACCAACG
CCATCCTGAATCCCCACTGGCTCCCGCCGCCGGGGTTCTACACGGGCGAG
TACGACATGCCCGACCCCAATGACGGGTTCCTGTGGGACGATGTGGACAG
CAGCGTGTTCTCCCCCCGACCGGGTGCTAACGAGCGCCCCTTGTGGAAGA
AGGAAGGCAGCGACCGACGCCCGTCCTCGGCGCTGTCCGGCCGCGAGGGT
GCTGCCGCGGCGGTGCCCGAGGCCGCCAGTCCTTTCCCGAGCTTGCCCTT
CTCGCTGAACAGTATCCGCAGCAGCGAGCTGGGCAGGATCACGCGCCCGC
GCTTGCTGGGCGAAGAGGAGTACTTGAATGACTCGCTGTTGAGACCCGAG
CGGGAGAAGAACTTCCCCAATAACGGGATAGAAAGCCTGGTGGACAAGAT
GAGCCGCTGGAAGACGTATGCGCAGGAGCACAGGGACGATCCCCGGGCGT
CGCAGGGGCCACGAGCCGGGGCAGCGCCGCCCGTAAACGCCGGTGGCAC
GACAGGCAGCGGGACAGATGTGGGACGATGAGGACTCCGCCGACGACAG
CAGCGTGTTGGACTTGGGTGGGAGTGGTAACCCGTTCGCTCACCTGCGCC
CCCGTATCGGGCGCATGATGTAAGAGAAACCGAAAATAAATGATACTCAC
CAAGGCCATGGCGACCAGCGTGCGTTCGTTTCTTCTCTGTTGTTGTTGTA
TCTAGTATGATGAGGCGTGCGTACCCGGAGGGTCCTCCTCCCTCGTACGA
GAGCGTGATGCAGCAGGCGATGGCGGCGGCGGCGATGCAGCCCCCGCTGG
```

-continued

AGGCTCCTTACGTGCCCCCGCGGTACCTGGCGCCTACGGAGGGGCGGAAC
AGCATTCGTTACTCGGAGCTGGCACCCTTGTACGATACCACCCGGTTGTA
CCTGGTGGACAACAAGTCGGCGGACATCGCCTCGCTGAACTACCAGAACG
ACCACAGCAACTTCCTGACCACCGTGGTGCAGAACAATGACTTCACCCCC
ACGGAGGCCAGCACCCAGACCATCAACTTTGACGAGCGCTCGCGGTGGGG
CGGCCAGCTGAAAACCATCATGCACACCAACATGCCCAACGTGAACGAGT
TCATGTACAGCAACAAGTTCAAGGCGCGGGTGATGGTCTCCCGCAAGACC
CCCAATGGGGTGACAGTGACAGAGGATTATGATGGTAGTCAGGATGAGCT
GAAGTATGAATGGGTGGAATTTGAGCTGCCCGAAGGCAACTTCTCGGTGA
CCATGACCATCGACCTGATGAACAACGCCATCATCGACAATTACTTGGCG
GTGGGGCGGCAGAACGGGGTGCTGGAGAGCGACATCGGCGTGAAGTTCGA
CACTAGGAACTTCAGGCTGGGCTGGGACCCCGTGACCGAGCTGGTCATGC
CCGGGGTGTACACCAACGAGGCTTTCCATCCCGATATTGTCTTGCTGCCC
GGCTGCGGGGTGGACTTCACCGAGAGCCGCCTCAGCAACCTGCTGGGCAT
TCGCAAGAGGCAGCCCTTCCAGGAAGGCTTCCAGATCATGTACGAGGATC
TGGAGGGGGGCAACATCCCCGCGCTCCTGGATGTCGACGCCTATGAGAAA
AGCAAGGAGGATGCAGCAGCTGAAGCAACTGCAGCCGTAGCTACCGCCTC
TACCGAGGTCAGGGGCGATAATTTTGCAAGCGCCGCAGCAGTGGCAGCGG
CCGAGGCGGCTGAAACCGAAAGTAAGATAGTCATTCAGCCGGTGGAGAAG
GATAGCAAGAACAGGAGCTACAACGTACTACCGGACAAGATAAACACCGC
CTACCGCAGCTGGTACCTAGCCTACAACTATGGCGACCCCGAGAAGGGCG
TGCGCTCCTGGACGCTGCTCACCACCTCGGACGTCACCTGCGGCGTGGAG
CAAGTCTACTGGTCGCTGCCCGACATGATGCAAGACCCGGTCACCTTCCG
CTCCACGCGTCAAGTTAGCAACTACCCGGTGGTGGGCGCCGAGCTCCTGC
CCGTCTACTCCAAGAGCTTCTTCAACGAGCAGGCCGTCTACTCGCAGCAG
CTGCGCGCCTTCACCTCGCTTACGCACGTCTTCAACCGCTTCCCCGAGAA
CCAGATCCTCGTCCGCCCGCCCGCGCCCACCATTACCACCGTCAGTGAAA
ACGTTCCTGCTCTCACAGATCACGGGACCCTGCCGCTGCGCAGCAGTATC
CGGGGAGTCCAGCGCGTGACCGTTACTGACGCCAGACGCCGCACCTGCCC
CTACGTCTACAAGGCCCTGGGCATAGTCGCGCCGCGCGTCCTCTCGAGCC
GCACCTTCTAAATGTCCATTCTCATCTCGCCCAGTAATAACACCGGTTGG
GGCCTGCGCGCGCCCAGCAAGATGTACGGAGGCGCTCGCCAACGCTCCAC
GCAACACCCCGTGCGCGTGCGCGGGCACTTCCGCGCTCCCTGGGGCGCCC
TCAAGGGCCGCGTGCGGTCGCGCACCACCGTCGACGACGTGATCGACCAG
GTGGTGGCCGACGCGCGCAACTACACCCCCGCCGCCGCGCCCGTCTCCAC
CGTGGACGCCGTCATCGACAGCGTGGTGGCGGACGCGCGCCGGTACGCCC
GCGCCAAGAGCCGGCGGCGGCGCATCGCCCGGCGGCACCGGAGCACCCCC
GCCATGCGCGCGGCGCGAGCCTTGCTGCGCAGGGCCAGGCGCACGGGACG
CAGGGCCATGCTCAGGGCGGCCAGACGCGCGGCTTCAGGCGCCAGCGCCG
GCAGGACCCGGAGACGCGCGGCCACGGCGGCGGCAGCGGCCATCGCCAGC
ATGTCCCGCCCGCGGCGAGGGAACGTGTACTGGGTGCGCGACGCCGCCAC

CGGTGTGCGCGTGCCCGTGCGCACCCGCCCCCCTCGCACTTGAAGATGTT
CACTTCGCGATGTTGATGTGTCCCAGCGGCGAGGAGGATGTCCAAGCGCA
AATTCAAGGAAGAGATGCTCCAGGTCATCGCGCCTGAGATCTACGGCCCT
GCGGTGGTGAAGGAGGAAAGAAAGCCCCGCAAAATCAAGCGGGTCAAAAA
GGACAAAAAGGAAGAAGAAAGTGATGTGGACGGATTGGTGGAGTTTGTGC
GCGAGTTCGCCCCCCGGCGGCGCGTGCAGTGGCGCGGGCGGAAGGTGCAA
CCGGTGCTGAGACCCGGCACCACCGTGGTCTTCACGCCCGGCGAGCGCTC
CGGCACCGCTTCCAAGCGCTCCTACGACGAGGTGTACGGGGATGATGATA
TTCTGGAGCAGGCGGCCGAGCGCCTGGGCGAGTTTGCTTACGGCAAGCGC
AGCCGTTCCGCACCGAAGGAAGAGGCGGTGTCCATCCCGCTGGACCACGG
CAACCCCACGCCGAGCCTCAAGCCCGTGACCTTGCAGCAGGTGCTGCCGA
CCGCGGCGCCGCGCCGGGGGTTCAAGCGCGAGGGCGAGGATCTGTACCCC
ACCATGCAGCTGATGGTGCCCAAGCGCCAGAAGCTGGAAGACGTGCTGGA
GACCATGAAGGTGGACCCGGACGTGCAGCCCGAGGTCAAGGTGCGGCCCA
TCAAGCAGGTGGCCCCGGGCCTGGGCGTGCAGACCGTGGACATCAAGATT
CCCACGGAGCCCATGGAAACGCAGACCGAGCCCATGATCAAGCCCAGCAC
CAGCACCATGGAGGTGCAGACGGATCCCTGGATGCCATCGGCTCCTAGTC
GAAGACCCCGGCGCAAGTACGGCGCGGCCAGCCTGCTGATGCCCAACTAC
GCGCTGCATCCTTCCATCATCCCCACGCCGGGCTACCGCGGCACGCGCTT
CTACCGCGGTCATACCAGCAGCCGCCGCCGCAAGACCACCACTCGCCGCC
GCCGTCGCCGCACCGCCGCTGCAACCACCCCTGCCGCCCTGGTGCGGAGA
GTGTACCGCCGCGCCGCGCACCTCTGACCCTGCCGCGCGCGCTACCA
CCCGAGCATCGCCATTTAAACTTTCGCCAGCTTTGCAGATCAATGGCCCT
CACATGCCGCCTTCGCGTTCCCATTACGGGCTACCGAGGAAGAAAACCGC
GCCGTAGAAGGCTGGCGGGAACGGGATGCGTCGCCACCACCACCGGCGG
CGGCGCGCCATCAGCAAGCGGTTGGGGGGAGGCTTCCTGCCCGCGCTGAT
CCCCATCATCGCCGCGGCGATCGGGGCGATCCCCGGCATTGCTTCCGTGG
CGGTGCAGGCCTCTCAGCGCCACTGAGACACACTTGGAAACATCTTGTAA
TAAACCCATGGACTCTGACGCTCCTGGTCCTGTGATGTGTTTTCGTAGAC
AGATGGAAGACATCAATTTTTCGTCCCTGGCTCCGCGACACGGCACGCGG
CCGTTCATGGGCACCTGGAGCGACATCGGCACCAGCCAACTGAACGGGGG
CGCCTTCAATTGGAGCAGTCTCTGGAGCGGGCTTAAGAATTTCGGGTCCA
CGCTTAAAACCTATGGCAGCAAGGCGTGGAACAGCACCACAGGGCAGGCG
CTGAGGGATAAGCTGAAAGAGCAGAACTTCCAGCAGAAGGTGGTCGATGG
GCTCGCCTCGGGCATCAACGGGGTGGTGGACCTGGCCAACCAGGCCGTGC
AGCGGCAGATCAACAGCCGCCTGGACCCGGTGCCGCCCGCCGGCTCCGTG
GAGATGCCGCAGGTGGAGGAGGAGCTGCCTCCCCTGGACAAGCGGGGCGA
GAAGCGACCCCGCCCCGATGCGGAGGAGACGCTGCTGACGCACACGGACG
AGCCGCCCCGTACGAGGAGGCGGTGAAACTGGGTCTGCCCACCACGCGG
CCCATCGCGCCCCTGGCCACCGGGGTGCTGAAACCCGAAAAGCCCGCGAC

```
CCTGGACTTGCCTCCTCCCCAGCCTTCCCGCCCCTCTACAGTGGCTAAGC
CCCTGCCGCCGGTGGCCGTGGCCCGCGCGCGACCCGGGGCACCGCCCGC
CCTCATGCGAACTGGCAGAGCACTCTGAACAGCATCGTGGGTCTGGGAGT
GCAGAGTGTGAAGCGCCGCCGCTGCTATTAAACCTACCGTAGCGCTTAAC
TTGCTTGTCTGTGTGTGTATGTATTATGTCGCCGCCGCCGCTGTCCACCA
GAAGGAGGAGTGAAGAGGCGCGTCGCCGAGTTGCAAGATGGCCACCCCAT
CGATGCTGCCCCAGTGGGCGTACATGCACATCGCCGGACAGGACGCTTCG
GAGTACCTGAGTCCGGGTCTGGTGCAGTTTGCCCGCGCCACAGACACCTA
CTTCAGTCTGGGGAACAAGTTTAGGAACCCCACGGTGGCGCCCACGCACG
ATGTGACCACCGACCGCAGCCAGCGGCTGACGCTGCGCTTCGTGCCCGTG
GACCGCGAGGACAACACCTACTCGTACAAAGTGCGCTACACGCTGGCCGT
GGGCGACAACCGCGTGCTGGACATGGCCAGCACCTACTTTGACATCCGCG
GCGTGCTGGATCGGGGCCCTAGCTTCAAACCCTACTCCGGCACCGCCTAC
AACAGTCTGGCCCCAAGGGAGCACCCAACACTTGTCAGTGGACATATAA
AGCCGATGGTACAGAAAAAACCTATACATATGGAAATGCACCCGTGCAGG
GCATTAACATCACAAAAGATGGTATTCAACTTGGAACTGACACCGATGAT
CAGCCAATCTACGCAGATAAAACCTATCAGCCTGAACCTCAAGTGGGTGA
TGCTGAATGGCATGACATCACTGGTACTGATGAAAAGTATGGAGGCAGAG
CTCTTAAGCCTGATACCAAAATGAAGCCTTGTTATGGTTCTTTTGCCAAG
CCTACTAATAAAGAAGGAGGTCAGGCAAATGTGAAAACAGGAACAGGCAC
TACTAAAGAATATGACATAGACATGGCTTTCTTTGACAACAGAAGTGCGG
CTGCTGCTGGCCTAGCTCCAGAAATTGTTTTGTATACTGAAAATGTGGAT
TTGGAAACTCCAGATACCCATATTGTATACAAAGCAGGCACAGATGACAG
CAGCTCTTCTATTAATTTGGGTCAGCAAGCCATGCCCAACAGACCTAACT
ACATTGGTTTCAGAGACAACTTTATCGGGCTCATGTACTACAACAGCACT
GGCAATATGGGGGTGCTGGCCGGTCAGGCTTCTCAGCTGAATGCTGTGGT
TGACTTGCAAGACAGAAACACCGAGCTGTCCTACCAGCTCTTGCTTGACT
CTCTGGGTGACAGAACCCGGTATTTCAGTATGTGGAATCAGGCGGTGGAC
AGCTATGATCCTGATGTGCGCATTATTGAAAATCATGGTGTGGAGGATGA
ACTTCCCAACTATTGTTTCCCTCTGGATGCTGTTGGCAGAACAGATACTT
ATCAGGGAATTAAGGCTAATGGAACTGATCAAACCACATGGACCAAAGAT
GACAGTGTCAATGATGCTAATGAGATAGGCAAGGGTAATCCATTCGCCAT
GGAAATCAACATCCAAGCCAACCTGTGGAGGAACTTCCTCTACGCCAACG
TGGCCCTGTACCTGCCCGACTCTTACAAGTACACGCCGGCCAATGTTACC
CTGCCCACCAACACCAACACCTACGATTACATGAACGGCCGGGTGGTGGC
GCCCTCGCTGGTGGACTCCTACATCAACATCGGGGCGCGCTGGTCGCTGG
ATCCCATGGACAACGTGAACCCCTTCAACCACCACCGCAATGCGGGGCTG
CGCTACCGCTCCATGCTCCTGGGCAACGGGCGCTACGTGCCCTTCCACAT
CCAGGTGCCCCAGAAATTTTTCGCCATCAAGAGCCTCCTGCTCCTGCCCG
GGTCCTACACCTACGAGTGGAACTTCCGCAAGGACGTCAACATGATCCTG
CAGAGCTCCCTCGGCAACGACCTGCGCACGGACGGGGCCTCCATCTCCTT
CACCAGCATCAACCTCTACGCCACCTTCTTCCCCATGGCGCACAACACGG
CCTCCACGCTCGAGGCCATGCTGCGCAACGACACCAACGACCAGTCCTTC
AACGACTACCTCTCGGCGGCCAACATGCTCTACCCCATCCCGGCCAACGC
CACCAACGTGCCCATCTCCATCCCCTCGCGCAACTGGGCCGCCTTCCGCG
GCTGGTCCTTCACGCGTCTCAAGACCAAGGAGACGCCCTCGCTGGGCTCC
GGGTTCGACCCCTACTTCGTCTACTCGGGCTCCATCCCCTACCTCGACGG
CACCTTCTACCTCAACCACACCTTCAAGAAGGTCTCCATCACCTTCGACT
CCTCCGTCAGCTGGCCCGGCAACGACCGGCTCCTGACGCCCAACGAGTTC
GAAATCAAGCGCACCGTCGACGGCGAGGGCTACAACGTGGCCCAGTGCAA
CATGACCAAGGACTGGTTCCTGGTCCAGATGCTGGCCCACTACAACATCG
GCTACCAGGGCTTCTACGTGCCCGAGGGCTACAAGGACCGCATGTACTCC
TTCTTCCGCAACTTCCAGCCCATGAGCCGCCAGGTGGTGGACGAGGTCAA
CTACAAGGACTACCAGGCCGTCACCCTGGCCTACCAGCACAACAACTCGG
GCTTCGTCGGCTACCTCGCGCCCACCATGCGCCAGGGCCAGCCCTACCCC
GCCAACTACCCCTACCCGCTCATCGGCAAGAGCGCCGTCACCAGCGTCAC
CCAGAAAAAGTTCCTCTGCGACAGGGTCATGTGGCGCATCCCCTTCTCCA
GCAACTTCATGTCCATGGGCGCGCTCACCGACCTCGGCCAGAACATGCTC
TATGCCAACTCCGCCCACGCGCTAGACATGAATTTCGAAGTCGACCCCAT
GGATGAGTCCACCCTTCTCTATGTTGTCTTCGAAGTCTTCGACGTCGTCC
GAGTGCACCAGCCCCACCGCGGCGTCATCGAGGCCGTCTACCTGCGCACC
CCCTTCTCGGCCGGTAACGCCACCACCTAAGCTCTTGCTTCTTGCAAGCC
ATGGCCGCGGGCTCCGGCGAGCAGGAGCTCAGGGCCATCATCCGCGACCT
GGGCTGCGGGCCCTACTTCCTGGGCACCTTCGATAAGCGCTTCCCGGGAT
TCATGGCCCCGCACAAGCTGGCCTGCGCCATCGTCAACACGGCCGGCCGC
GAGACCGGGGCGAGCACTGGCTGGCCTTCGCCTGGAACCCGCGCTCGAA
CACCTGCTACCTCTTCGACCCCTTCGGGTTCTCGGACGAGCGCCTCAAGC
AGATCTACCAGTTCGAGTACGAGGGCCTGCTGCCGCAGCGCCCTGGCC
ACCGAGGACCGCTGCGTCACCCTGGAAAAGTCCACCCAGACCGTGCAGGG
TCCGCGCTCGGCCGCCTGCGGGCTCTTCTGCTGCATGTTCCTGCACGCCT
TCGTGCACTGGCCCGACCGCCCCATGGACAAGAACCCCACCATGAACTTG
CTGACGGGGTGCCCAACGGCATGCTCCAGTCGCCCAGGTGGAACCCAC
CCTGCGCCGCAACCAGGAGGCGCTCTACCGCTTCCTCAACTCCCACTCCG
CCTACTTTCGCTCCCACCGCGCGCGCATCGAGAAGGCCACCGCCTTCGAC
CGCATGAATCAAGACATGTAAACCGTGTGTGTATGTTAAATGTCTTTAAT
AAACAGCACTTTCATGTTACACATGCATCTGAGATGATTTATTTAGAAAT
CGAAAGGGTTCTGCCGGGTCTCGGCATGGCCCGCGGGCAGGGACACGTTG
CGGAACTGGTACTTGGCCAGCCACTTGAACTCGGGGATCAGCAGTTTGGG
CAGCGGGGTGTCGGGAAGGAGTCGGTCCACAGCTTCCGCGTCAGTTGCA
GGGCGCCCAGCAGGTCGGGCGCGGAGATCTTGAAATCGCAGTTGGGACCC
GCGTTCTGCGCGCGGGAGTTGCGGTACACGGGGTTGCAGCACTGGAACAC
```

-continued

```
CATCAGGGCCGGGTGCTTCACGCTCGCCAGCACCGTCGCGTCGGTGATGC

TCTCCACGTCGAGGTCCTCGGCGTTGGCCATCCCGAAGGGGGTCATCTTG

CAGGTCTGCCTTCCCATGGTGGGCACGCACCCGGGCTTGTGGTTGCAATC

GCAGTGCAGGGGGATCAGCATCATCTGGGCCTGGTCGGCGTTCATCCCCG

GGTACATGGCCTTCATGAAAGCCTCCAATTGCCTGAACGCCTGCTGGGCC

TTGGCTCCCTCGGTGAAGAAGACCCCGCAGGACTTGCTAGAGAACTGGTT

GGTGGCGCACCCGGCGTCGTGCACGCAGCAGCGCGCGTCGTTGTTGGCCA

GCTGCACCACGCTGCGCCCCCAGCGGTTCTGGGTGATCTTGGCCCGGTCG

GGGTTCTCCTTCAGCGCGCGCTGCCCGTTCTCGCTCGCCACATCCATCTC

GATCATGTGCTCCTTCTGGATCATGGTGGTCCCGTGCAGGCACCGCAGCT

TGCCCTCGGCCTCGGTGCACCCGTGCAGCCACAGCGCGCACCCGGTGCAC

TCCCAGTTCTTGTGGGCGATCTGGGAATGCGCGTGCACGAAGCCCTGCAG

GAAGCGGCCCATCATGGTGGTCAGGGTCTTGTTGCTAGTGAAGGTCAGCG

GAATGCCGCGGTGCTCCTCGTTGATGTACAGGTGGCAGATGCGGCGGTAC

ACCTCGCCCTGCTCGGGCATCAGCTGGAAGTTGGCTTTCAGGTCGGTCTC

CACGCGGTAGCGGTCCATCAGCATAGTCATGATTTCCATACCCTTCTCCC

AGGCCGAGACGATGGGCAGGCTCATAGGGTTCTTCACCATCATCTTAGCG

CTAGCAGCCGCGGCCAGGGGGTCGCTCTCGTCCAGGGTCTCAAAGCTCCG

CTTGCCGTCCTTCTCGGTGATCCGCACCGGGGGGTAGCTGAAGCCCACGG

CCGCCAGCTCCTCCTCGGCCTGTCTTTCGTCCTCGCTGTCCTGGCTGACG

TCCTGCAGGACCACATGCTTGGTCTTGCGGGGTTTCTTCTTGGGCGGCAG

CGGCGGCGGAGATGTTGGAGATGGCGAGGGGGAGCGCGAGTTCTCGCTCA

CCACTACTATCTCTTCCTCTTCTTGGTCCGAGGCCACGCGGCGGTAGGTA

TGTCTCTTCGGGGGCAGAGGCGGAGGCGACGGGCTCTCGCCGCCGCGACT

TGGCGGATGGCTGGCAGAGCCCCTTCCGCGTTCGGGGGTGCGCTCCCGGC

GGCGCTCTGACTGACTTCCTCCGCGGCCGGCCATTGTGTTCTCCTAGGGA

GGAACAACAAGCATGGAGACTCAGCCATCGCCAACCTCGCCATCTGCCCC

CACCGCCGACGAGAAGCAGCAGCAGCAGAATGAAAGCTTAACCGCCCCGC

CGCCCAGCCCCGCCACCTCCGACGCGGCCGTCCCAGACATGCAAGAGATG

GAGGAATCCATCGAGATTGACCTGGCTATGTGACGCCCGCGGAGCACGA

GGAGGAGCTGGCAGTGCGCTTTTCACAAGAAGAGATACACCAAGAACAGC

CAGAGCAGGAAGCAGAGAATGAGCAGAGTCAGGCTGGGCTCGAGCATGAC

GGCGACTACCTCCACCTGAGCGGGGGGAGGACGCGCTCATCAAGCATCT

GGCCCGGCAGGCCACCATCGTCAAGGATGCGCTGCTCGACCGCACCGAGG

TGCCCCTCAGCGTGGAGGAGCTCAGCCGCGCCTACGAGTTGAACCTCTTC

TCGCCGCGCGTGCCCCCCAAGCGCCAGCCCAATGGCACCTGCGAGCCCAA

CCCGCGCCTCAACTTCTACCCGGTCTTCGCGGTGCCCGAGGCCCTGGCCA

CCTACCACATCTTTTTCAAGAACCAAAAGATCCCCGTCTCCTGCCGCGCC

AACCGCACCCGCGCCGACGCCCTTTTCAACCTGGGTCCCGGCGCCCGCCT

ACCTGATATCGCCTCCTTGGAAGAGGTTCCCAAGATCTTCGAGGGTCTGG

GCAGCGACGAGACTCGGGCCGCGAACGCTCTGCAAGGAGAAGGAGGAGAG
```

-continued

```
CATGAGCACCACAGCGCCCTGGTCGAGTTGGAAGGCGACAACGCGCGGCT

GGCGGTGCTCAAACGCACGGTCGAGCTGACCCATTTCGCCTACCCGGCTC

TGAACCTGCCCCCCAAAGTCATGAGCGCGGTCATGGACCAGGTGCTCATC

AAGCGCGCGTCGCCCATCTCCGAGGACGAGGGCATGCAAGACTCCGAGGA

GGGCAAGCCCGTGGTCAGCGACGAGCAGCTGGCCCGGTGGCTGGGTCCTA

ATGCTAGTCCCCAGAGTTTGGAAGAGCGGCGCAAACTCATGATGGCCGTG

GTCCTGGTGACCGTGGAGCTGGAGTGCCTGCGCCGCTTCTTCGCCGACGC

GGAGACCCTGCGCAAGGTCGAGGAGAACCTGCACTACCTCTTCAGGCACG

GGTTCGTGCGCCAGGCCTGCAAGATCTCCAACGTGGAGCTGACCAACCTG

GTCTCCTACATGGGCATCTTGCACGAGAACCGCCTGGGGCAGAACGTGCT

GCACACCACCCTGCGCGGGGAGGCCCGGCGCGACTACATCCGCGACTGCG

TCTACCTCTACCTCTGCCACACCTGGCAGACGGGCATGGGCGTGTGGCAG

CAGTGTCTGGAGGAGCAGAACCTGAAAGAGCTCTGCAAGCTCCTGCAGAA

GAACCTCAAGGGTCTGTGGACCGGGTTCGACGAGCGCACCACCGCCTCGG

ACCTGGCCGACCTCATTTTCCCCGAGCGCCTCAGGCTGACGCTGCGCAAC

GGCCTGCCCGACTTTATGAGCCAAAGCATGTTGCAAAACTTTCGCTCTTT

CATCCTCGAACGCTCCGGAATCCTGCCCGCCACCTGCTCCGCGCTGCCCT

CGGACTTCGTGCCGCTGACCTTCCGCGAGTGCCCCCGCCGCTGTGGAGC

CACTGCTACCTGCTGCGCCTGGCCAACTACCTGGCCTACCACTCGGACGT

GATCGAGGACGTCAGCGGCGAGGGCCTGCTCGAGTGCCACTGCCGCTGCA

ACCTCTGCACGCCGCACCGCTCCCTGGCCTGCAACCCCCAGCTGCTGAGC

GAGACCCAGATCATCGGCACCTTCGAGTTGCAAGGGCCCAGCGAAGGCGA

GGGTTCAGCCGCCAAGGGGGGTCTGAAACTCACCCCGGGGCTGTGGACCT

CGGCCTACTTGCGCAAGTTCGTGCCCGAGGACTACCATCCCTTCGAGATC

AGGTTCTACGAGGACCAATCCCATCCGCCCAAGGCCGAGCTGTCGGCCTG

CGTCATCACCCAGGGGGCGATCCTGGCCCAATTGCAAGCCATCCAGAAAT

CCCGCCAAGAATTCTTGCTGAAAAAGGGCCGCGGGGTCTACCTCGACCCC

CAGACCGGTGAGGAGCTCAACCCCGGCTTCCCCCAGGATGCCCCGAGGAA

ACAAGAAGCTGAAAGTGGAGCTGCCGCCCGTGGAGGATTTGGAGGAAGAC

TGGGAGAACAGCAGTCAGGCAGAGGAGGAGGAGATGGAGGAAGACTGGGA

CAGCACTCAGGCAGAGGAGGACAGCCTGCAAGACAGTCTGGAGGAAGACG

AGGAGGAGGCAGAGGAGGAGGTGGAAGAAGCAGCCGCCGCCAGACCGTCG

TCCTCGGCGGGGAGAAAGCAAGCAGCACGGATACCATCTCCGCTCCGGG

TCGGGGTCCCGCTCGACCACACAGTAGATGGGACGAGACCGGACGATTCC

CGAACCCCACCACCCAGACGGTAAGAAGGAGCGGCAGGGATACAAGTCC

TGGCGGGGCACAAAAACGCCATCGTCTCCTGCTTGCAGGCCTGCGGGGG

CAACATCTCCTTCACCCGGCGCTACCTGCTCTTCCACCGCGGGGTGAACT

TTCCCCGCAACATCTTGCATTACTACCGTCACCTCCACAGCCCCTACTAC

TTCCAAGAAGAGGCAGCAGCAGCAGAAAAAGACCAGCAGAAAACCAGCAG

CTAGAAAATCCACAGCGGCGGCAGCAGGTGGACTGAGGATCGCGGCGAAC
```

-continued

GAGCCGGCGCAAACCCGGGAGCTGAGGAACCGGATCTTTCCCACCCTCTA
TGCCATCTTCCAGCAGAGTCGGGGCAGGAGCAGGAACTGAAAGTCAAGA
ACCGTTCTCTGCGCTCGCTCACCCGCAGTTGTCTGTATCACAAGAGCGAA
GACCAACTTCAGCGCACTCTCGAGGACGCCGAGGCTCTCTTCAACAAGTA
CTGCGCGCTCACTCTTAAAGAGTAGCCCGCGCCCGCCCAGTCGCAGAAAA
AGGCGGGAATTACGTCACCTGTGCCCTTCGCCCTAGCCGCCTCCACCCAT
CATCATGAGCAAAGAGATTCCCACGCCTTACATGTGGAGCTACCAGCCCC
AGATGGGCCTGGCCGCCGGTGCCGCCCAGGACTACTCCACCCGCATGAAT
TGGCTCAGCGCCGGGCCCGCGATGATCTCACGGGTGAATGACATCCGCGC
CCACCGAAACCAGATACTCCTAGAACAGTCAGCGCTCACCGCCACGCCCC
GCAATCACCTCAATCCGCGTAATTGGCCCGCCGCCCTGGTGTACCAGGAA
ATTCCCCAGCCCACGACCGTACTACTTCCGCGAGACGCCCAGGCCGAAGT
CCAGCTGACTAACTCAGGTGTCCAGCTGGCGGCGGCGCCACCCTGTGTC
GTCACCGCCCCGCTCAGGGTATAAAGCGGCTGGTGATCCGGGGCAGAGGC
ACACAGCTCAACGACGAGGTGGTGAGCTCTTCGCTGGGTCTGCGACCTGA
CGGAGTCTTCCAACTCGCCGGATCGGGGAGATCTTCCTTCACGCCTCGTC
AGGCCGTCCTGACTTTGGAGAGTTCGTCCTCGCAGCCCCGCTCGGGTGGC
ATCGGCACTCTCCAGTTCGTGGAGGAGTTCACTCCCTCGGTCTACTTCAA
CCCCTTCTCCGGCTCCCCGGCCACTACCCGGACGAGTTCATCCCGAACT
TCGACGCCATCAGCGAGTCGGTGGACGGCTACGATTGAATGTCCCATGGT
GGCGCAGCTGACCTAGCTCGGCTTCGACACCTGGACCACTGCCGCCGCTT
CCGCTGCTTCGCTCGGGATCTCGCCGAGTTTGCCTACTTTGAGCTGCCCG
AGGAGCACCCTCAGGGCCCGGCCCACGGAGTGCGGATCGTCGTCGAAGGG
GGCCTCGACTCCCACCTGCTTCGGATCTTCAGCCAGCGTCCGATCCTGGT
CGAGCGCGAGCAAGGACAGACCCTTCTGACTCTGTACTGCATCTGCAACC
ACCCCGGCCTGCATGAAAGTCTTTGTTGTCTGCTGTGTACTGAGTATAAT
AAAAGCTGAGATCAGCGACTACTCCGGACTTCCGTGTGTTCCTGAATCCA
TCAACCAGTCTTTGTTCTTCACCGGGAACGAGACCGAGCTCCAGCTCCAG
TGTAAGCCCCACAAGAAGTACCTCACCTGGCTGTTCCAGGGCTCCCCGAT
CGCCGTTGTCAACCACTGCGACAACGACGGAGTCCTGCTGAGCGGCCCTG
CCAACCTTACTTTTTCCACCCGCAGAAGCAAGCTCCAGCTCTTCCAACCC
TTCCTCCCCGGGACCTATCAGTGCGTCTCGGGACCCTGCCATCACACCTT
CCACCTGATCCCGAATACCACAGCGTCGCTCCCCGCTACTAACAACCAAA
CTAACCTCCACCAACGCCACCGTCGCGACCGCGGACATGTACAGAGCTCG
AGAAGTACTAGGCCACAATACATGCCCATATTAGACTATGAGGCCGAGCC
ACAGCGACCCATGCTCCCCGCTATTAGTTACTTCAATCTAACCGGCGGAG
ATGACTGACCCACTGGCCAACAACAACGTCAACGACCTTCTCCTGGACAT
GGACGGCCGCGCCTCGGAGCAGCGACTCGCCCAACTTCGCATTCGCCAGC
AGCAGGAGAGACCGTCAAGGAGCTGCAGGATGCGGTGGCCATCCACCAG
TGCAAGAGAGGCATCTTCTGCCTGGTGAAACAGGCCAAGATCCCTACGA
GGTCACTCCAAACGACCATCGCCTCTCCTACGAGCTCCTGCAGCAGCGCC

AGAAGTTCACCTGCCTGGTCGGAGTCAACCCCATCGTCATCACCCAGCAG
TCTGGCGATACCAAGGGGTGCATCCACTGCTCCTGCGACTCCCCCGACTG
CGTCCACACTCTGATCAAGACCCTCTGCGGCCTCCGCGACCTCCTCCCCA
TGAACTAATCACCCCCTTATCCAGTGAAATAAAGATCATATTGATGATGA
TTTTACAGAAATAAAAAATAATCATTTGATTTGAAATAAAGATACAATCA
TATTGATGATTTGAGTTTAACAAAAAAATAAAGAATCACTTACTTGAAAT
CTGATACCAGGTCTCTGTCCATGTTTTCTGCCAACACCACTTCACTCCCC
TCTTCCCAGCTCTGGTACTGCAGGCCCCGGCGGGCTGCAAACTTCCTCCA
CACGCTGAAGGGGATGTCAAATTCCTCCTGTCCCTCAATCTTCATTTTAT
CTTCTATCAGATGTCCAAAAAGCGCGTCCGGGTGGATGATGACTTCGACC
CCGTCTACCCCTACGATGCAGACAACGCACCGACCGTGCCCTTCATCAAC
CCCCCCTTCGTCTCTTCAGATGGATTCCAAGAGAAGCCCCTGGGGGTGTT
GTCCCTGCGACTGGCCGACCCCGTCACCACCAAGAACGGGGAAATCACCC
TCAAGCTGGGAGAGGGGGTGGACCTCGATTCCTCGGGAAAACTCATCTCC
AACACGGCCACCAAGGCCGCCGCCCCTCTCAGTTTTTCCAACAACACCAT
TTCCCTTAACATGGATCACCCCTTTTACACTAAAGATGGAAAATTATCCT
TACAAGTTTCTCCACCATTAAATATACTGAGAACAAGCATTCTAAACACA
CTAGCTTTAGGTTTTGGATCAGGTTTAGGACTCCGTGGCTCTGCCTTGGC
AGTACAGTTAGTCTCTCCACTTACATTTGATACTGATGGAAACATAAAGC
TTACCTTAGACAGAGGTTTGCATGTTACAACAGGAGATGCAATTGAAAGC
AACATAAGCTGGGCTAAAGGTTTAAAATTTGAAGATGGAGCCATAGCAAC
CAACATTGGAAATGGGTTAGAGTTTGGAAGCAGTAGTACAGAAACAGGTG
TTGATGATGCTTACCCAATCCAAGTTAAACTTGGATCTGGCCTTAGCTTT
GACAGTACAGGAGCCATAATGGCTGGTAACAAAGAAGACGATAAACTCAC
TTTGTGGACAACACCTGATCCATCACCAAACTGTCAAATACTCGCAGAAA
ATGATGCAAAACTAACACTTTGCTTGACTAAATGTGGTAGTCAAATACTG
GCCACTGTGTCAGTCTTAGTTGTAGGAAGTGGAAACCTAAACCCCATTAC
TGGCACCGTAAGCAGTGCTCAGGTGTTTCTACGTTTTGATGCAAACGGTG
TTCTTTTAACAGAACATTCTACACTAAAAAAATACTGGGGGTATAGGCAG
GGAGATAGCATAGATGGCACTCCATATACCAATGCTGTAGGATTCATGCC
CAATTTAAAAGCTTATCCAAAGTCACAAAGTTCTACTACTAAAAATAATA
TAGTAGGGCAAGTATACATGAATGGAGATGTTTCAAAACCTATGCTTCTC
ACTATAACCCTCAATGGTACTGATGACAGCAACAGTACATATTCAATGTC
ATTTTCATACACCTGGACTAATGGAAGCTATGTTGGAGCAACATTTGGGG
CTAACTCTTATACCTTCTCATACATCGCCCAAGAATGAACACTGTATCCC
ACCCTGCATGCCAACCCTTCCCACCCCACTCTGTGGAACAAACTCTGAAA
CACAAAATAAAATAAAGTTCAAGTGTTTTATTGATTCAACAGTTTTACAG
GATTCGAGCAGTTATTTTCCTCCACCCTCCCAGGACATGGAATACACCA
CCCTCTCCCCCCGCACAGCCTTGAACATCTGAATGCCATTGGTGATGGAC
ATGCTTTTGGTCTCCACGTTCCACACAGTTTCAGAGCGAGCCAGTCTCGG

-continued

```
GTCGGTCAGGGAGATGAAACCCTCCGGGCACTCCCGCATCTGCACCTCAC
AGCTCAACAGCTGAGGATTGTCCTCGGTGGTCGGGATCACGGTTATCTGG
AAGAAGCAGAAGAGCGGCGGTGGGAATCATAGTCCGCGAACGGGATCGGC
CGGTGGTGTCGCATCAGGCCCCGCAGCAGTCGCTGCCGCCGCCGCTCCGT
CAAGCTGCTGCTCAGGGGGTCCGGGTCCAGGGACTCCCTCAGCATGATGC
CCACGGCCCTCAGCATCAGTCGTCTGGTGCGGCGGGCGCAGCAGCGCATG
CGGATCTCGCTCAGGTCGCTGCAGTACGTGCAACACAGAACCACCAGGTT
GTTCAACAGTCCATAGTTCAACACGCTCCAGCCGAAACTCATCGCGGGAA
GGATGCTACCCACGTGGCCGTCGTACCAGATCCTCAGGTAAATCAAGTGG
TGCCCCCTCCAGAACACGCTGCCCACGTACATGATCTCCTTGGGCATGTG
GCGGTTCACCACCTCCCGGTACCACATCACCCTCTGGTTGAACATGCAGC
CCCGGATGATCCTGCGGAACCACAGGGCCAGCACCGCCCCGCCCGCCATG
CAGCGAAGAGACCCGGGTCCCGGCAATGGCAATGGAGGACCCACCGCTC
GTACCCGTGGATCATCTGGGAGCTGAACAAGTCTATGTTGGCACAGCACA
GGCATATGCTCATGCATCTCTTCAGCACTCTCAACTCCTCGGGGGTCAAA
ACCATATCCCAGGGCACGGGGAACTCTTGCAGGACAGCGAACCCCGCAGA
ACAGGGCAATCCTCGCACAGAACTTACATTGTGCATGGACAGGGTATCGC
AATCAGGCAGCACCGGGTGATCCTCCACCAGAGAAGCGCGGGTCTCGGTC
TCCTCACAGCGTGGTAAGGGGGCCGGCCGATACGGGTGATGGCGGGACGC
GGCTGATCGTGTTCGCGACCGTGTCATGATGCAGTTGCTTTCGGACATTT
TCGTACTTGCTGTAGCAGAACCTGGTCCGGGCGCTGCACACCGATCGCCG
GCGGCGGTCTCGGCGCTTGGAACGCTCGGTGTTGAAATTGTAAACAGCC
ACTCTCTCAGACCGTGCAGCAGATCTAGGGCCTCAGGAGTGATGAAGATC
CCATCATGCCTGATGGCTCTGATCACATCGACCACCGTGGAATGGGCCAG
ACCCAGCCAGATGATGCAATTTTGTTGGGTTTCGGTGACGGCGGGGAGG
GAAGAACAGGAAGAACCATGATTAACTTTTAATCCAAACGGTCTCGGAGT
ACTTCAAAATGAAGATCGCGGAGATGGCACCTCTCGCCCCCGCTGTGTTG
GTGGAAAATAACAGCCAGGTCAAAGGTGATACGGTTCTCGAGATGTTCCA
CGGTGGCTTCCAGCAAAGCCTCCACGCGCACATCCAGAAACAAGACAATA
GCGAAAGCGGGAGGGTTCTCTAATTCCTCAATCATCATGTTACACTCCTG
CACCATCCCCAGATAATTTTCATTTTTCCAGCCTTGAATGATTCGAACTA
GTTCGTGAGGTAAATCCAAGCCAGCCATGATAAAGAGCTCGCGCAGAGCG
CCCTCCACCGGCATTCTTAAGCACACCCTCATAATTCCAAGATATTCTGC
TCCTGGTTCACCTGCAGCAGATTGACAAGCGGAATATCAAAATCTCTGCC
GCGATCCCTGAGCTCCTCCCTCAGCAATAACTGTAAGTACTCTTTCATAT
CCTCTCCGAAATTTTTAGCCATAGGACCACCAGGAATAAGATTAGGGCAA
GCCACAGTACAGATAAACCGAAGTCCTCCCCAGTGAGCATTGCCAAATGC
AAGACTGCTATAAGCATGCTGGCTAGACCCGGTGATATCTTCCAGATAAC
TGGACAGAAAATCGCCCAGGCAATTTTTAAGAAAATCAACAAAAGAAAAA
TCCTCCAGGTGGACGTTTAGAGCCTCGGGAACAACGATGAAGTAAATGCA
AGCGGTGCGTTCCAGCATGGTTAGTTAGCTGATCTGTAGAAAAAACAAAA
```

-continued

```
ATGAACATTAAACCATGCTAGCCTGGCGAACAGGTGGGTAAATCGTTCTC
TCCAGCACCAGGCAGGCCACGGGGTCTCCGGCGCGACCCTCGTAAAAATT
GTCGCTATGATTGAAAACCATCACAGAGAGACGTTCCCGGTGGCCGGCGT
GAATGATTCGACAAGATGAATACACCCCCGGAACATTGGCGTCCGCGAGT
GAAAAAAAGCGCCCGAGGAAGCAATAAGGCACTACAATGCTCAGTCTCAA
GTCCAGCAAAGCGATGCCATGCGGATGAAGCACAAAATTCTCAGGTGCGT
ACAAAATGTAATTACTCCCCTCCTGCACAGGCAGCAAAGCCCCCGATCCC
TCCAGGTACACATACAAAGCCTCAGCGTCCATAGCTTACCGAGCAGCAGC
ACACAACAGGCGCAAGAGTCAGAGAAAGGCTGAGCTCTAACCTGTCCACC
CGCTCTCTGCTCAATATATAGCCCAGATCTACACTGACGTAAAGGCCAAA
GTCTAAAAATACCCGCCAAATAATCACACACGCCCAGCACACGCCCAGAA
ACCGGTGACACACTCAAAAAAATACGCGCACTTCCTCAAACGCCCAAAAC
TGCCGTCATTTCCGGGTTCCCACGCTACGTCATCAAAACACGACTTTCAA
ATTCCGTCGACCGTTAAAAACGTCACCCGCCCCGCCCCTAACGGTCGCCC
GTCTCTCAGCCAATCAGCGCCCCGCATCCCCAAATTCAAACACCTCATTT
GCATATTAACGCGCACAAAAAGTTTGAGGTATATTATTGATGATG
```

K9 Melapoly Nucleic Acid Sequence (SEQ ID NO. 2)

```
TTCCTGCCCTGGCACCGGCTGTTCGGCCAGATGAAGAACGGCAGCACCCC
CATGTTCCTGAGCCCCGCCAGCTTCTTCAGCAGCTGGACCCCCATGTTCA
ACGACATTAATATCTACGTGGAGTTCTGCCTGAGCCTGACCCAGTACCTG
GCCCTGCGGCGGCACCGGCCCCTGCAGAGCAGCATGCACAACGCCCTGCA
CATCTACATGCTGCTGATGGTGCCCTTCATCCCCCTGTACCGGTTCCTGC
TGCGGTGGGAGCAGGAGATCAGCAGCAAGGACCTGGGCTACGACTACGCC
GCGGCAGCCAAGGCCTGGAACCGGCAGCTGTACCCCGAGTGGCGAGCCCT
GGTGGTGACCCACACCTACAAGGTGCTGCCCGACGGCCAGGTGATCTGGC
TGATGGCCGTGGTGCTGGCCAGCCTGATCTACCAGGTGTGGGGCGGCCAG
CCCGTGTACCACTGGACCATGGAGGTGACCGTGTACCACCGGCAGCTGTT
CACCATCACCGACCAGGTGCCCTTCAGCCTGGCCCGTGCCCTGGTGGTGA
CCCACACCTACGTGCTGATGGCCGTGGTGCTGGCGGCTGCAGCCAACTAC
TTCGTGTGGACCCACTACTACAGCACCACCTACAGCTTCAGCCTGCCCTA
CTGGAACTTCGTGACCGCCTACTACATCAGCCCCAACAGCGTGTTCAGCC
AGTGGACCCCCCAGTTCGAGAACCGGAACGTGGCCCGGCCCATGGTGCAG
CGGTACAGCAACAGCACCAACAGCTTCCGGCTGCACAACCTGGCCCACCT
GTTCCTGCTGTTCCAGCAGGCCCGGGCTCAGTTCCGGAGCCGGCAGTACA
ACATGGTGCCCTTCTGGGCACTGATCTTCGGCACCGCCAGCTACATCTTC
TTCCCCCTGCTGCTGTTCGTGACCGCCCCCGACAACCTGGGCTACGCGGC
TGCGGCGGCCAGCTTCGCCCTGCCCTACTGGAACTTCCAGCCCTACATGA
GCCTGCACAACCTGGTGCACAGCTTCGTGGCCCTGGTGCTGCACAGCTTC
ACCGACGCCATCTTCCTGCAGCTGACCAGCGACCAGCTGGGCTACAGCTA
CCCCTACCTGCAGTACCGGCGGCTGCGGAAGGGCTACAGCGCCGCAGCTG
```

-continued
CTGCCCTGTACCGGGCCAGCGAGCACCTGGAGCTGATCTTCCTGTACGAC

GGCATCGAGGACGGCATCGAGCACTTCTGGAAGGTGTTCAACACCATGGG

CCTGTACGGCCTGTACGACCTGCTGATGACCGTGCTGGGCATCATCTTCA

TGCCCCGGGGCCAGAAGAGCAAGCTGCTGTACGACGGCATCGAGCACTTC

ATGTTCAAGTTCCTGGTGAAGGAGAACTACCTGGAGTACGTGCCCAACAG

CGACCCCCCCCGGTACTTCGTGTGGAAGGTGTTCAACACCATGGGCCTGT

ACAAGGTGCTGGAGTTCCTGGCCAAGGTG

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

The Materials and Methods used in the performance of the experiments disclosed herein are now described.

Sequences for human Tyrosinase, gp100, Trp-1, Trp-2 and MAGBA were checked for T cell epitopes that reacted with multiple human HLA class I alleles. Stretches of sequences that encoded multiple epitopes and that showed homology with the corresponding canine sequences were selected. A synthetic gene encoding the sequences separated by two alanines each was purchased and cloned into HSV-1 gD. The gD fusion gene was inserted into the E1 domain of the molecular clone of AdC68.

```
Inserted Amino acid sequence (spacers underlined)
                                              (SEQ ID NO. 3)
FLPWHRLFGQMKNGSTPMFLSPASFFSSWTPMFNDINIYVEFCLSLTQY

LALRRHRPLQSSMHNALHIYMLLMVPFIPLYRFLLRWEQEISSKDLGYD

YAAKAWNRQLYPEWRALVVTHTYKVLPDGQVIWLMAVVLASLIYQVWGG

QPVYHWTMEVTVYHRQLFTITDQVPFSLARALVVTHTYVLMAVVLAANY

FVWTHYYSTTYSFSLPYWNFVTAYYISPNSVFSQWTPQFENRNVARPMV

QRYSNSTNSFRLHNLAHLFLLFQQARAQFRSRQYNMVPFWALIFGTASY

IFFPLLLFVTAPDNLGYAASFALPYWNFQPYMSLHNLVHSFVALVLHSF

TDAIFLQLTSDQLGYSYPYLQYRRLRKGYSAALYRASEHLELIFLYDGI

EDGIEHFWKVFNTMGLYGLYDLLMTVLGIIFMPRGQKSKLLYDGIEHFM

FKFLVKENYLEYVPNSDPPRYFVWKVFNTMGLYKVLEFLAKV
```

The vector was rescued in HEK 293 cells and expanded. Protein expression was confirmed by Western Blot. Viral integrity was tested by restriction enzyme digest of purified viral DNA. Vector was titrated by spectrometry for virus particle content and by serial dilutions follow by expansion in HEK 293 cells and nested reverse transcription PCR for infectious units content. Genetic stability of the vector was tested for by serial (12 times) propagation of the vector followed by purification of the viral DNA and restriction enzyme digest a and gel electrophoresis of the cut DNA. The banding pattern after 12 passages was identical to that of an early passage virus.

Immunogenicity was tested in mice. Five C57B1/6 mice were immunized i.m. with $5 \times 10^{10}$ vp of the AdC68-gDK9Melapoly vector. Immunized mice and 5 control mice were bled 14 days later. Blood was pooled and lymphocytes were isolated. Lymphocytes were tested by intracellular cytokine staining for $CD8^+$ and $CD4^+$ T cells responses against 6 peptide pools—5 represented epitopes of the individual antigens expressed by the vaccine, one was a mixture of all peptides. T cells were tested for production of granzyme B (GzmB), interferon (IFN)-γ interleukin (IL)-2 and tumor necrosis factor (TNF)-α. All background responses have been subtracted in the results shown in the figures provided elsewhere herein.

The results of the experiments are now described in the following examples.

Figure 2:
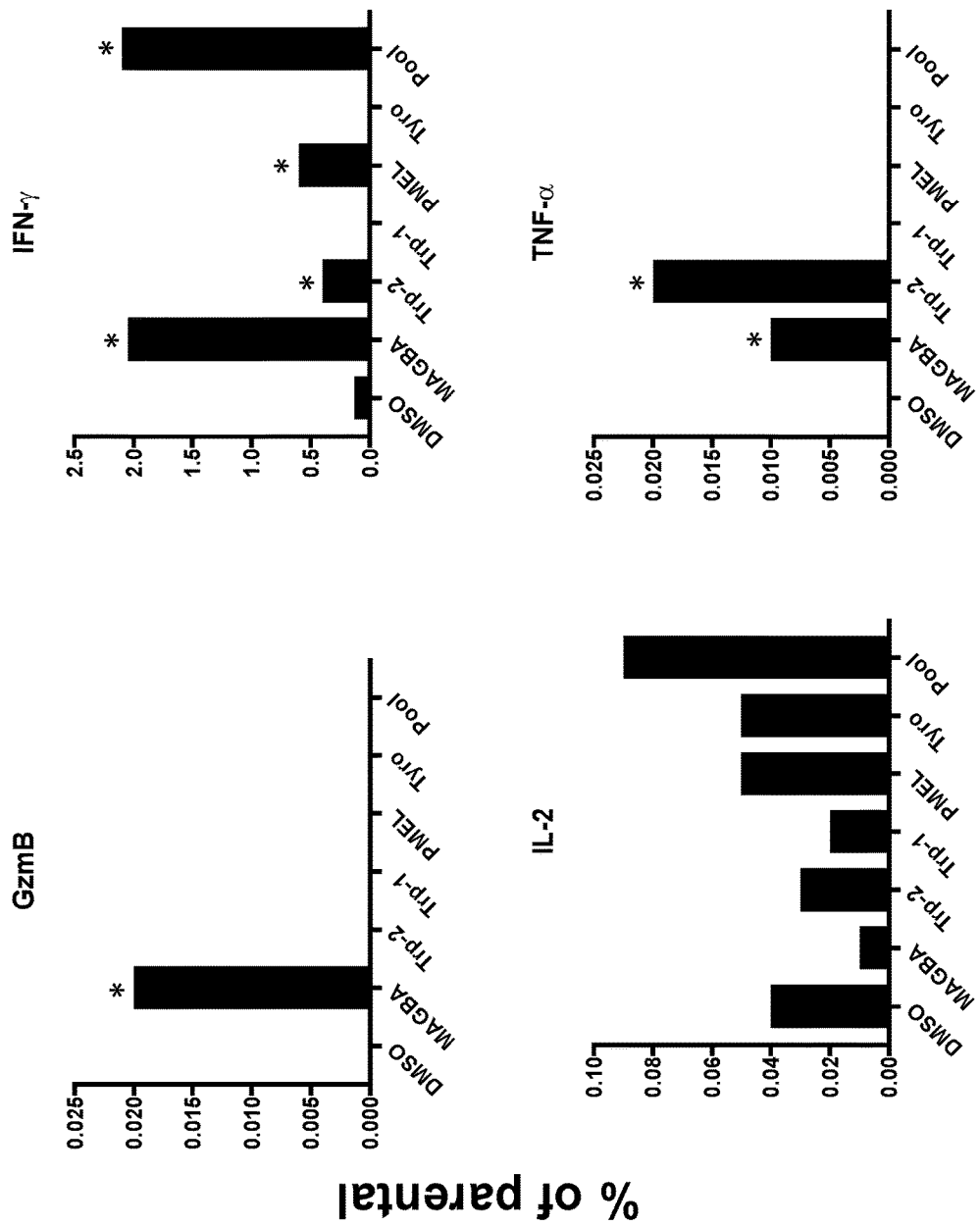

Example 1: The Use of the Vector AdC68-gDK9Melapoly Vaccine is Immunogenic and Induces $CD8^+$ T Cells and $CD4^+$ T Cells Responses As shown in FIG. 1 and FIG. 2, certain $CD8^+$ T cells and $CD4^+$ T cells produced individual factors (granzyme B, IL-2, IFN-γ and TNF-α) which presented positive responses against cancer-associated antigens present in the vaccine.

Figure 3:
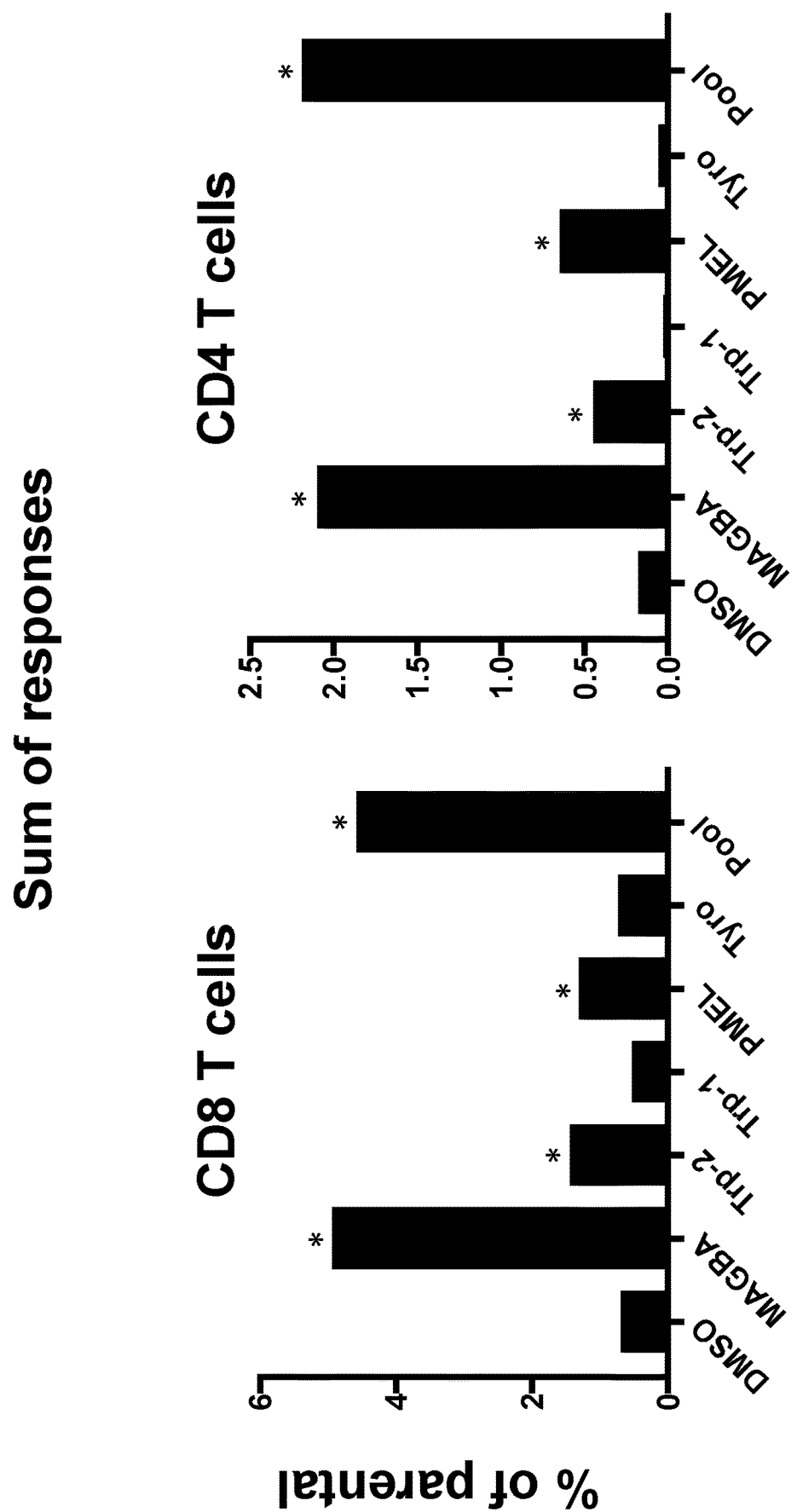

FIG. 3 represents the sum of the percentages of $CD8^+$ T cells and $CD4^+$ T cells producing factors, based on Boolean gating.

Figure 4:
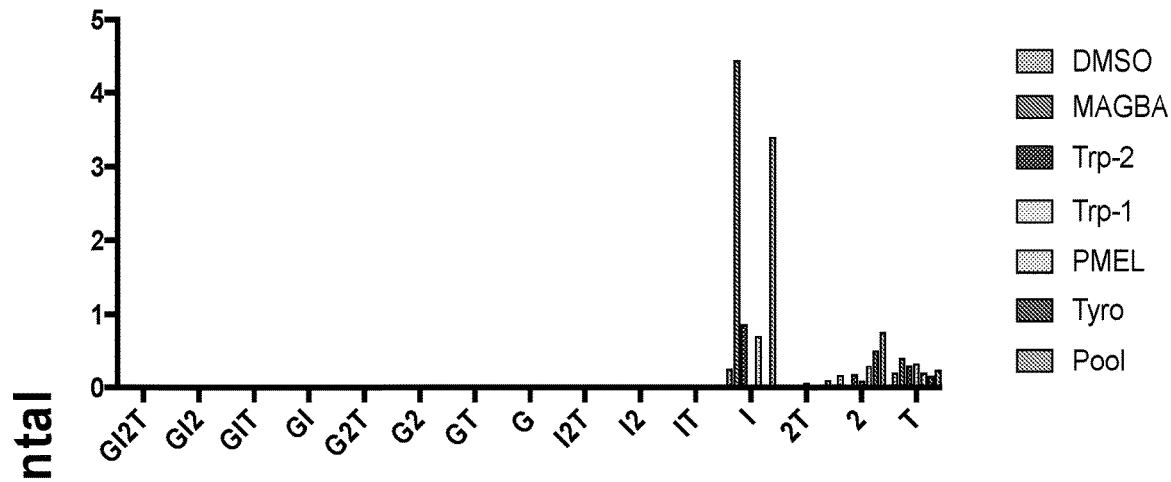
Figure 4:
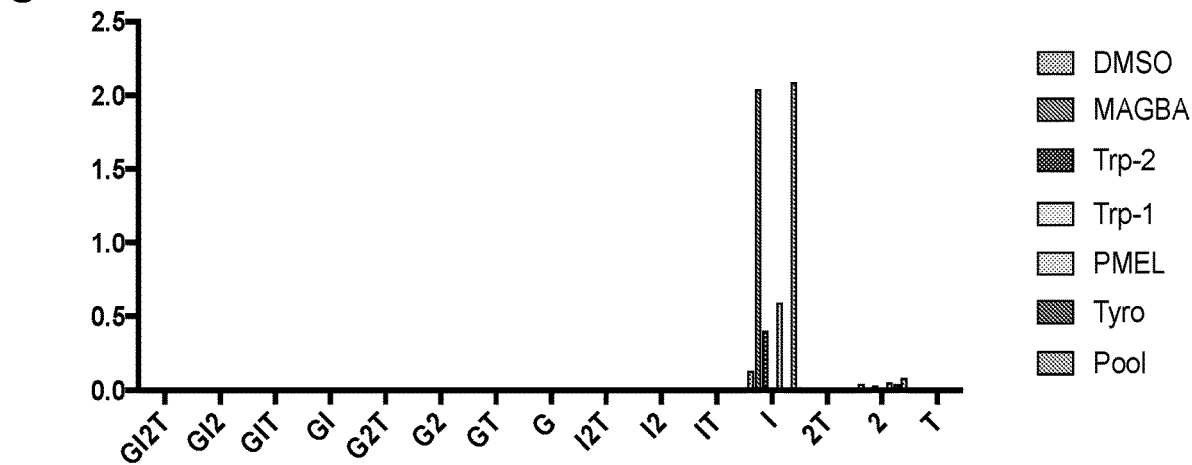

The results from the Boolean gates are shown in FIG. 4 where the highest $CD8^+$ T cell response was an IL-2 response directed against MAGBA followed by responses to Trp-2 and PMEL. This pattern was mirrored by $CD4^+$ T cells.

Figure 5:
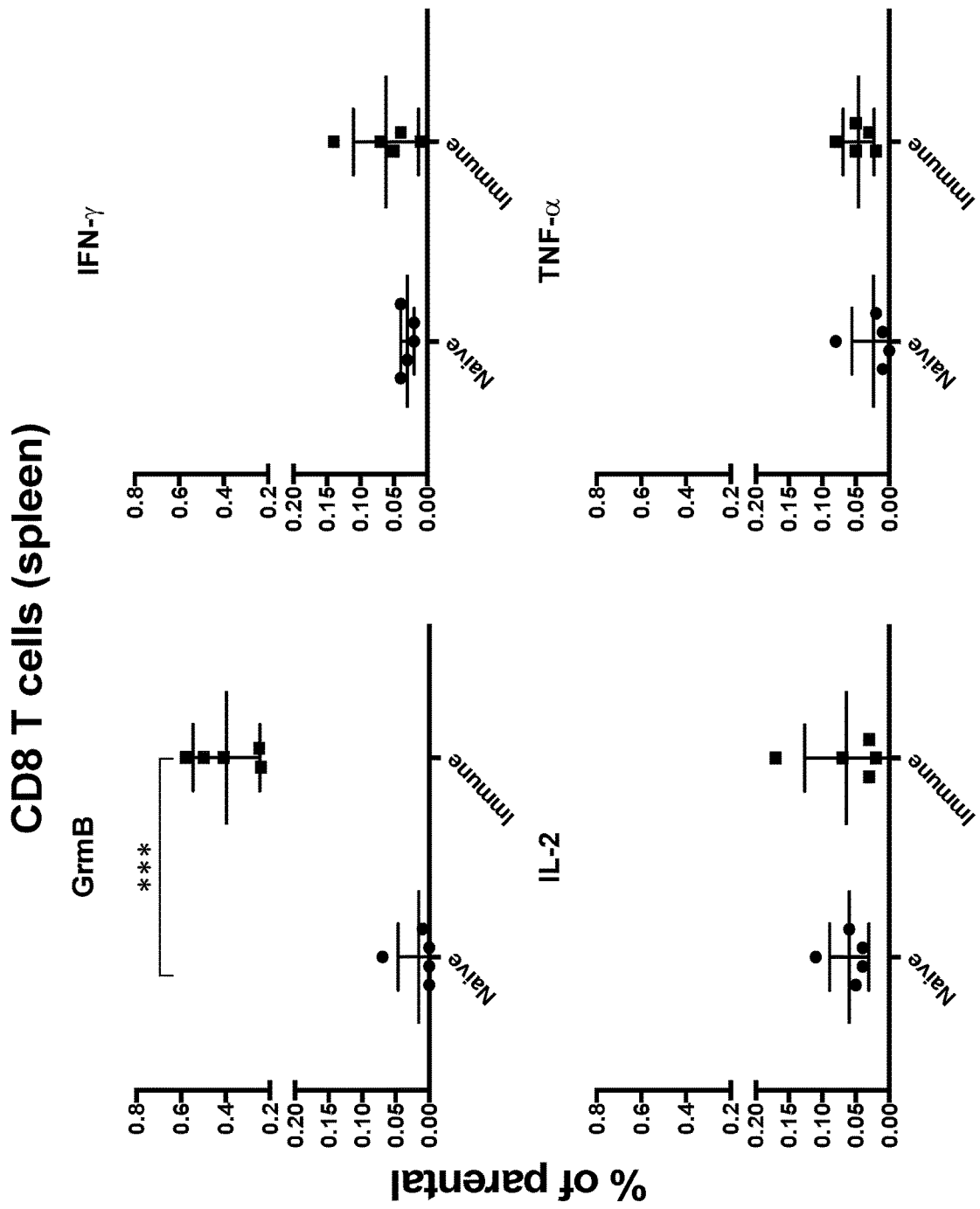

FIG. 5 highlights the different $CD8^+$ T cell responses to the peptide pool. All vaccinated mice showed a highly significant granzyme B producing $CD8^+$ T cell response.

Figure 6:
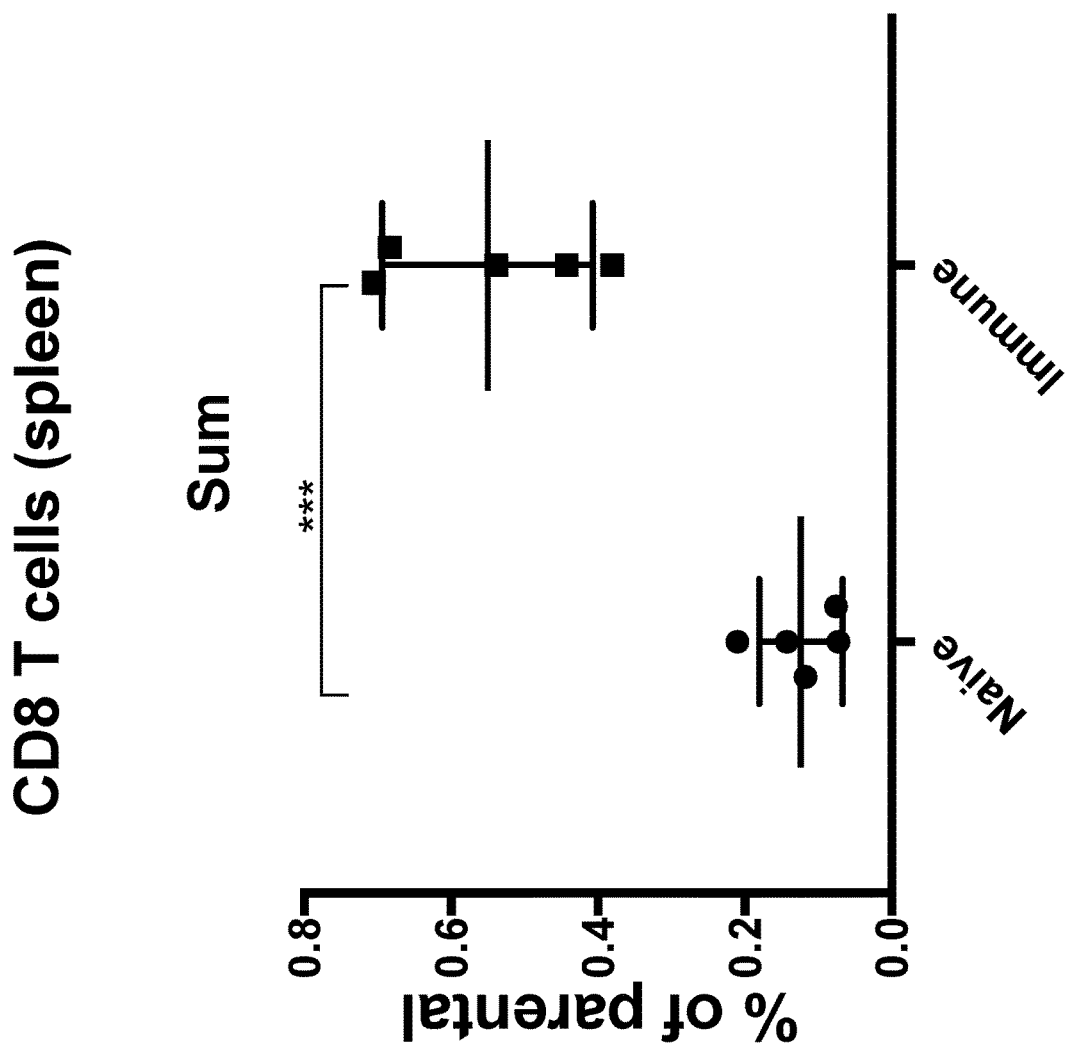

FIG. 6 demonstrates the marginal increases in IFN-γ and TNF-α production where the sum of responses was significantly higher in vaccinated animals.

Figure 7:
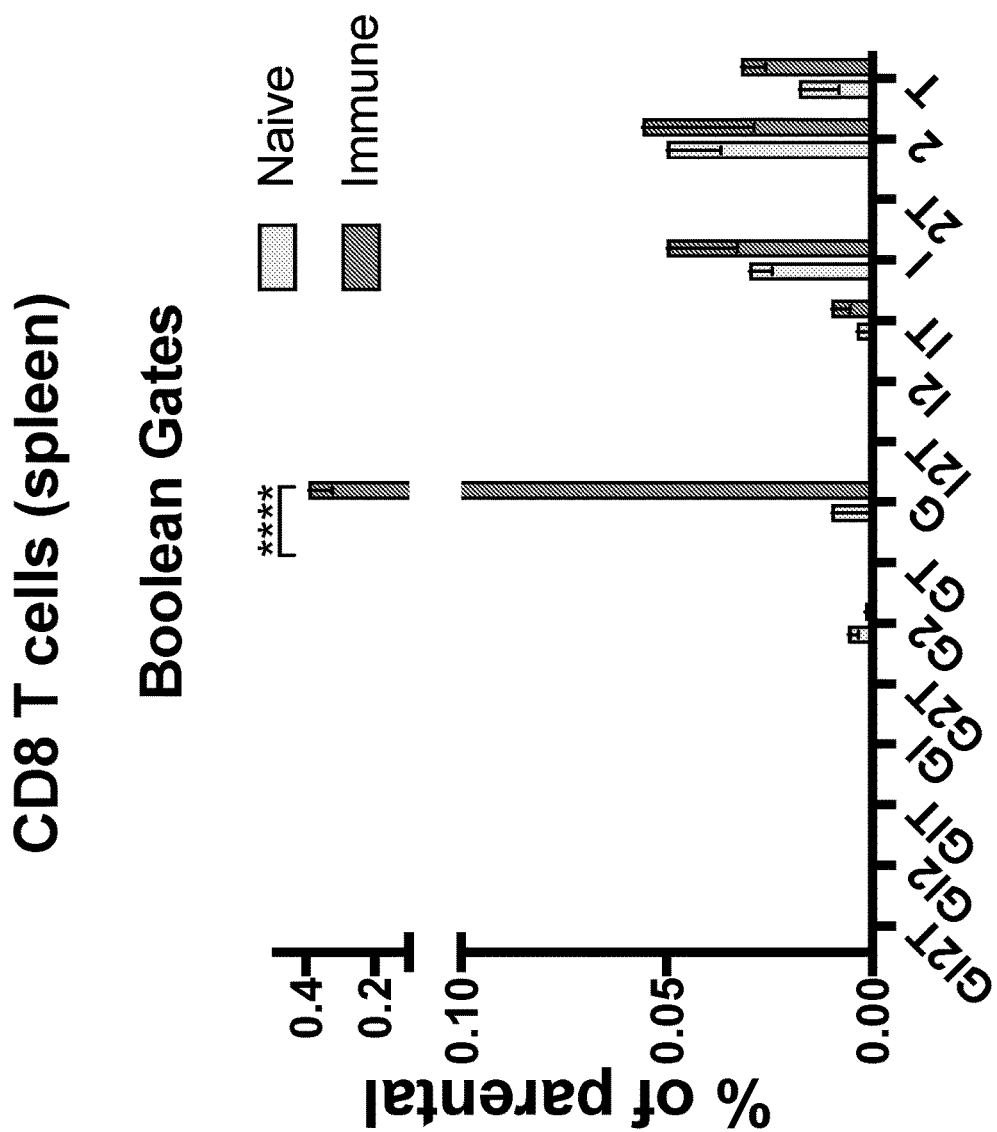

The results from the Boolean gates are shown in FIG. 7 where the production of granzyme B is significantly higher in $CD8^+$ T cells from vaccinated animals.

Figure 8:
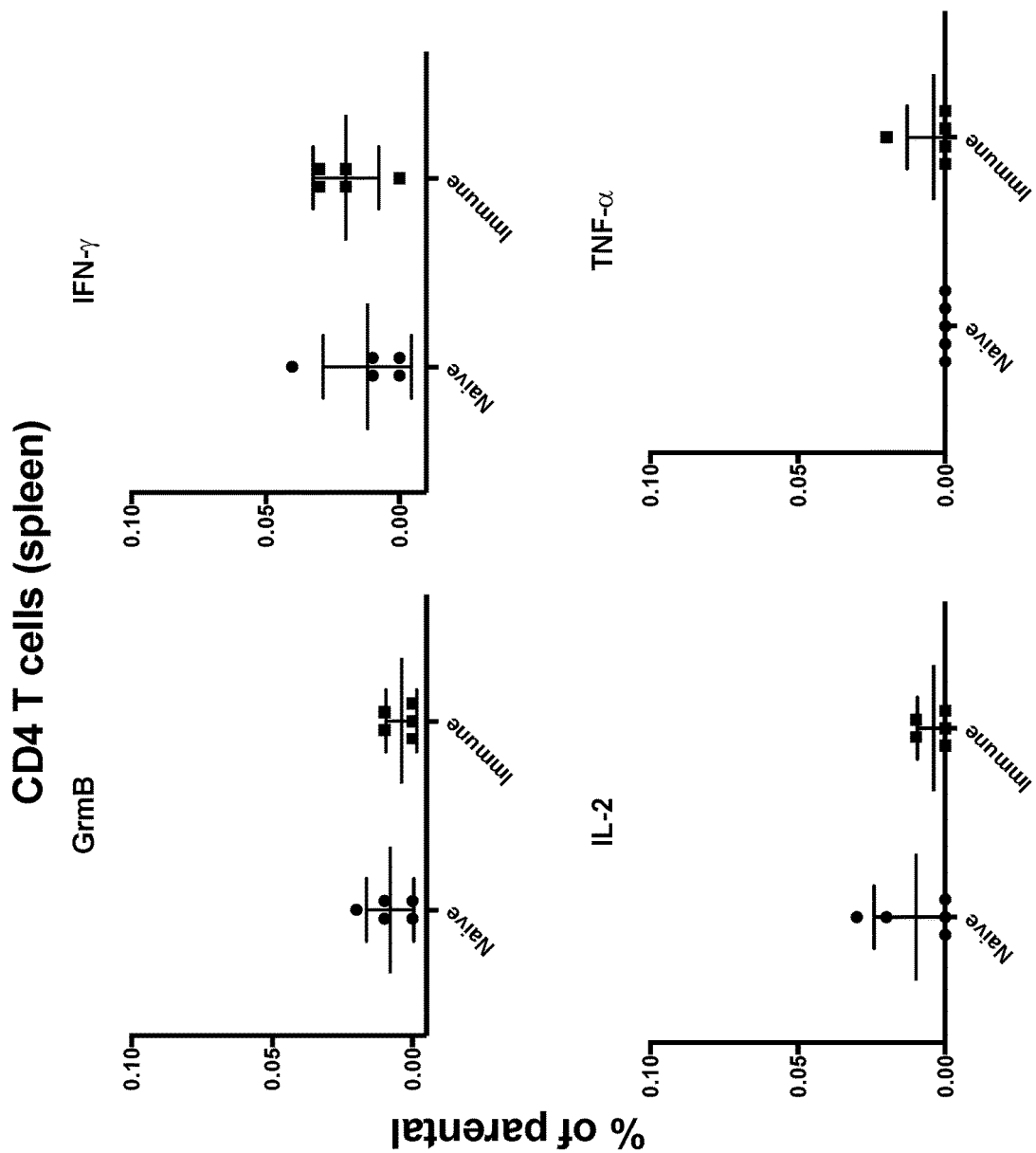

$CD4^+$ T cell responses in spleen were low for all cytokines (FIG. 8) with slight but non-significant trends for increased IFN-γ and TNF-α responses.

Figure 9:
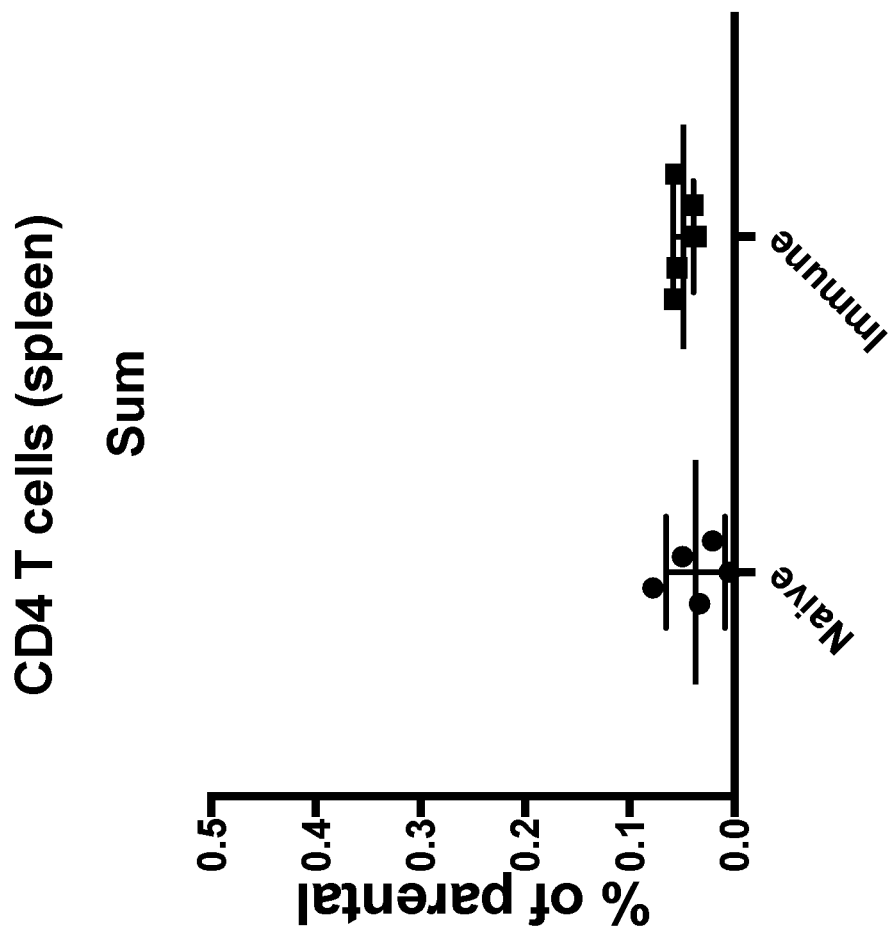
Figure 10:
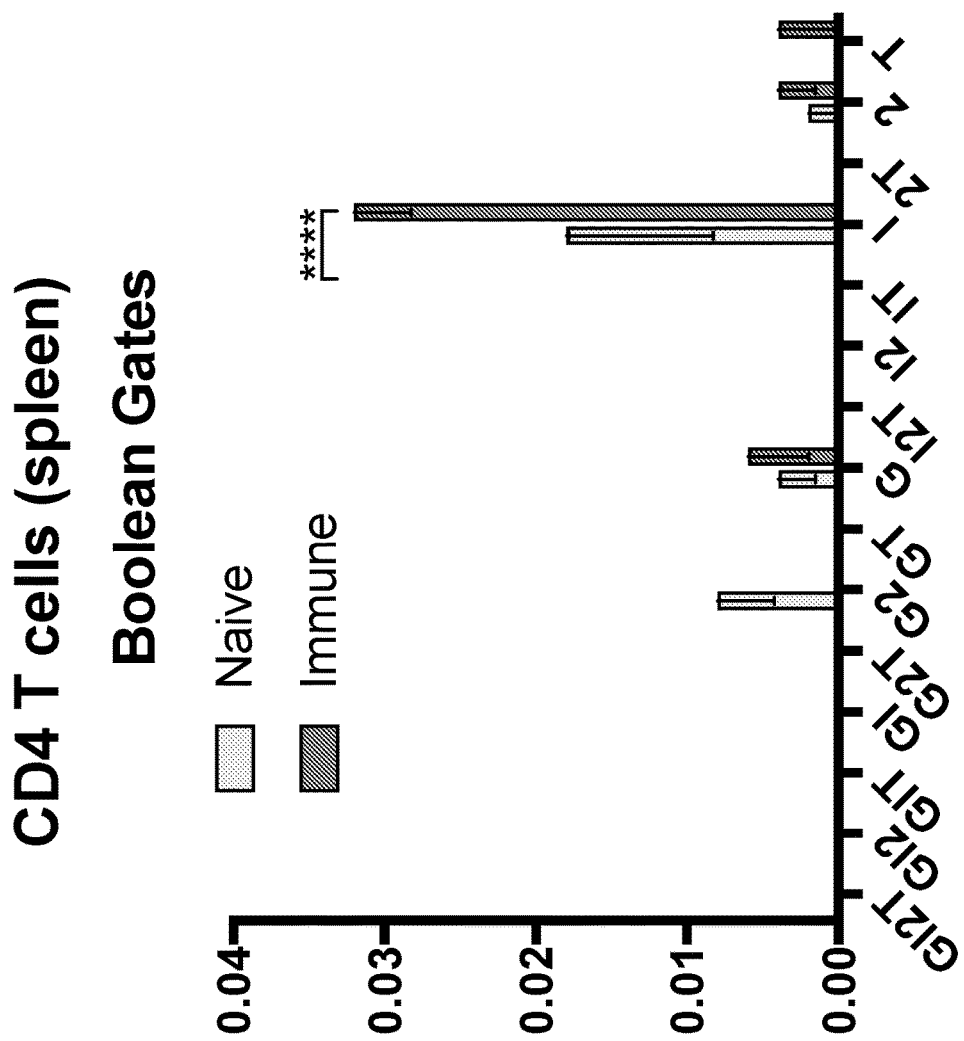

The differences in the sum of the responses of $CD4^+$ T cells producing individual factors (granzyme B, IL-2, IFN-γ and TNF-α) (FIG. 9) also failed to reach significance while Boolean gating (FIG. 10) showed a very significant IL-2 response in vaccinated animals. Lack of a $CD4^+$ T cell response was to be expected as epitopes were selected based on their ability to bind to MHC class I molecules.

Conclusion: The vaccine is immunogenic and induces a $CD8^+$ T cell response; $CD4^+$ T cell responses were detected in blood but they were marginal in spleens. T cell responses are mainly directed against MAGBA, Trp-2 and PMEL.

Example 2: The Use of the Vector AdC68-gDK9Melapoly Vaccine in Dog Trial

The vaccine was first titrated and tested for sterility and endotoxin, then was provided for a dog trial. The prevaccination and day 14 post-vaccination PBMC samples were tested for responses to the overall peptide pool (composed of all of the different peptides tested in mice) and its diluent by intracellular cytokine staining for IFN-γ, IL-2 and TNF-α combined with surface stains for CD14 (dump gate), CD3, CD8, CD4, CD95 and CD28.

Figure 11:
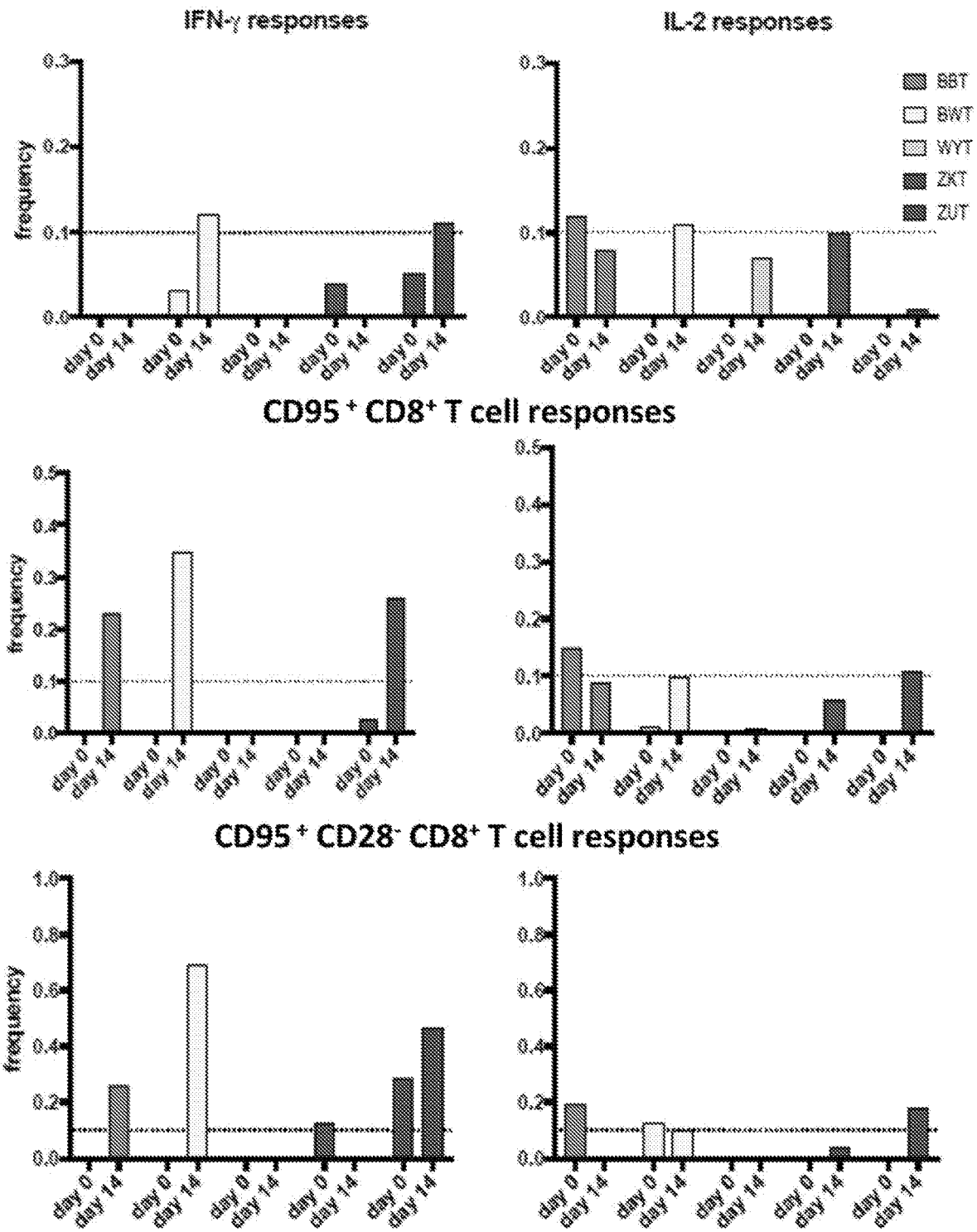
FIGS. 11-17 show results obtained in dogs.

CD8$^+$ T cells were analyzed for frequencies of all CD8$^+$ T cells, CD95$^+$CD8$^+$ T cells and CD95$^+$CD28$^-$CD8$^+$ T cells that produced the individual cytokines. Upon Boolean gating the sum of the responses was calculated. The data obtained without peptides were subtracted from those obtained with peptides. The same procedure was also followed for all subsequently shown data. As shown in FIG. 11, the dogs produced a variety of cytokines and the T cell responses increased upon gating onto smaller subsets. These responses mainly reflected the production of IFN-γ and IL-2.

Figure 12:
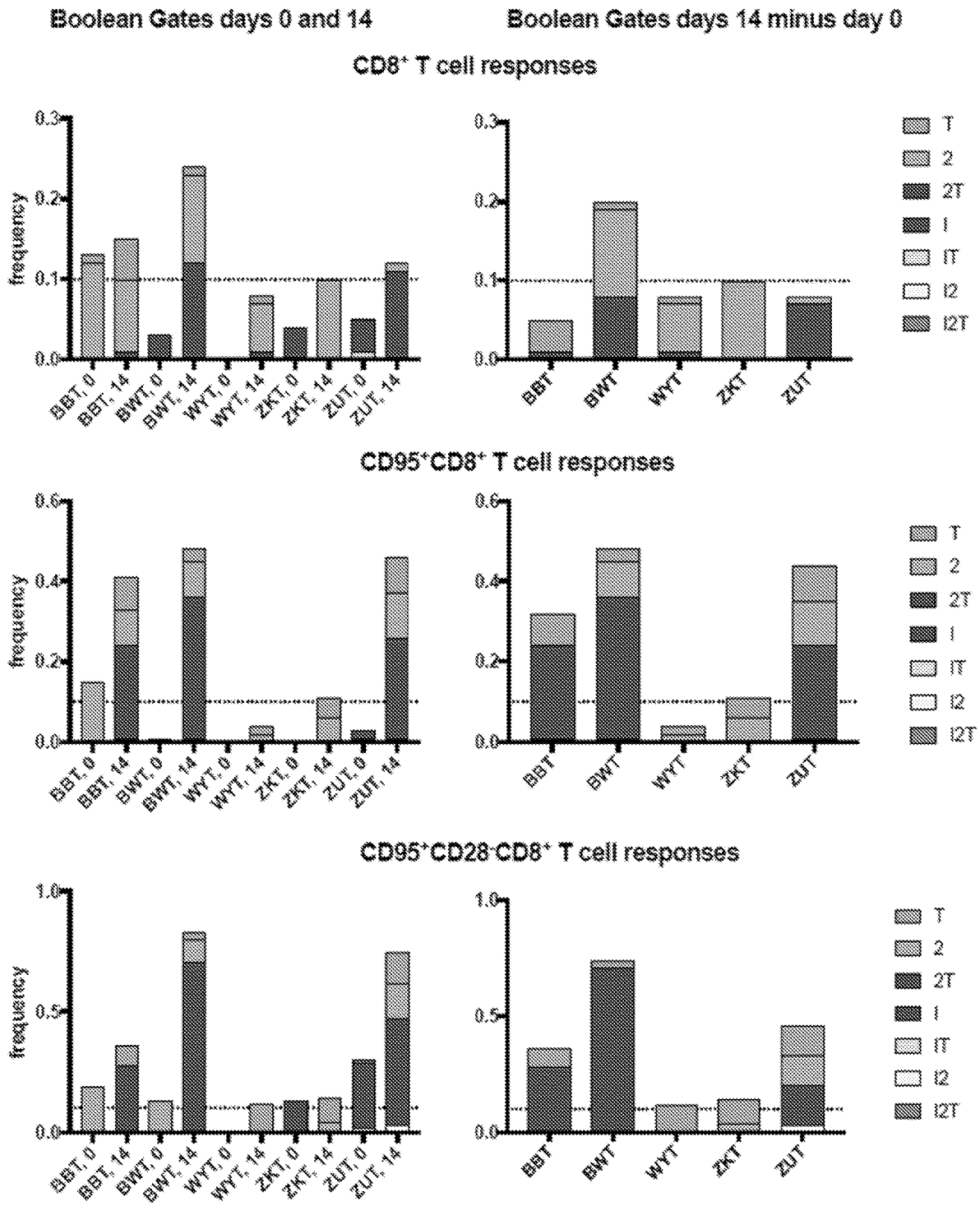

The Boolean gating (FIG. 12) further analyzed the cytokine production profile by the different CD8$^+$ T cell subsets.

Figure 13:
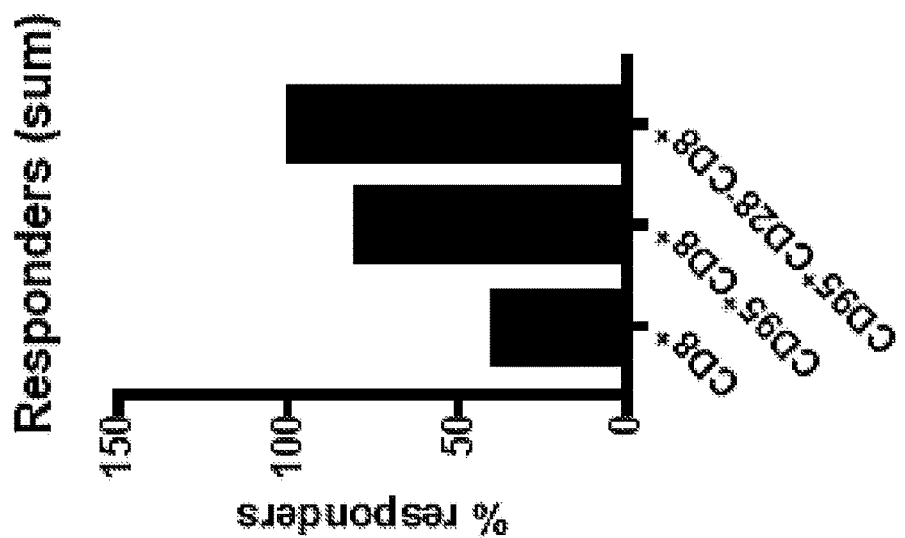

Considering a background corrected frequency equal or above 0.1% as positive, the data presented in FIG. 13 shows that 40% of the dogs were positive in the CD8 gate. The increase to 80% in the CD95$^+$CD8$^+$ gate and to 100% in if the gate was further narrowed to exclude CD28$^+$ cells. In the latter gate, 3 dogs showed very robust T cell responses between 0.4-0.7% composed mainly of IFN-γ producing cells. The two low responders produced mainly TNF-α.

Figure 14:
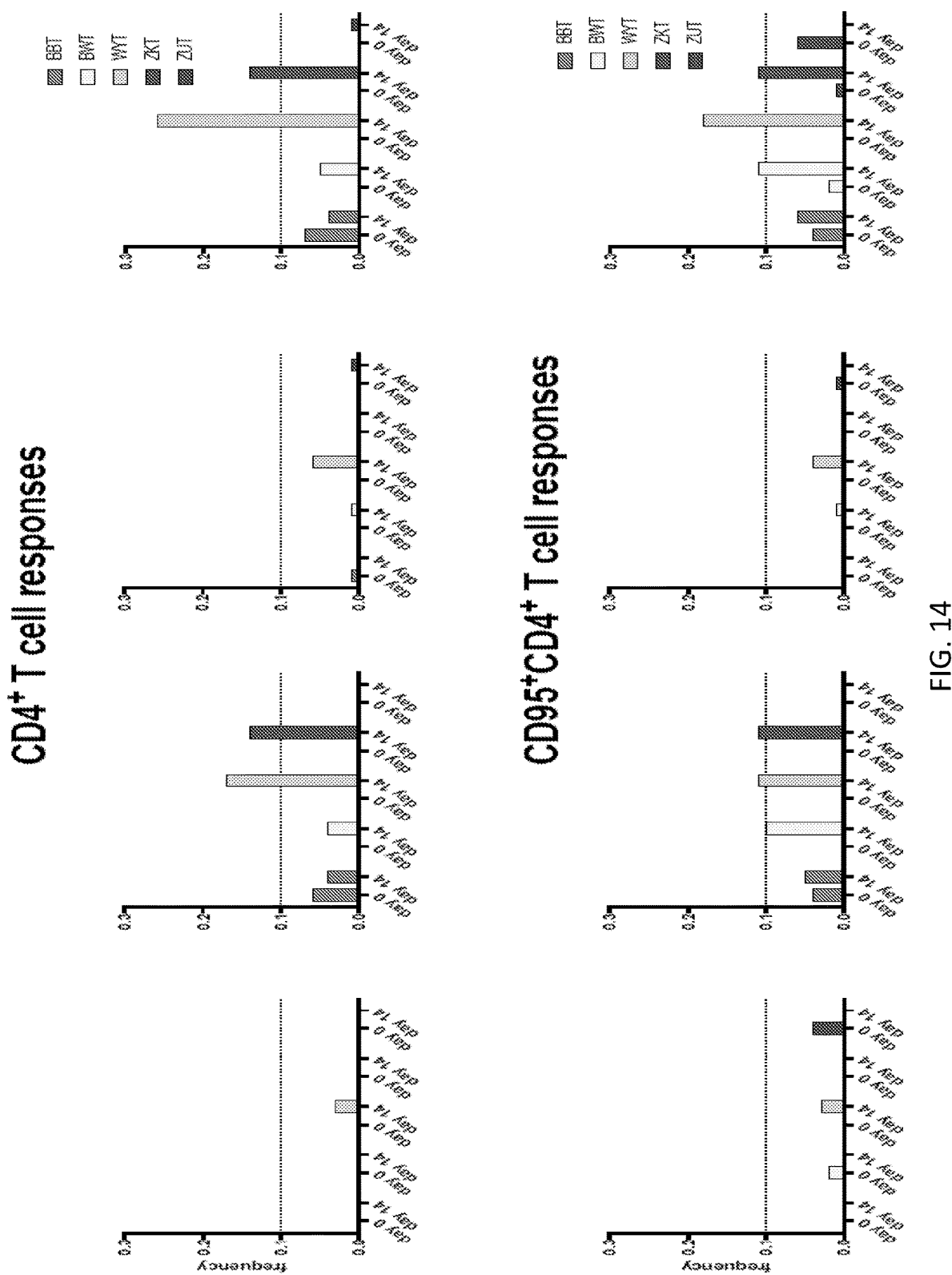

Additionally, CD4$^+$ T cells were gated onto all CD4$^+$ cells and onto CD95$^+$CD4$^+$ cells. As in the previous experiment, there was not distinct CD95$^+$CD28$^-$CD4$^+$ population. As shown in FIG. 14, CD4 T cell responses were low and mainly composed of cells producing IL-2. This is to be expected considering that the vaccine insert was designed to express MEW class I binding sequences that are recognized by CD8$^+$ T cells.

Figure 15:
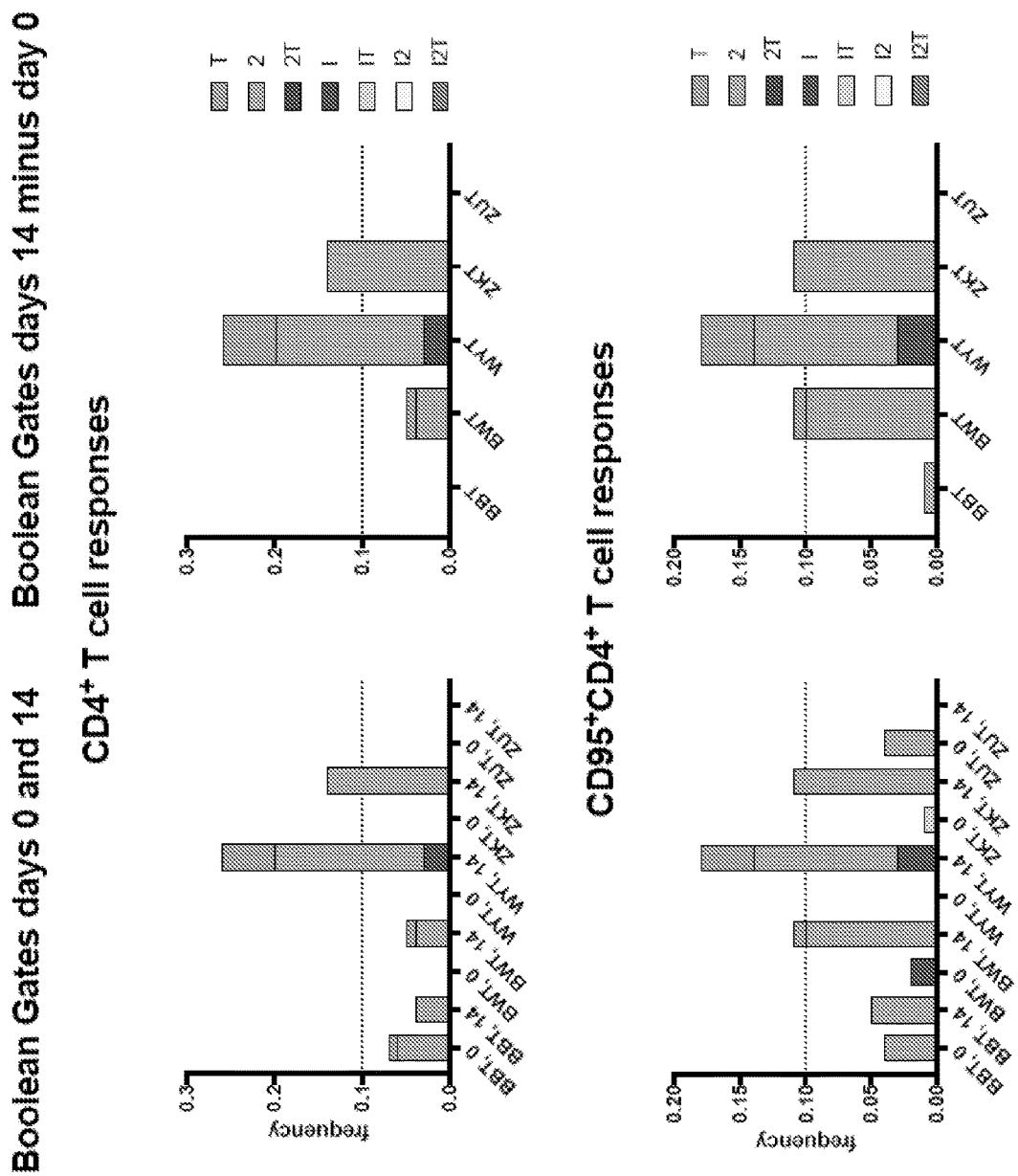
Figure 16:
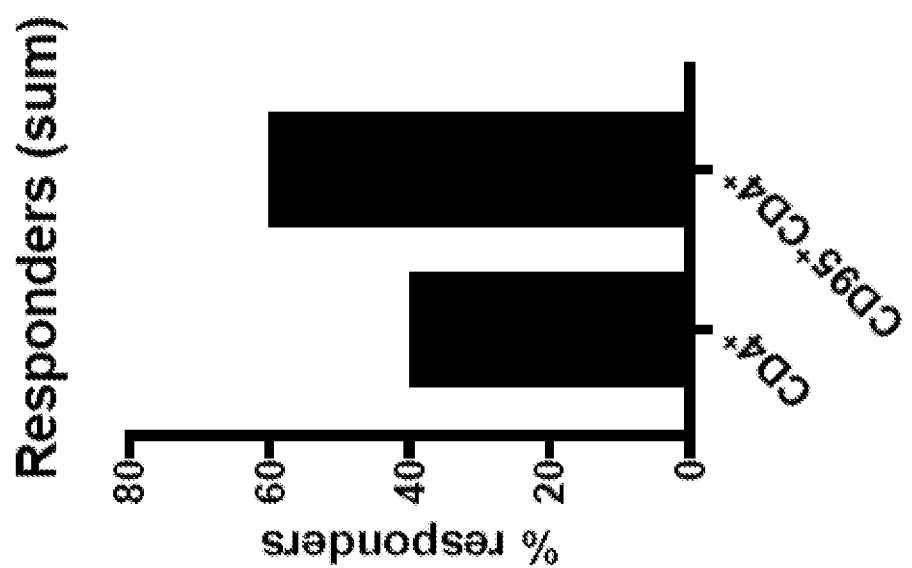
Figure 17:
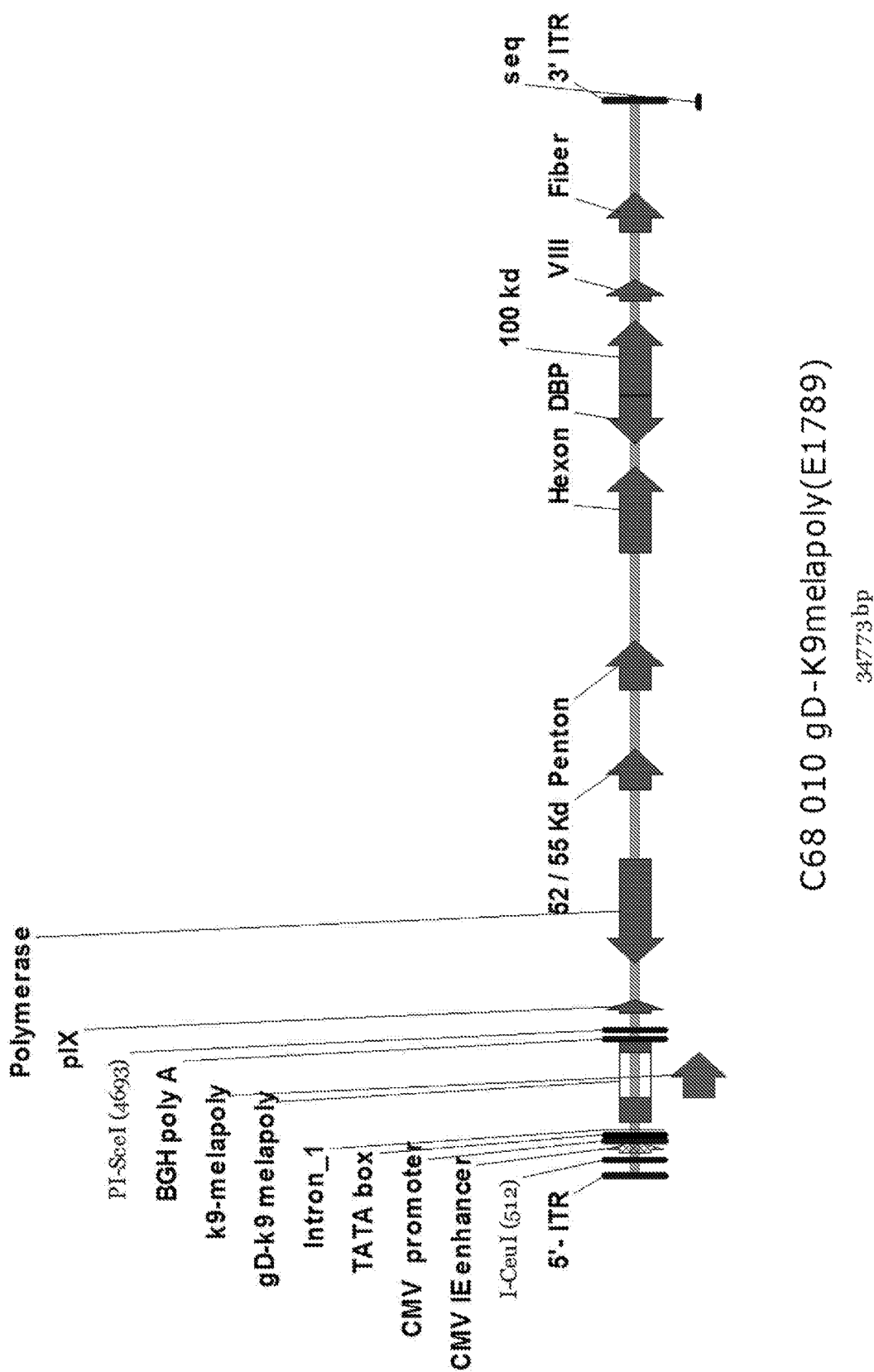

The results for Boolean gating are shown in FIG. 15. The T cell responses also were dominated by cells that only produced IL-2 with small populations of cells producing TNF-α. Double or triple positive cells were absent. 2 dogs were seen as positive in the CD4 gate, when using the same cut-off as for CD8$^+$ T cell responses. 3 dogs were seen as positive in the CD4 gate, when only CD95$^+$CD4$^+$ cells were analyzed (FIG. 16).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A composition comprising a nucleic acid delivery system comprising a polynucleotide sequence comprising a promoter sequence operably linked to a nucleic acid sequence encoding a heterologous protein comprising a canine melanoma antigen comprising the amino acid sequence of SEQ ID NO: 3 and an inhibitor of an immuno-inhibitory pathway.

2. The composition of claim 1, wherein the nucleic acid delivery system is an adenovirus vector.

3. The composition of claim 2, wherein the adenovirus vector is a chimpanzee-derived adenovirus vector.

4. The composition of claim 3, wherein the chimpanzee-derived adenovirus vector is of serotype AdC68.

5. The composition of claim 1, wherein the promoter is a constitutive promoter.

6. The composition of claim 1, wherein the promoter is a cytomegalovirus immediate early promoter (CMV).

7. The composition of claim 1, wherein the canine melanoma antigen is encoded by the nucleic acid sequence of SEQ ID NO: 2.

8. The composition of claim 1, wherein the inhibitor of an immuno-inhibitory pathway is a herpes virus (HSV-1) glycoprotein D (gD).

9. The composition of claim 1, wherein the polynucleotide sequence comprises the nucleic acid sequence of SEQ ID NO: 1.

10. A protein expression system comprising a nucleic acid delivery system comprising a polynucleotide sequence comprising a promoter operably linked to a nucleic acid sequence encoding a heterologous protein comprising a canine melanoma antigen comprising the amino acid sequence of SEQ ID NO: 3 and an inhibitor of an immuno-inhibitory pathway.

11. The protein expression system of claim 10, wherein the nucleic acid delivery system comprises an adenovirus vector.

12. The protein expression system of claim 11, wherein the adenovirus vector is encoded by polynucleotide sequence comprising the nucleic acid sequence of SEQ ID NO: 1.

13. A method of eliciting an immune response against a canine melanoma antigen in a mammal in need thereof, the method comprising administering to the mammal the composition of claim 1.

14. The method of claim 13, wherein the polynucleotide sequence comprises the nucleic acid sequence of SEQ ID NO: 1.

15. The method of claim 13, wherein the mammal is a canine.

16. A method of treating melanoma in a mammal in need thereof, the method comprising administering a therapeutically effective amount of the composition of claim 1, wherein the polynucleotide sequence comprises the nucleic acid sequence of SEQ ID NO: 1.

17. A method of vaccinating a mammal against melanoma, the method comprising administering to the mammal a pharmaceutically acceptable amount of the composition of claim 1, wherein administration of the composition elicits an immune response in the mammal.

18. The method of claim 17, wherein the composition is administered therapeutically to the mammal.

19. A method of generating a effector and memory T cell immune response to a canine melanoma antigen in a mammal in need thereof, the method comprising the steps of: (a) administering the composition of claim 1 to the mammal in an amount effective to elicit an immune response in the mammal; (b) administering a second effective amount of the composition of claim 1 at a second, subsequent time period, wherein T memory cells directed against the canine tumor-specific antigen are reactivated in the mammal.

20. The method of claim 19, wherein the canine melanoma antigen is encoded by the nucleic acid sequence of SEQ ID NO: 2.

21. The method of claim 19, wherein the composition administered first in (a) and in (b) has a same or a different serotype.

* * * * *